(12) United States Patent
Ely

(10) Patent No.: US 8,022,317 B2
(45) Date of Patent: Sep. 20, 2011

(54) DIGITIZER SYSTEM

(75) Inventor: David Thomas Eliot Ely, Waterbeach (GB)

(73) Assignee: Synaptics (UK) Limited, Cambridge (GB)

( * ) Notice: Subject to any disclaimer, the term of this patent is extended or adjusted under 35 U.S.C. 154(b) by 0 days.

(21) Appl. No.: 12/873,739

(22) Filed: Sep. 1, 2010

(65) Prior Publication Data
US 2010/0321338 A1    Dec. 23, 2010

Related U.S. Application Data

(62) Division of application No. 10/569,445, filed as application No. PCT/GB2004/003639 on Aug. 26, 2004, now Pat. No. 7,812,268.

(30) Foreign Application Priority Data

Aug. 26, 2003 (GB) .................................. 0319945.2

(51) Int. Cl.
*G06F 3/041* (2006.01)
*G06K 11/06* (2006.01)
*G08C 21/00* (2006.01)

(52) U.S. Cl. ............... 178/18.03; 178/18.07; 178/19.03; 345/173; 345/179

(58) Field of Classification Search .................. 345/173, 345/179; 178/18.01–18.09, 18.11, 19.01–19.06
See application file for complete search history.

(56) References Cited

U.S. PATENT DOCUMENTS

| | | | |
|---|---|---|---|
| 2,145,742 A | 1/1939 | Wechsung | |
| 2,867,783 A | 1/1959 | Childs | |
| 2,942,212 A | 6/1960 | Mynall | |
| 3,219,956 A | 11/1965 | Newell et al. | |
| 3,297,940 A | 1/1967 | Mulligan et al. | |
| 3,482,242 A | 12/1969 | Hargrove | |
| 3,579,023 A | 5/1971 | Fox | |
| 3,647,963 A | 3/1972 | Bailey | |
| 3,772,587 A | 11/1973 | Farrand et al. | |
| 3,812,481 A | 5/1974 | Stednitz | |
| 3,851,242 A | 11/1974 | Ellis | |
| 3,873,770 A | 3/1975 | Ioannou | |
| 3,895,356 A | 7/1975 | Kraus | |
| 3,898,635 A | 8/1975 | Kulterman | |
| 3,906,190 A * | 9/1975 | Light | ............................ 708/830 |
| 3,906,436 A | 9/1975 | Kurauchi et al. | |

(Continued)

FOREIGN PATENT DOCUMENTS

DE    1134848    8/1962

(Continued)

OTHER PUBLICATIONS

"Physics 2CL Lab Manual" Online! 1999, XP002327778, Retrieved from the Internet on May 11, 2005: URL:http://hep.ucsd.edu/dbmacf/1998-1999/2c1/manual/experiment3.pdf, pp. 51-61.

(Continued)

*Primary Examiner* — Stephen Sherman
(74) *Attorney, Agent, or Firm* — Nixon & Vanderhye PC

(57) ABSTRACT

An X-Y digitizer system is described for embedding within a host device, such as a tablet PC, a mobile telephone, a personal digital assistant or the like. The digitizer is configurable so that it can detect and track the position of different types of position indicator. The digitizer also includes novel digitizer windings and novel excitation circuitry for energizing the windings.

18 Claims, 34 Drawing Sheets

U.S. PATENT DOCUMENTS

| | | |
|---|---|---|
| 3,925,610 A | 12/1975 | French et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,205,199 A | 5/1980 | Mochizuki |
| 4,210,775 A | 7/1980 | Rodgers et al. |
| 4,223,300 A | 9/1980 | Wiklund |
| 4,255,617 A | 3/1981 | Carau, Sr. et al. |
| 4,341,385 A | 7/1982 | Doyle et al. |
| 4,358,723 A | 11/1982 | Scholl et al. |
| 4,387,509 A | 6/1983 | Dechelette |
| 4,423,286 A | 12/1983 | Bergeron |
| 4,425,511 A | 1/1984 | Borsh |
| 4,482,784 A | 11/1984 | Whetstone |
| 4,504,832 A | 3/1985 | Conte |
| 4,507,638 A | 3/1985 | Brosh |
| 4,532,376 A | 7/1985 | Rockwell |
| 4,577,057 A | 3/1986 | Blesser |
| 4,577,058 A | 3/1986 | Collins |
| 4,593,245 A | 6/1986 | Viertl |
| 4,609,776 A | 9/1986 | Murakami et al. |
| 4,642,321 A | 2/1987 | Schoenberg |
| 4,672,154 A | 6/1987 | Rodgers |
| 4,686,501 A | 8/1987 | Palmier et al. |
| 4,693,778 A | 9/1987 | Swiggett |
| 4,697,050 A | 9/1987 | Farel |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,748,295 A | 5/1988 | Rodgers |
| 4,752,655 A | 6/1988 | Tajiri |
| 4,786,765 A | 11/1988 | Yamanami et al. |
| 4,820,961 A | 4/1989 | McMullin |
| 4,821,002 A | 4/1989 | Luly |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,988,837 A | 1/1991 | Murakami et al. |
| 4,999,461 A | 3/1991 | Murakami et al. |
| 5,004,872 A | 4/1991 | Lasley |
| 5,013,047 A | 5/1991 | Schwab |
| 5,023,408 A | 6/1991 | Murakami et al. |
| 5,028,745 A | 7/1991 | Yamanami et al. |
| 5,041,785 A | 8/1991 | Bogaerts et al. |
| 5,045,645 A | 9/1991 | Hoendervoogt |
| 5,059,180 A | 10/1991 | McLees |
| 5,066,833 A | 11/1991 | Zalenski |
| 5,082,286 A | 1/1992 | Ryan |
| 5,088,928 A | 2/1992 | Chan |
| 5,122,623 A | 6/1992 | Zank et al. |
| 5,129,654 A | 7/1992 | Bogner |
| 5,134,388 A | 7/1992 | Murakami et al. |
| 5,134,689 A | 7/1992 | Murakami et al. |
| 5,136,125 A | 8/1992 | Russell |
| 5,177,389 A | 1/1993 | Schalk |
| 5,188,368 A | 2/1993 | Ryan |
| 5,206,785 A | 4/1993 | Hukashima |
| 5,218,174 A | 6/1993 | Gray et al. |
| 5,225,637 A | 7/1993 | Rodgers et al. |
| 5,239,489 A | 8/1993 | Russell |
| 5,245,336 A | 9/1993 | Chen et al. |
| 5,247,137 A | 9/1993 | Epperson |
| 5,247,138 A | 9/1993 | Landmeier |
| 5,274,198 A | 12/1993 | Landmeier |
| 5,342,136 A | 8/1994 | Fukami |
| 5,349,139 A | 9/1994 | Verrier et al. |
| 5,357,062 A | 10/1994 | Rockwell et al. |
| 5,369,227 A | 11/1994 | Stone |
| 5,381,091 A | 1/1995 | Kobayashi et al. |
| 5,396,443 A | 3/1995 | Mese et al. |
| 5,406,155 A | 4/1995 | Persson |
| 5,434,372 A | 7/1995 | Lin |
| 5,461,204 A | 10/1995 | Makinwa et al. |
| 5,486,731 A | 1/1996 | Masaki et al. |
| 5,525,981 A | 6/1996 | Abernethy |
| 5,554,827 A | 9/1996 | Oda |
| 5,557,076 A | 9/1996 | Wieczorek et al. |
| 5,571,997 A | 11/1996 | Gray et al. |
| 5,600,105 A | 2/1997 | Fukuzaki et al. |
| 5,619,431 A | 4/1997 | Oda |
| 5,625,239 A | 4/1997 | Persson et al. |
| 5,635,683 A | 6/1997 | McDermott et al. |
| 5,646,496 A | 7/1997 | Woodland et al. |
| 5,657,011 A | 8/1997 | Komatsu et al. |
| 5,691,513 A | 11/1997 | Yamamoto et al. |
| 5,691,748 A | 11/1997 | Fukuzaki |
| 5,693,913 A | 12/1997 | Sudo et al. |
| 5,693,993 A | 12/1997 | Ito et al. |
| 5,748,110 A | 5/1998 | Sekizawa |
| 5,751,229 A | 5/1998 | Funahashi |
| 5,783,940 A | 7/1998 | Kolomeitsev |
| 5,815,091 A | 9/1998 | Dames |
| 5,818,091 A | 10/1998 | Lee et al. |
| 5,818,431 A | 10/1998 | Oh et al. |
| 5,826,473 A | 10/1998 | Saka et al. |
| 5,854,449 A | 12/1998 | Adkins |
| 5,864,098 A | 1/1999 | Shinohe |
| 5,866,847 A | 2/1999 | Saka et al. |
| 5,895,895 A | 4/1999 | Ono et al. |
| 5,914,735 A | 6/1999 | Yamamoto et al. |
| 5,943,044 A | 8/1999 | Martinelli et al. |
| 6,002,387 A | 12/1999 | Ronkka et al. |
| 6,005,555 A | 12/1999 | Katsurahira et al. |
| 6,124,708 A | 9/2000 | Dames |
| 6,236,199 B1 | 5/2001 | Irle et al. |
| 6,239,789 B1 | 5/2001 | Sekizawa et al. |
| 6,249,135 B1 | 6/2001 | Maruyama et al. |
| 6,249,234 B1 | 6/2001 | Ely et al. |
| 6,249,235 B1 | 6/2001 | Iwasaki |
| 6,255,810 B1 | 7/2001 | Irle et al. |
| 6,262,684 B1 | 7/2001 | Stewart et al. |
| 6,288,710 B1 | 9/2001 | Lee et al. |
| 6,304,014 B1 | 10/2001 | England et al. |
| 6,304,076 B1 | 10/2001 | Madni et al. |
| 6,438,002 B2 | 8/2002 | Alhoussami |
| 6,489,899 B1 | 12/2002 | Ely et al. |
| 6,513,943 B2 | 2/2003 | Fukuyoshi |
| 6,522,128 B1 | 2/2003 | Ely et al. |
| 6,534,970 B1 | 3/2003 | Ely et al. |
| 6,563,387 B2 | 5/2003 | Hirano |
| 6,667,740 B2 | 12/2003 | Ely et al. |
| 6,705,511 B1 | 3/2004 | Dames et al. |
| 6,788,221 B1 | 9/2004 | Ely et al. |
| 6,797,895 B2 | 9/2004 | Lapstun et al. |
| 6,798,404 B2 | 9/2004 | Sharma |
| 6,888,538 B2 | 5/2005 | Ely et al. |
| 6,980,134 B2 | 12/2005 | Ely et al. |
| 7,019,672 B2 | 3/2006 | Ely |
| 7,030,782 B2 | 4/2006 | Ely et al. |
| 7,133,793 B2 | 11/2006 | Ely et al. |
| 7,406,393 B2 | 7/2008 | Ely et al. |
| 7,511,705 B2 | 3/2009 | Silk et al. |
| 2003/0062889 A1 | 4/2003 | Ely et al. |
| 2005/0174259 A1 | 8/2005 | Ely et al. |

FOREIGN PATENT DOCUMENTS

| | | |
|---|---|---|
| DE | 3500121 | 7/1986 |
| DE | 3620412 | 12/1987 |

| | | | |
|---|---|---|---|
| EP | 0159191 A2 | 10/1985 |
| EP | 0182085 A2 | 5/1986 |
| EP | 0182085 A3 | 5/1986 |
| EP | 0209513 A1 | 6/1986 |
| EP | 0218745 | 4/1987 |
| EP | 0 307 667 | 3/1989 |
| EP | 0313046 | 4/1989 |
| EP | 0 499 641 | 8/1992 |
| EP | 0 511 406 | 11/1992 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0 672 997 | 9/1995 |
| EP | 0675581 A1 | 10/1995 |
| EP | 0680009 | 11/1995 |
| EP | 0680009 A2 | 11/1995 |
| EP | 0709648 A2 | 5/1996 |
| EP | 0716390 | 6/1996 |
| EP | 0743508 | 11/1996 |
| EP | 0772149 | 5/1997 |
| EP | 0 915 429 | 5/1999 |
| FR | 1325017 | 4/1963 |
| FR | 2298082 | 8/1976 |
| FR | 2682760 | 4/1993 |
| GB | 2074736 A | 11/1981 |
| GB | 1604824 | 12/1981 |
| GB | 2103943 A | 3/1983 |
| GB | 2141235 A | 12/1984 |
| JP | 63-211014 A | 9/1988 |
| JP | 02-248816 | 10/1990 |
| JP | 406051905 A | 2/1994 |
| TW | 287267 | 1/1996 |
| TW | 347542 | 11/1998 |

OTHER PUBLICATIONS

British Examination Report for British Patent Application No. GB 0422091.9 dated Jun. 1, 2005.
Electronics Letters, vol. 11, No. 1, Jan. 9, 1975, pp. 5-6, Gordon, "Digital xy Position Indicator Using Walsh Functions".
International Search Report for International Patent Application No. PCT/GB2002/05247 dated May 23, 2005.
International Search Report for International Patent Application No. PCT/GB2002/02387 dated Jan. 8, 2004.
International Search Report for PCT/GB2004/003639 dated Apr. 11, 2005.
Klatt, "Phase of Digital Data Fixes Shaft Angle," Electrical Design News, vol. 16, No. 12, pp. 53-56, Jun. 15, 1971. XP002045871.
McDonnel, "The Use of Inductosyn to Digital Converters in Linear Control Systems," Automation, vol. 10, No. 11-12, pp. 31-32, Nov.-Dec. 1975.
Patent Abstracts of Japan, vol. 010, No. 009 (P-420), Jan. 14, 1986 & JP 60 165512 A (Toshiba KK), Aug. 28, 1985.
Patent Abstracts of Japan, vol. 10, No. 32 (E-379), Feb. 7, 1986 & JP 60 189231 A (Matsushita Denki Sangyo KK), Sep. 26, 1985.
Patent Abstracts of Japan, vol. 15, No. 37 (P-1159), Jan. 29, 1991 & JP 02 275314 A (Omron Tateisi Electron Co), Nov. 9, 1990.
Pulle, et al., "A New Magnetoresistive Based Sensor for Switched Reluctance Drives," Proceedings of the Annual Power Electronics Specialists Conference (PECS), Toledo, Jun. 29-Jul. 3, 1992, vol. 2, No. CONF, 23, Jun. 29, 1992, pp. 839-843, Institute of Electrical and Electronics Engineers.
Search Report for PCT Application No. PCT/GB 03/02432 (published as WO 2003/105072 A3) dated May 11, 2004.
Search Report for PCT Application No. PCT/GB 99/03989 (published as WO 00/33244 A3) dated Aug. 23, 2000.
Search Report for UK Application No. GB0416614.6 dated Oct. 22, 2004.

* cited by examiner

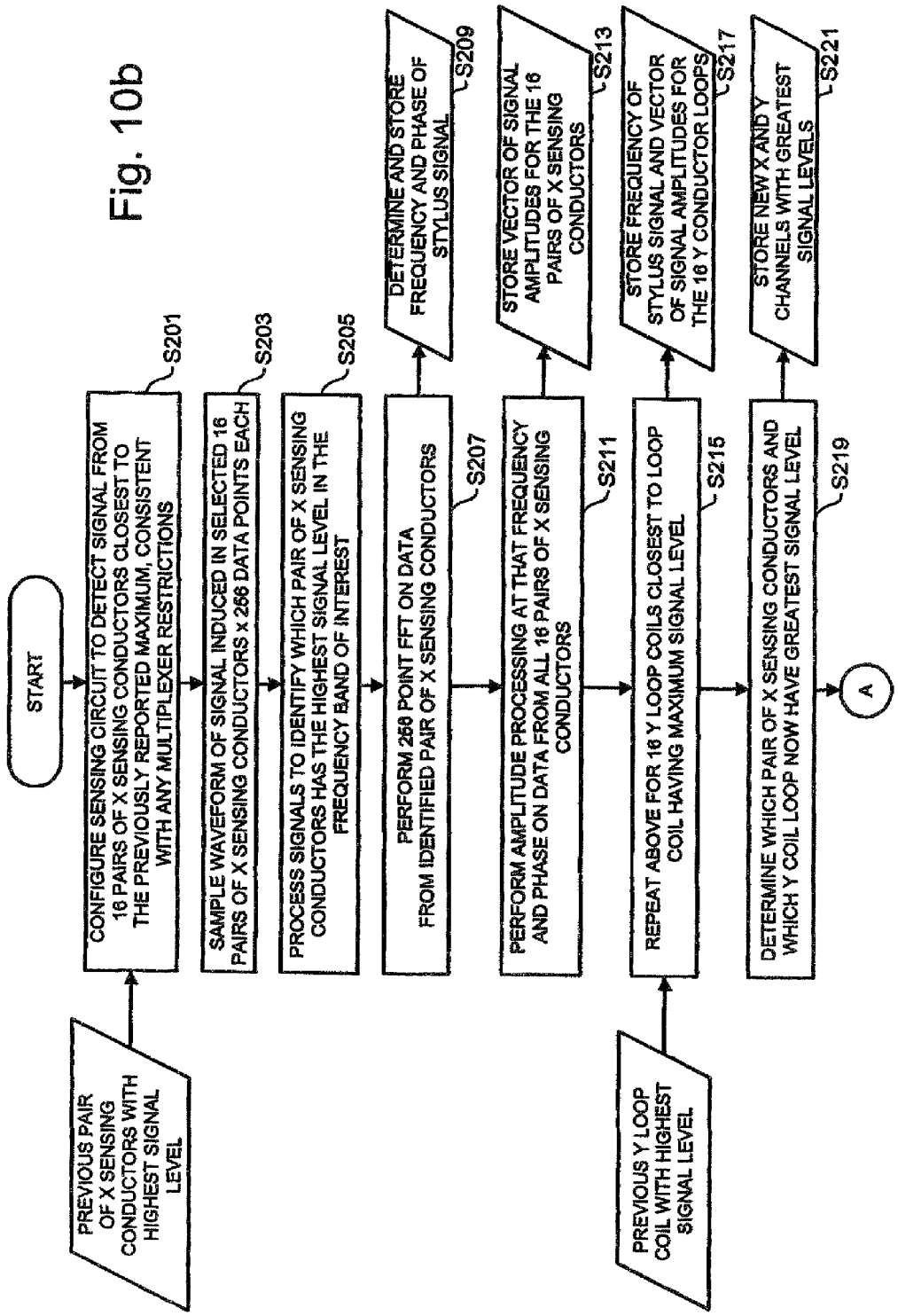

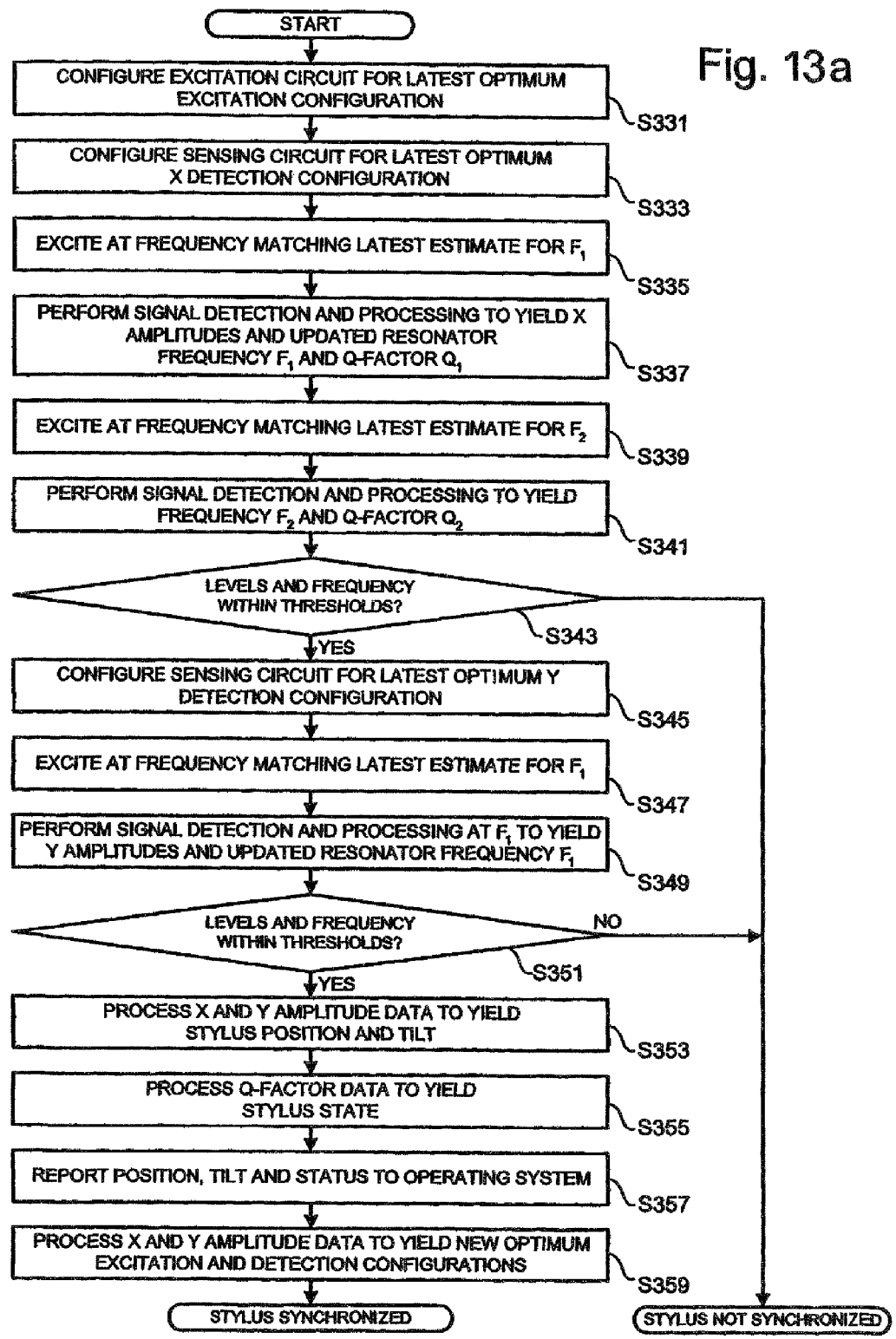

US 8,022,317 B2

DIGITIZER SYSTEM

CROSS-REFERENCE TO RELATED APPLICATIONS

This is a division of application Ser. No. 10/569,445 filed Nov. 13, 2006, now U.S. Pat. No. 7,812,268, which was the U.S. National Stage application of PCT/GB2004/003639 filed Aug. 26, 2004, and which claimed priority rights under 35 U.S.C. §119 based on Great Britain Patent Application No. 0319945.2 filed Aug. 26, 2003, the entire contents of all of which are hereby incorporated by reference.

BACKGROUND

1. Technical Field

The present invention relates to digitizer systems and to parts thereof. The invention has particular relevance to inductive digitizers for use with portable electronic equipment such as a tablet PC, PDA or mobile telephone.

2. Related Art

U.S. Pat. No. 4,878,553 describes an inductive digitizer system having loop coils arrayed in X and Y directions. The digitizer includes an excitation circuit for applying an energizing signal to a selected loop coil for energizing a resonant stylus. Once energized, the resonant stylus emits a response magnetic field which couples back into the loop coils. Processing electronics of the digitizer then process the signals from the loop coils to determine a measurement of the X-Y position of the stylus over the digitizer.

The system described in U.S. Pat. No. 4,878,553 has a number of problems. One problem is that there are a large number of coil crossovers required at the edge of the sensor board. For best accuracy and resolution, the coils should approach the edge of the sensor board as closely as possible. This means that when the loop coils are formed from conductors on printed circuit boards, the PCB geometries (line widths, gaps and via sizes) must be small, yielding an expensive product. The alternative is for these geometries to be large, at the expense of accuracy. Further, in view of the large number of crossovers, there are a relatively large number of connections between the layers of the printed circuit board. Since each connection has a finite chance of failure at manufacture, the manufacturing process must yield high reliability for each such connection, thereby again increasing manufacturing costs.

A further problem with the system described in U.S. Pat. No. 4,878,553 is that typically it draws a relatively high current from its supply, for a given noise level, due to inefficiencies in coil layout and the way in which the coils are energized to energize the resonant stylus.

An aim of the present invention is to address at least one of these problems and to provide an alternative digitizer system or to provide alternative components for use in such a digitizer system.

In the exemplary embodiment described below, a new digitizing system is described having a new arrangement of windings for energizing and sensing the position of a resonant stylus above a working surface thereof. The digitizing system also includes novel excitation and multiplexing circuitry that is used to select a winding to be energized for energizing the resonant stylus. The digitizing system also includes novel processing circuitry that is used to control the operation of the digitizer so that it can operate with different types of stylus.

BRIEF DESCRIPTION OF THE DRAWINGS

Various other aspects of the digitizing system will become apparent from the following detailed description of preferred embodiments in which:

FIG. 4b is a circuit diagram illustrating in more detail the main components of a drive signal generator shown in FIG. 4a;

FIG. 4e is a circuit diagram illustrating in more detail the components of coil select switching circuitry shown in FIG. 4a;

FIG. 5b is a circuit diagram illustrating the main components of one of the multiplexers shown in FIG. 5a;

FIG. 6 is a block diagram illustrating the main components of a digitizer microprocessor shown in FIG. 3a;

FIG. 10a is a flow chart illustrating the processing steps performed by the digitizer microprocessor during a survey for the battery-powered stylus shown in FIG. 7a;

FIGS. 10b and 10c are flow charts illustrating the processing steps performed by the digitizer microprocessor when continuously sensing the status and position of the battery-powered stylus shown in FIG. 7a;

FIG. 11b is a flow chart illustrating the main steps performed to capture the resonant frequency of the resonant stylus during the survey process shown in FIG. 11a;

FIG. 13a is a flow chart illustrating the processing steps carried out by the digitizer microprocessor to continuously track the position and status of the two-resonator stylus shown in FIG. 7d;

EXEMPLARY EMBODIMENT

Overview

Figure 1:
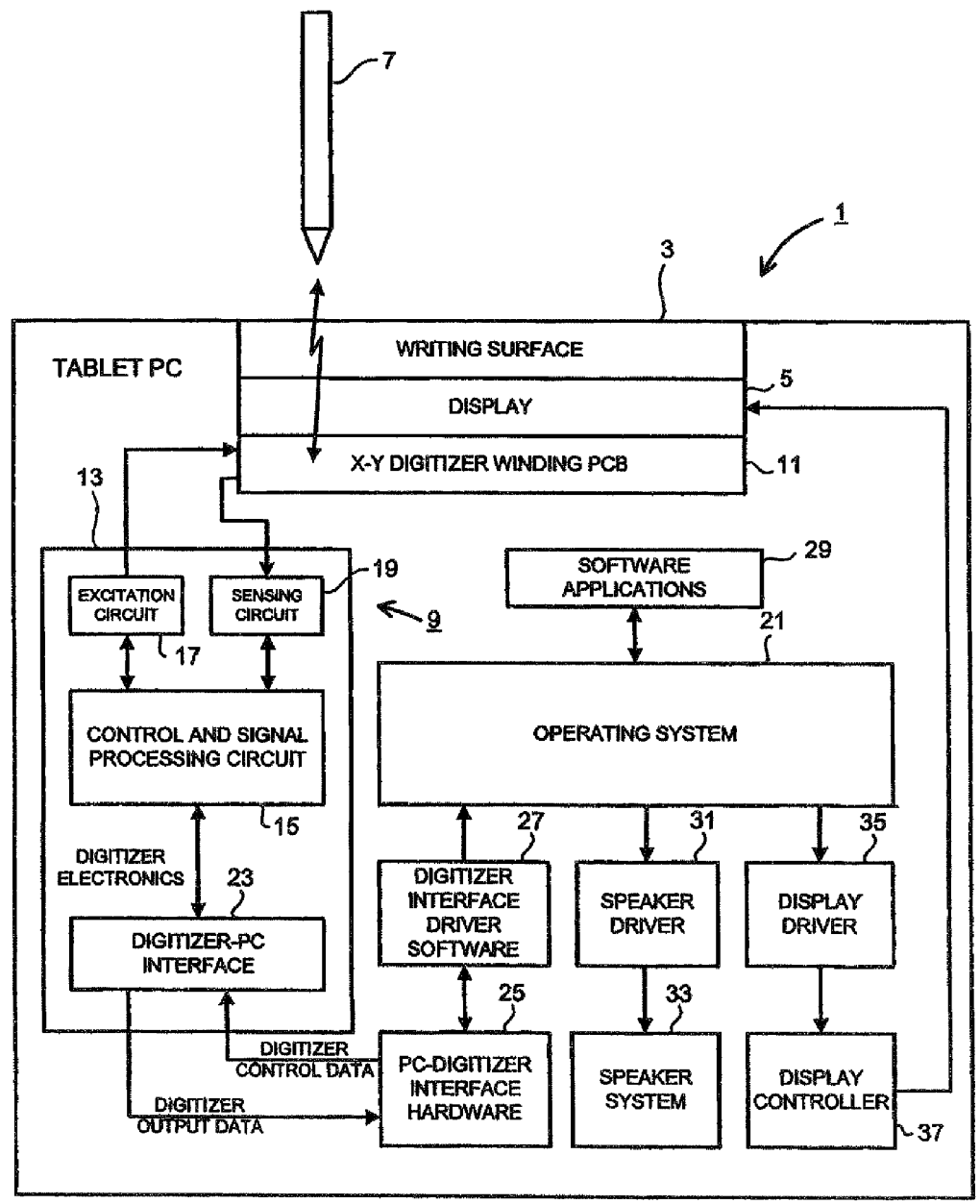
FIG. 1 is a block diagram illustrating the main components of a tablet PC having an X-Y digitizer for sensing the position of a resonant stylus over a writing surface thereof.

FIG. 1 is a schematic block diagram illustrating a battery-powered tablet PC 1 which includes a writing surface 3 over which a user moves a resonant stylus 7. As shown in FIG. 1, the writing surface 3 is provided over a display 5. The tablet PC 1 also includes an X-Y digitizer 9 having an X-Y digitizer winding printed circuit board (PCB) 11 and digitizer electronics 13 (typically mounted on a controller board (not shown) attached to the rear of the PCB 11). As shown in FIG. 1, in this exemplary embodiment, the X-Y digitizer winding PCB 11 is provided under the display 5 and carries X-Y digitizer windings (not shown) for transmitting signals to and for receiving signals from the stylus 7. The digitizer electronics 13 are connected to the windings on the X-Y digitizer winding PCB 11 and control the excitation of those windings and the sensing and processing of signals generated in the windings by the stylus 7.

More specifically, the digitizer electronics 13 includes a control and signal processing circuit 15 which controls an excitation circuit 17 and a sensing circuit 19. The excitation circuit 17 is used to generate an excitation signal which is applied to a selected one or more of the digitizer windings on the PCB 11. The sensing circuit 19 is arranged to detect the signals generated in some or all of the digitizer windings on the PCB 11 and to pass the detected signals to the control and signal processing circuit 15. The control and signal processing circuit 15 then processes the detected signals to determine the current position (X position, Y position and optionally height (Z) above the writing surface 3), tilt and status of the stylus 7. The control and signal processing circuit 15 then reports this current position and status information to the tablet PC operating system 21 via a digitizer-PC interface 23, a PC-digitizer interface hardware 25 and digitizer interface driver software 27. The operating system 21 then makes this position and status information available to the appropriate software applications 29 running on the tablet PC 1.

As shown in FIG. 1, the operating system 21 also passes digitizer control data back to the digitizer electronics 13 to control, for example, the rate at which the control and signal processing circuit 15 reports the position and status of the stylus 7. The operating system 21 also controls a speaker driver 31 for generating appropriate audio signals for output via a speaker system 33. For example, the operating system 21 can control the speaker driver 31 in response to the current stylus position and/or status information received from the digitizer electronics 13, thereby providing audible feedback to the user. The operating system 21 also controls a display driver 35 which in turn generates the appropriate control signals for a display controller 37 which controls the image displayed on the display 5. Again, in this exemplary embodiment, the operating system 21 controls the display driver 35 in accordance with the current stylus position and/or status received from the digitizer electronics 13 in order to provide visual feedback to the user via the display 5.

As will be described in greater detail below, the digitizer system 9 described above includes a novel set of X-Y digitizer windings on the PCB 11 which allows the PCB 11 to be manufactured at low cost while allowing the digitizer electronics to maintain position sensing accuracy. The digitizing system 9 also includes a novel excitation circuit 17 which allows for the efficient driving of the selected digitizer windings on the PCB 11. The control and signal processing circuit 15 also includes novel control software which allows the digitizer 9 to be able to detect and interact with several different types of stylus 7. A more detailed description of these components of the system will now be described.

Digitizer Windings

Figure 2A:
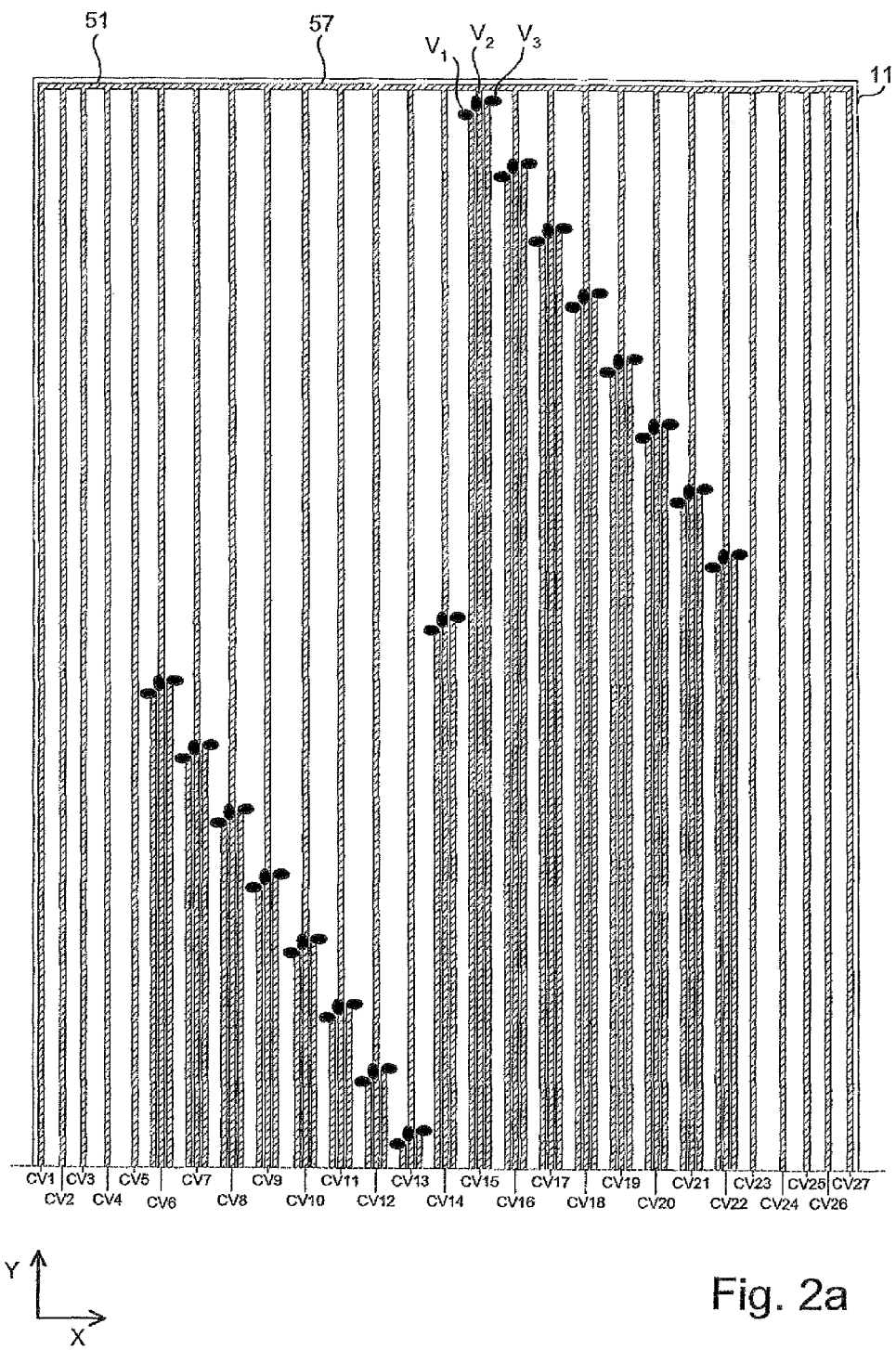
FIG. 2a shows a top layer of conductors of a printed circuit board which forms part of the X-Y digitizer shown in FIG. 1.

In this exemplary embodiment, the digitizer winding PCB 11 is a two-layer PCB for low cost. FIG. 2a illustrates the conductor patterns on the top layer (closest to the display 5) of the X-Y digitizer winding PCB 11 used in this exemplary embodiment. As shown, the top layer of conductors includes a "comb" type winding 51 that is formed by twenty-seven conductors (labelled CV1 to CV27) which extend substantially parallel to each other along the Y direction, which are arrayed along the X direction and which are connected together at one end by the common connecting conductor 57 which extends parallel to the X axis. As will be described in more detail below, when the stylus 7 is placed above the printed circuit board 11 and when it generates an AC magnetic field, it induces EMFs in conductors CV1 to CV27, which EMFs vary in dependence upon the position, tilt and status of the stylus 7. Therefore, the EMFs induced in winding 51 can be used in calculations to determine the position, tilt and status of the stylus 7. In this exemplary embodiment, the winding 51 is also used for energizing the stylus 7 when required.

The use of this type of comb winding 51 offers a number of advantages over the parallel loop coils used in the prior art systems (such as those described in U.S. Pat. No. 4,878,553).

Firstly, since all of the conductors CV1 to CV27 are connected in common by the conductor 57, it is possible to dynamically select the width and the position of an area above the writing surface 3 to be energized. For example, when the position of the stylus 7 is unknown, it is possible to energize a relatively wide area above the writing surface by, for example, applying current between conductors CV5 and CV11. This, therefore, allows the detection of a resonant stylus 7 over a relatively large area. Once the resonant stylus 7 has been detected over the writing surface 3, the efficiency of the excitation can be improved by energizing a narrower area above the writing surface 3 (corresponding to the detected position of the stylus). It is, therefore, possible to detect the presence of the stylus 7 more efficiently (in terms of power consumption and hence battery life) than with the prior art type parallel overlapping loop coils.

A further advantage of the comb-type winding 51 is that there is no need for complex conductor crossovers at the edge of the circuit board 11, thereby minimizing any wasted "dead" space at the edge of the circuit board 11. Further, because there are no crossovers, there is no need for vias at the edge, thereby leading to reduced manufacturing costs and improved manufacturing reliability. Additionally, because the conductor track widths and the distance between them can be quite large, this also leads to lower manufacturing cost and higher yield. Typically, with prior art designs, the track width and spacing have been about 0.15 mm, whereas with the above comb-type winding (which is designed to accommodate connecting conductors between the conductors CV), the track width and spacing can be 0.5 mm or more, while achieving the same position sensing accuracy. Where such connecting conductors are not required, the track widths of the comb winding 51 and the gaps between them can be as large as 1 mm and 4 mm, respectively.

As can be seen from FIG. 2a, the center-to-center distance between the conductors CV1 to CV27 is not uniform across the sensor board 11. In particular, the spacing between the conductors at the left and right edges of the board 11 is smaller than the spacing between the conductors in the center of the board 11. For example, the spacing between conductors CV1 and CV2 is smaller than the spacing between conductors CV11 and CV12. This variation of the spacing between the conductors CV1 to CV27 allows the digitizer 9 to maintain position sensing accuracy (especially at the edge of the circuit board 11) while maximizing conductor widths and spacings. In particular, position sensing accuracy is usually lower at the edge of the printed circuit board 11. Therefore, the smaller spacing at the edges yields a greater number of conductors that can be used to detect stylus position near the edges. As a consequence of the greater information available, the control and signal processing circuit 15 can provide more accurate position estimates for these positions.

Figure 2B:
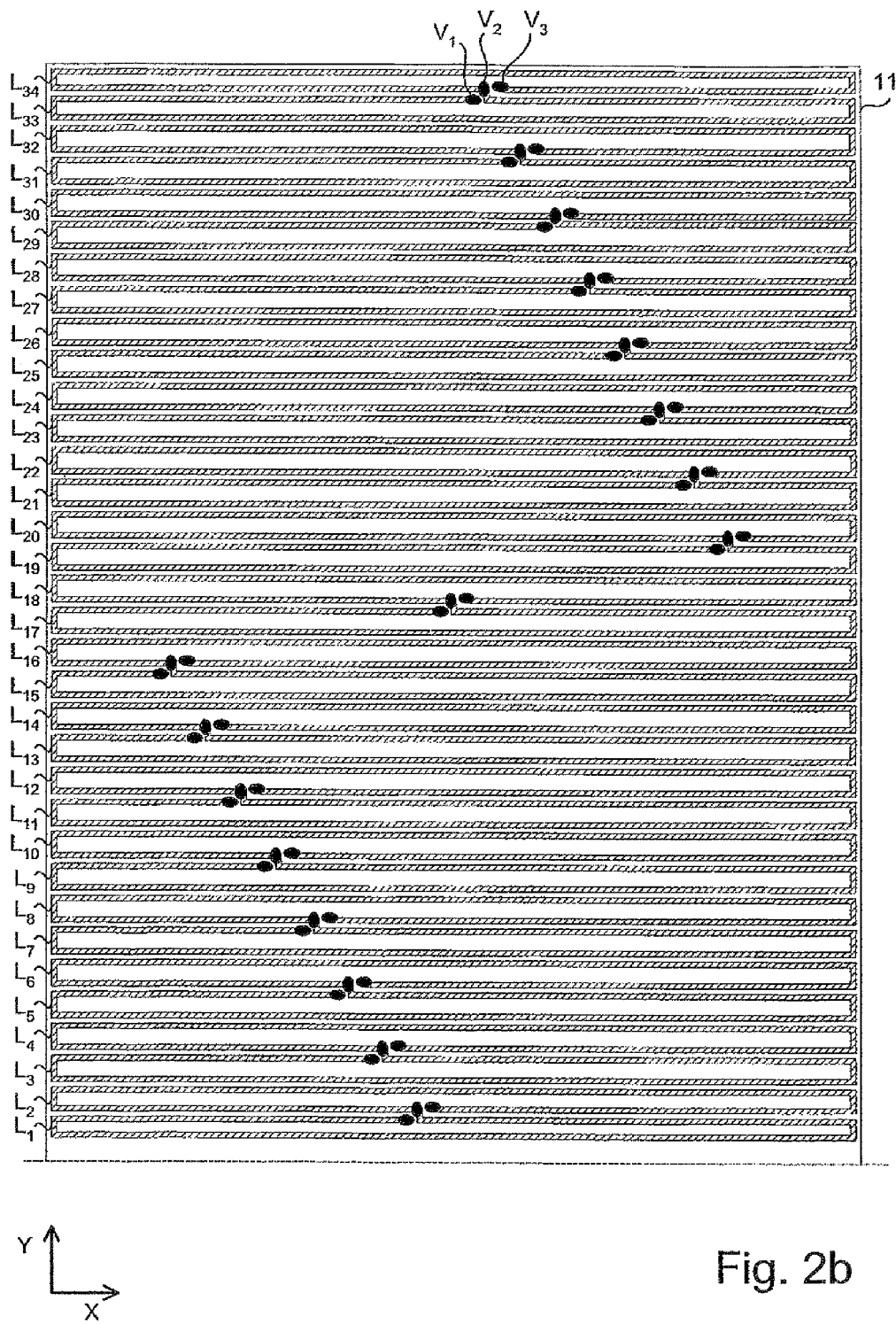
FIG. 2b shows a bottom layer of conductors of a printed circuit board which forms part of the X-Y digitizer shown in FIG. 1.

FIG. 2b illustrates the conductors provided on the bottom layer (furthest from the display 5) of the digitizer winding PCB 11. As illustrated in FIG. 2b, these conductors form thirty four substantially parallel non-overlapping loops (labelled $L_1$ to $L_{34}$) which extend along the X direction and which are arrayed side by side along the Y direction. As will be described in more detail below, the signals from conductor loops $L_1$ to $L_{34}$ are also used to determine the position of the stylus 7. In particular, when the stylus 7 is above the printed circuit board 11 and when the stylus 7 generates an AC magnetic field, it induces EMFs in the conductor loops $L_1$ to $L_{34}$, which EMFs vary with the position of the stylus 7 relative to the sensor board 11. Therefore, by measuring and comparing the EMFs induced in some or all of the conductor loops $L_1$ to $L_{34}$, the control and signal processing circuit 15 can determine the position of the stylus 7 over the PCB 11.

Figure 2C:
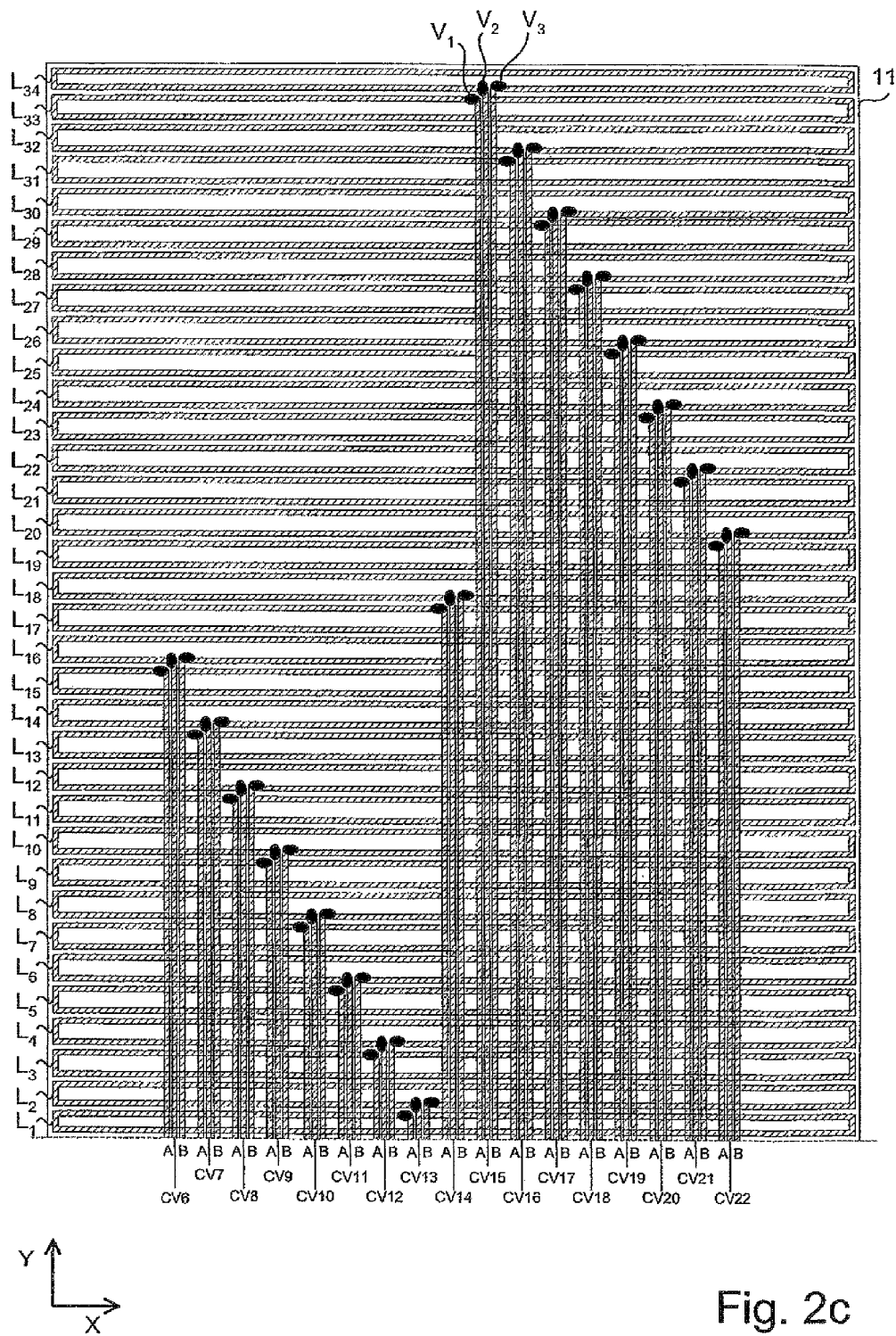
FIG. 2c shows the conductors of the printed circuit board which form the Y direction digitizer windings of the X-Y digitizer.

Connections to the conductor loops $L_1$ to $L_{34}$ can be made at any convenient point on the loop, in order to connect the loops back to the digitizer electronics 13. In this exemplary embodiment, these connections are provided by conductors on the top layer of the PCB 11 (shown in FIG. 2a) which are connected to the conductor loops $L_1$ to $L_{34}$ at the vias which are represented in FIG. 2 by the oval shaped black dots. The conductor loops $L_1$ to $L_{34}$ and their connecting conductors are shown together in FIG. 2c. As shown in FIG. 2c, all of the connecting conductors extend substantially parallel to each other along the Y direction, with the connecting conductors for each loop running as close as possible next to each other. For example, loop $L_{34}$ is connected to the digitizer electronics 13 by conductor CV15 and conductor CV15B which extend from vias $V_2$ and $V_3$ respectively. Similarly, conductor loop $L_{33}$ is connected to the sensing circuit 19 by conductors CV15 and CV15A which connect to conductor loop $L_{33}$ at vias $V_2$ and $V_1$ respectively. As shown in FIG. 2c, similar connections are provided for the other conductor loops $L_1$ to $L_{34}$.

As is apparent from FIG. 2c, adjacent pairs of conductor loops (e.g., loops $L_{33}$ and $L_{34}$) share a common return path to the digitizer electronics 13 using one of the X position sensing conductors (in the above example conductor CV15). This arrangement minimizes the number of vias required and the number of connecting conductors that have to be provided back to the digitizer electronics 13. Additionally, as will be described in more detail below, the sensing circuit 19 includes differential signal processing circuits which remove any common mode signal. In particular, since conductors CV15 and CV15B run parallel and very close to each other, they will both experience the same magnetic field and, therefore, any EMF induced in these conductors will cancel each other out in the differential processing circuits, leaving just the EMF induced in the conductor loop $L_{34}$.

As shown in FIGS. 2b and 2c, in this exemplary embodiment, the areas enclosed by the conductor loops $L_1$ to $L_{34}$ are not the same. In particular, the areas enclosed by the conductor loops at the top and bottom edges are smaller than the areas enclosed by the conductor loops in the center of the printed circuit board 11. For example, the area enclosed by conductor loop $L_1$ is smaller than the area enclosed by conductor loop $L_{16}$. As with the conductors CV1 to CV27, the smaller areas at the edges allow the digitizer 9 to maintain position sensing accuracy at these edges.

Figure 2D:
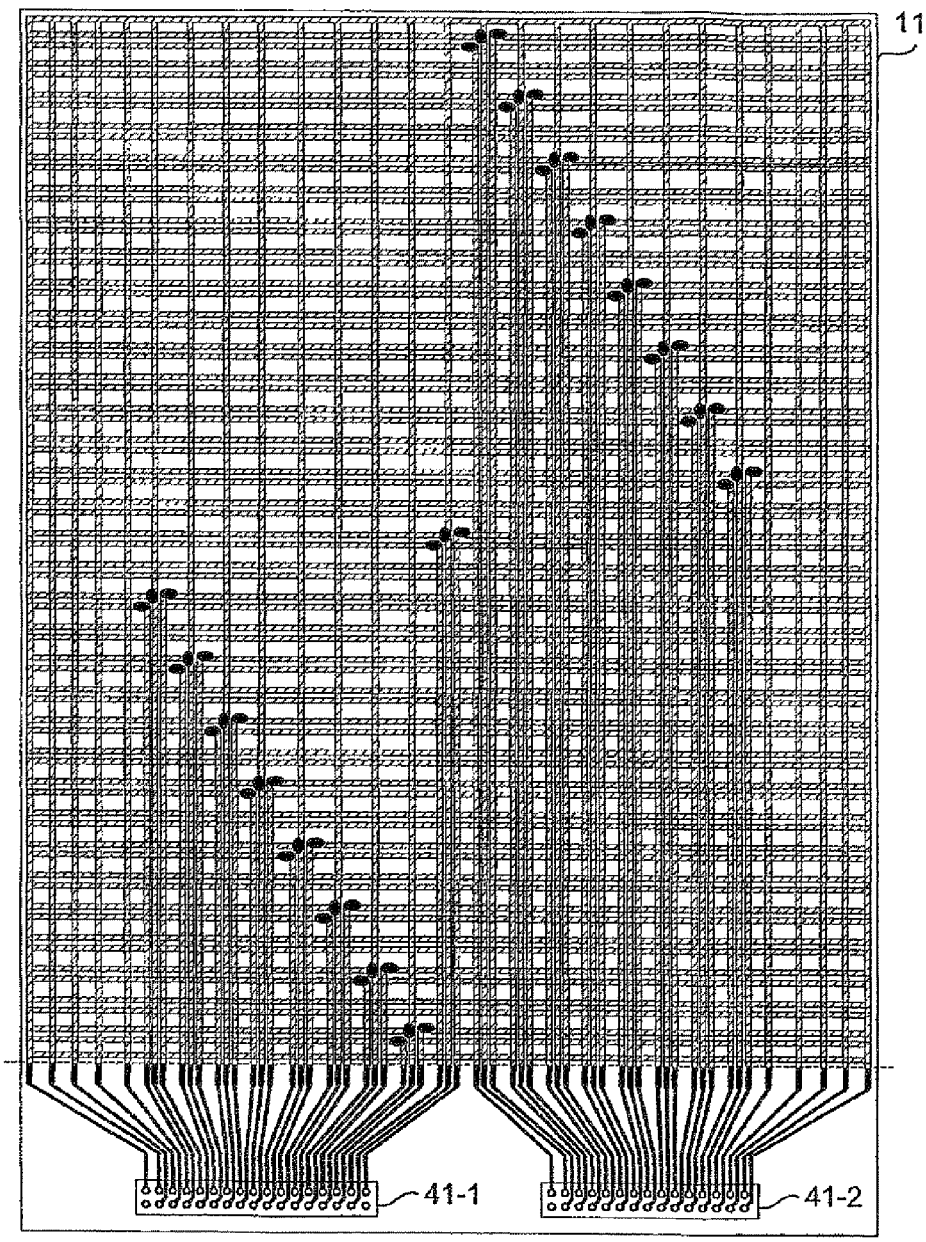
FIG. 2d shows the conductors on both layers of the printed circuit board of the X-Y digitizer.

One advantage of using the combination of a comb-type winding 51 and the separate conductor loops $L_1$ to $L_{34}$ is that all of the connections for connecting the windings to the digitizer electronics 13 can be made at one edge of the printed circuit board 11. This is illustrated in FIG. 2d which shows the conductors on both layers of the PCB 11 and which illustrates the connection of those conductors to connection pads 41-1 and 41-2 for connection to the digitizer electronics 13. Had two comb-type windings 51 been used then either connections would have to be made at two edges of the printed circuit board 11 or space would have to be provided at one edge of the printed circuit board 11 to run connecting conductors to the other edge.

As will be apparent to those skilled in the art, one of the advantages of the digitizer winding design shown in FIG. 2 is the PCB geometries that are used. In particular, only a few via holes are required and their size can be relatively large. Additionally, the gaps between the conductors are relatively large and the conductors themselves are relatively wide. As a result, it is possible to manufacture the digitizer winding PCB 11 at relatively low cost and with high reliability.

Digitizer Electronics

Figure 3A:
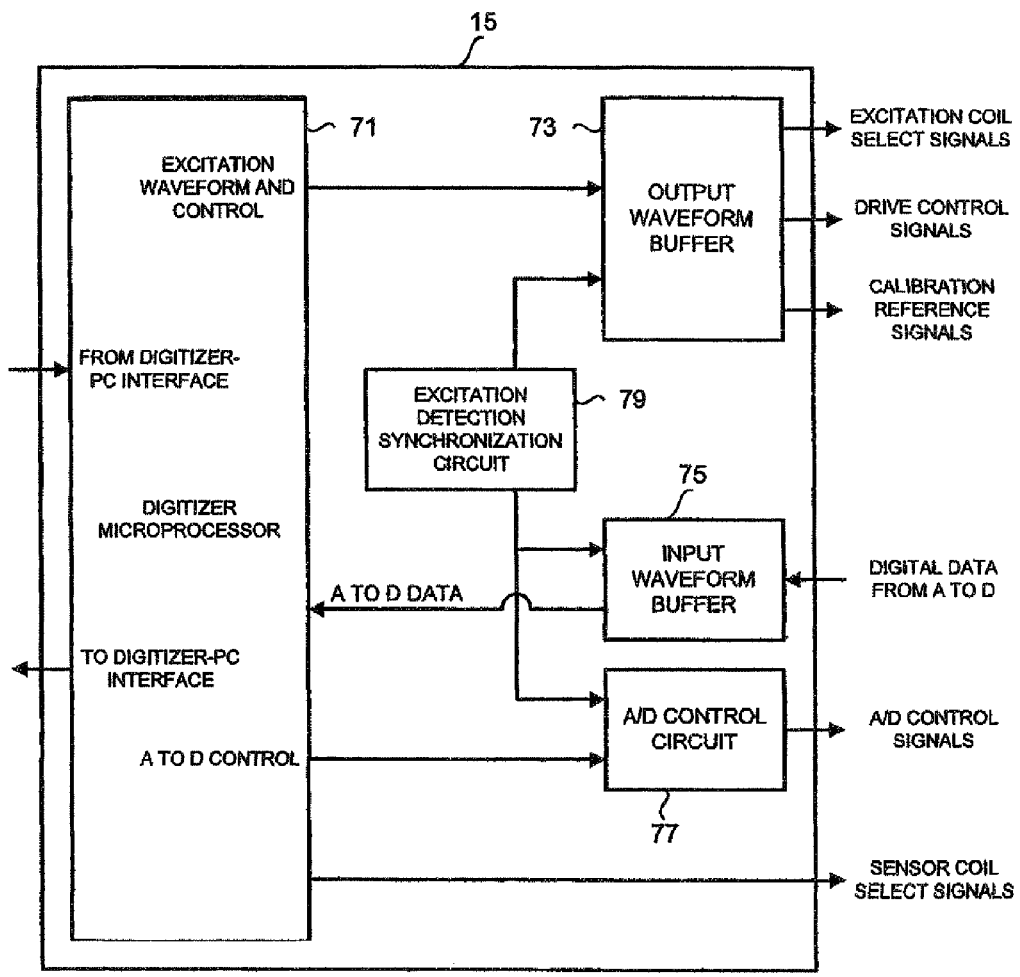
FIG. 3a is a block diagram illustrating the main components of a control and signal processing circuit forming part of the digitizer electronics shown in FIG. 1.

FIG. 3a is a block diagram illustrating the main components of the control and signal processing circuit 15 shown in FIG. 1. As shown, the control and signal processing circuit 15 includes a digitizer microprocessor 71 which controls the digitizer electronics 13 and which processes the received signal values to determine the position and status of the stylus 7 over the PCB 11 and hence over the writing surface 3 and display 5. As shown, the digitizer microprocessor 71 generates appropriate excitation waveform and control signals which it outputs to an output waveform buffer 73, where they are stored until they are output to control the operation of the excitation circuit 17. As shown in FIG. 3a, the excitation control signals include excitation coil select signals for selecting the conductors (CV1 to CV27) that will receive the excitation current. The excitation control signals also include drive control signals which are used to control the excitation circuit 17 in order to generate the desired excitation signal. Finally, the excitation control signals include calibration reference signals which are used to fine tune the excitation circuit 17 to maximize its drive efficiency at the desired excitation frequency and for the selected digitizer conductors.

As shown in FIG. 3a, the control and signal processing circuit 15 also includes an input waveform buffer 75, which operates to receive the digital data output by the sensing circuit 19 and digital feedback data from the excitation circuit 17. This digital data is stored in the input waveform buffer 75 until they are required by the digitizer microprocessor 71 for processing.

The digital microprocessor 71 also controls an A/D control circuit 77. As will be described in more detail below, the sensing circuit 19 includes a plurality of parallel processing channels and the A/D control circuit 77 outputs control signals to select which one of the processing channels is connected to the A/D converter in the sensing circuit 19. The A/D control circuit 77 also outputs a sample control signal which is used to control the triggering of sample and hold circuits (not shown) which are also provided in the sensing circuit 19.

The digitizer microprocessor 71 also outputs sensor coil select signals for selecting which ones of the digitizer conductors (CV1 to CV27 and $L_1$ to $L_{34}$) are to be connected to the processing channels of the sensing circuit 19.

In this exemplary embodiment, when the stylus 7 includes a resonator, the digitizer electronics 13 is arranged to apply a burst of excitation signal to the selected conductors on the digitizer winding PCB 11 and then, after the burst of excitation signal has ended, to process the signals generated in the selected digitizer windings. This type of processing is referred to as "pulse echo" and works because the resonator in the stylus 7 continues to resonate for a period of time after the excitation signal has ended. This type of pulse echo processing is preferred (although not essential) because it avoids errors caused by direct breakthrough between the windings used for excitation and the windings used for sensing as well as errors caused by any other coupling between the excitation and sensing circuitry.

Figure 3B:
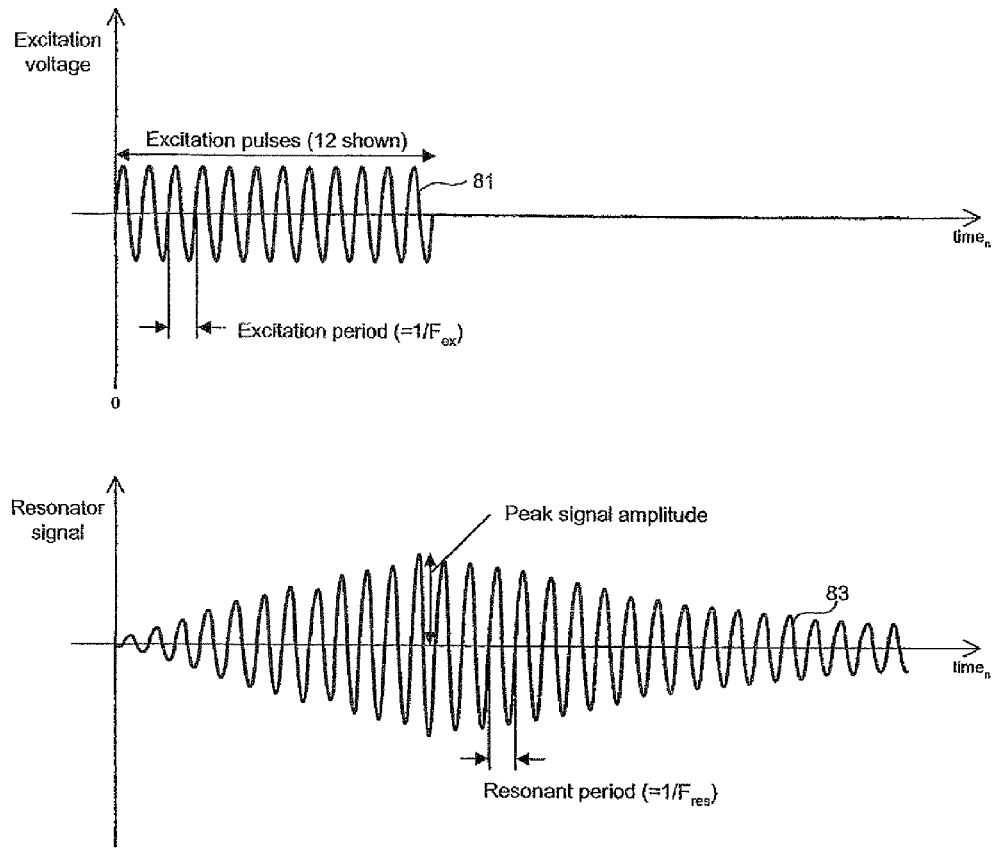
FIG. 3b is a signal plot showing an excitation signal which is applied to a selected one of the sensor board windings and showing the form of a signal generated by a resonant stylus in response.

FIG. 3b is a time plot illustrating the form of a burst of excitation signal 81 which, in this example, includes twelve cycles of the excitation signal; and illustrating the signal 83 generated in a resonator of the stylus 7 as a result of the excitation signal 81. As shown, the resonator signal 83 typically builds up to a peak when the excitation signal ends and then decays with time when the excitation signal is removed. During excitation, the resonator signal 83 oscillates at approximately the excitation frequency ($F_{ex}$), even when this differs from the resonant frequency ($F_{res}$) of the resonator. After excitation ends, the resonator rings down while oscillating at the resonant frequency ($F_{res}$). As is well known, maximum energy transfer between the excitation winding and the resonant stylus 7 is achieved when the frequency of the excitation signal ($F_{ex}$) is the same as the resonant frequency ($F_{res}$) of the resonator.

As shown in FIG. 3a, the control and signal processing circuit 15 includes an excitation-detection synchronisation circuit 79 which controls the output waveform buffer 73 so that the excitation signal is generated for the required period of time. The excitation-detection synchronisation circuit 79 also controls the A/D control circuit 77 to ensure that the signals induced in the sensor windings are only converted into digital data after the excitation signal 81 has ended. The excitation-detection synchronisation circuit 79 also controls the input waveform buffer 75 to control the timing at which the data stored in this buffer is passed to the digitizer microprocessor 71. The excitation-detection synchronisation circuit 79 is controlled by the digitizer microprocessor 71 and, therefore, knows when the excitation signal is being generated and when the data from the sensor windings will be ready for processing.

Excitation Circuit

Figure 4A:
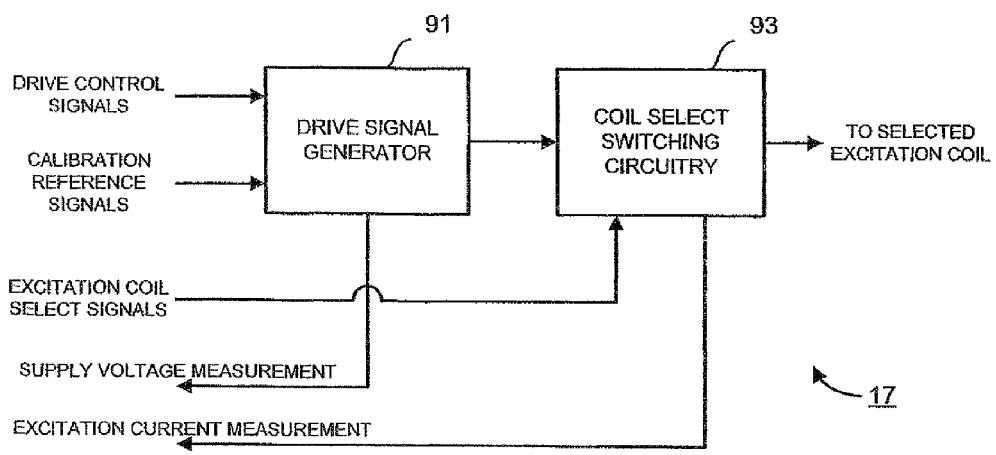
FIG. 4a is a block diagram illustrating the main components of an excitation circuit forming part of the digitizer electronics shown in FIG. 1.

FIG. 4a is a block diagram illustrating the main components of the excitation circuit 17 used in this exemplary embodiment. As shown, the excitation circuit 17 includes a drive signal generator 91 which receives the drive control signals and the calibration reference signals from the control and signal processing circuit 15 and which generates an excitation signal at the appropriate frequency for application to the selected conductors of the digitizer winding 51. The excitation circuit 17 also includes coil select switching circuitry 93 which selects the conductors of the digitizer winding 51 to which the excitation signal will be applied. As shown, the coil select switching circuitry 93 makes this selection based on the excitation coil select signals received from the control and signal processing circuit 15.

As shown in FIG. 4a, the drive signal generator 91 and the coil select switching circuitry 93 feed back measurements of the supply voltage and the excitation current to the control and signal processing circuit 15 so that it can dynamically change the drive control signals in order to try to maintain the amplitude of the excitation current at a desired level.

Drive Signal Generator

Figure 4B:
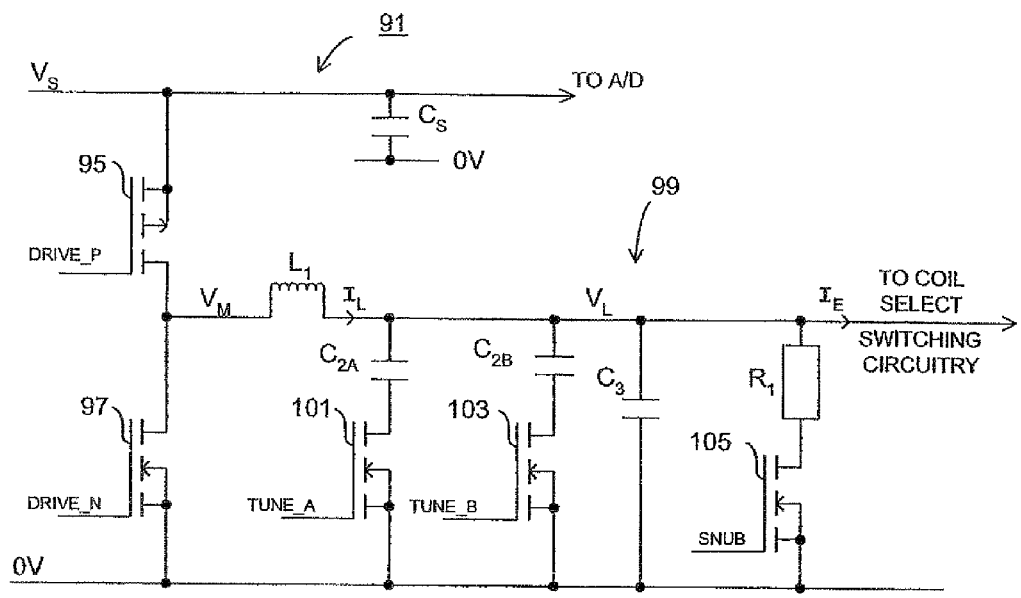

FIG. 4b is a circuit diagram illustrating a preferred form of the drive signal generator 91 used in this exemplary embodiment. As shown, the drive signal generator 91 includes two MOSFET switches 95 and 97 which are connected in series between a supply voltage $V_s$ (which in this exemplary embodiment is 3 volts) and ground (0v). In this exemplary embodiment, MOSFET 95 is a P-type MOSFET and MOSFET 97 is an N-type MOSFET. As shown in FIG. 4b, the gates of MOSFETs 95 and 97 are controlled by drive_P and drive_N control signals, which operate to switch the MOSFETs 95 and 97 on and off respectively. Drive_P and drive_N are two of the drive control signals received from the control and signal processing circuit 15. In this exemplary embodiment, drive_P and drive_N are arranged to operate so that when MOSFET 95 is switched on, MOSFET 97 is switched off and vice versa. Therefore, when MOSFET 95 is switched on $V_m$ will be raised to the supply voltage $V_s$ and when MOSFET 97 is switched on, $V_m$ will be pulled down to ground. In this exemplary embodiment, the drive control signals (drive_P and drive_N) are arranged so that voltage $V_m$ includes a periodic sequence of double pulses whose period corresponds to the reciprocal of the desired excitation frequency.

Figure 4C:
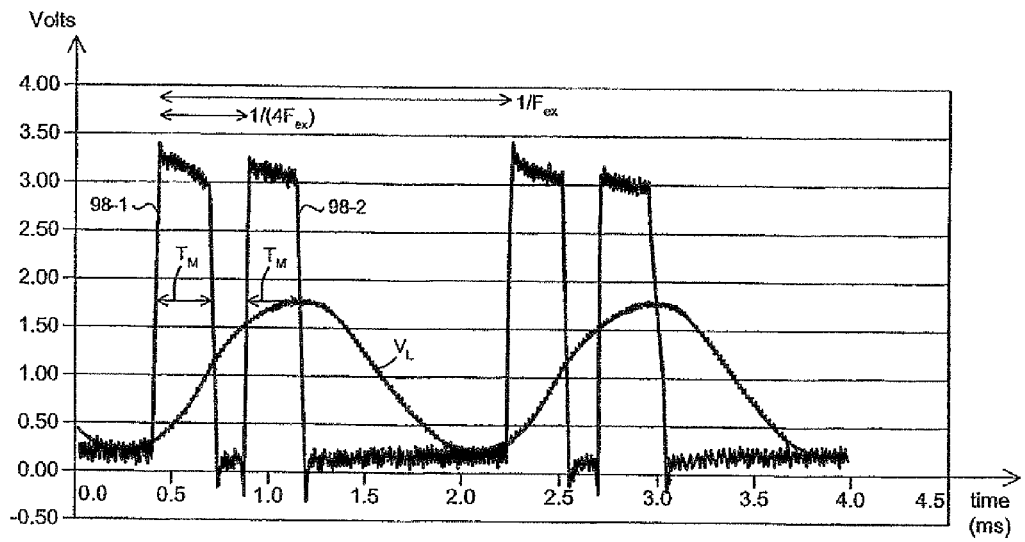
FIG. 4c is a signal plot illustrating the form of voltage signals at different points of the drive signal generator circuit shown in FIG. 4b.

FIG. 4c is a voltage plot illustrating the form of the voltage $V_m$ generated in this exemplary embodiment. As mentioned above and as shown, voltage $V_m$ includes a repeating sequence of double pulses 98-1 and 98-2, with the period between the double pulses 98 being equal to $1/F_{ex}$ and with the time between each pulse of a double pulse being $\frac{1}{4}F_{ex}$. In this exemplary embodiment, double pulses 98 are generated with this spacing in order to minimize second harmonic generation (i.e., frequency components in the excitation signal having a frequency of $2F_{ex}$). As those skilled in the art will appreciate, the period between double pulses and the time between pulses in a pair might not be exactly equal to $1/F_{ex}$ and $\frac{1}{4}F_{ex}$ respectively. For example, if $\frac{1}{4}F_{ex}$ is not an integer number of digitizer clock cycles, then those timings might be made to vary by 1 clock cycle between successive periods.

Returning to FIG. 4b, the voltage $V_m$ generated by switching the MOSFETs 95 and 97 on and off is applied to an inductor-capacitor filter network 99 which removes the high frequency components of $V_m$, to generate a filtered excitation voltage ($V_L$) at the excitation frequency ($F_{ex}$) which, as will be described below, is applied to the selected conductors of digitizer winding 51. FIG. 4c also shows this filtered excitation voltage $V_L$.

As will be apparent to those skilled in the art, the control and signal processing circuit 15 can control the frequency ($F_{ex}$) of the excitation voltage $V_L$ by controlling the frequency with which drive_P and drive_N are changed. The control and signal processing circuit 15 can also control the amplitude of the excitation voltage $V_L$ (and hence the amplitude of the excitation current) by varying the duration of the drive_P and drive_N pulses, thereby controlling the duration $T_m$ of the voltage pulses 98.

In this exemplary embodiment, the filtering network 99 includes capacitors $C_{2A}$, $C_{2B}$ and $C_3$ which are used to make the circuit resonant with the connected load (i.e., with the coil formed by the selected conductors of the digitizer winding 51) at a frequency approximately corresponding to the excitation frequency, thereby making the drive signal generator 91 more efficient. As mentioned above, the excitation circuit 17 can connect to different conductors (CV) of the digitizer winding 51 to excite different width coils. The different width of the coils means that they will have different inductances. Therefore, the resonant characteristics of the drive signal generator 91 when connected to the digitizer winding 51 will depend on to which conductors of the winding 51 the excitation circuit 17 is attached (which conductors will hereinafter be referred to as the excitation configuration). To account for this variability (and to account for the variability of excitation frequency which can be generated), the capacitors $C_{2A}$ and $C_{2B}$ can be switched in and out of the circuit by the MOSFETs 101 and 103 respectively, which are controlled by the control signals tune_A and tune_B.

Figure 4D:
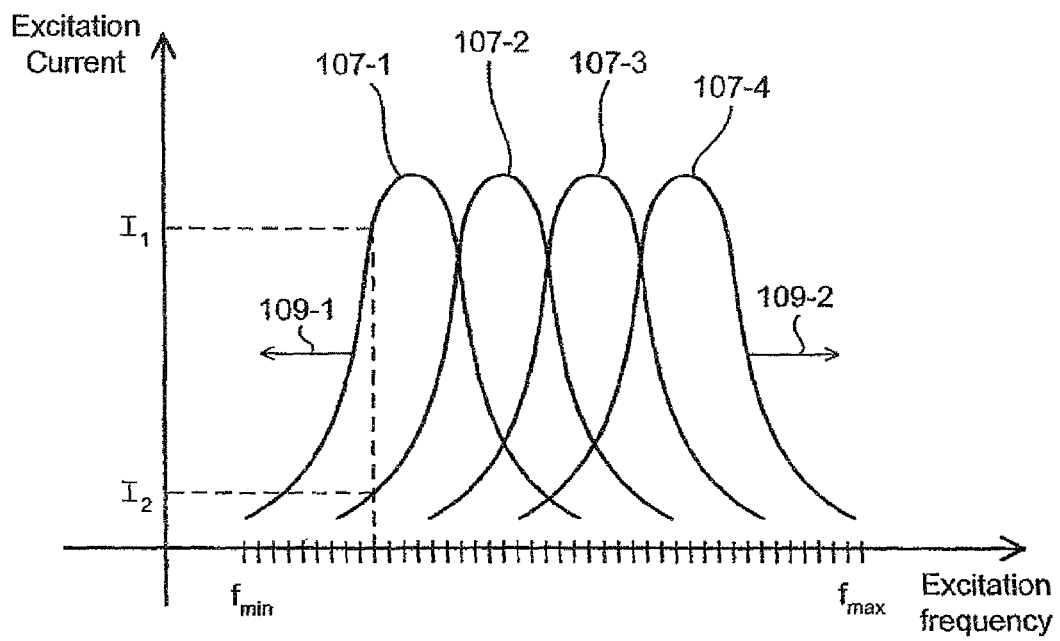
FIG. 4d is a plot illustrating the resonant characteristics of the drive signal generator circuit shown in FIG. 4b, for different configurations of the circuit.

In this exemplary embodiment, as there are two capacitors that can be switched in and out, the drive signal generator 91 has four different resonant characteristics to choose from for a given excitation configuration. This is illustrated in FIG. 4d, which is a plot showing the four different resonant frequency characteristics 107-1 to 107-4 of the drive signal generator 91. Plot 107-1 is selected by turning off both MOSFETs 101 and 103; plot 107-2 is selected by turning MOSFET 101 on and MOSFET 103 off; plot 107-3 is selected by turning MOSFET 101 off and MOSFET 103 on; and plot 107-4 is selected by turning on both MOSFETs 101 and 103. The arrows 109-1 and 109-2 shown in FIG. 4d represent that the characteristics 107 can move along the frequency axis, depending on the currently selected excitation configuration.

The tune_A and tune_B signals that are used to control the MOSFETs 101 and 103 are the calibration reference signals that are received from the control and signal processing circuit 15. The values that these signals take for a given excitation configuration and excitation frequency are determined in advance during the following calibration procedure:

Initially, determine a set of desired excitation configurations. (This is likely to be a subset of all possible excitation configurations that can be achieved between the excitation circuit 17 and the digitizer windings.) Then, for each of those excitation configurations, choose a set of excitation frequencies. For example, the frequencies between $f_{min}$ and $f_{max}$ represented in FIG. 4d by the vertical lines that cross the frequency axis. Then, apply an excitation signal at each of those frequencies (in turn) to each desired excitation configuration (in turn) with different values of the control signals tune_A and tune_B, and measure the peak excitation current for each combination (to give, for example, $I_1$ and $I_2$ shown in FIG. 4d). The best values of tune_A and tune_B for a given excitation configuration and frequency are then determined by comparing the measured peak excitation currents obtained for that configuration for the different values of tune_A and tune_B, and in particular by identifying which values of tune_A and tune_B resulted in the largest peak excitation current. The values for tune_A and tune_B that are obtained are then stored for that configuration (together with the corresponding peak current that was measured during the calibration procedure) in the control and signal processing circuit 15 for subsequent use in selecting appropriate values for tune_A and tune_B for a current excitation frequency and a current excitation configuration.

As those skilled in the art will appreciate, if during normal use, the current excitation frequency is not one from the set of frequencies used during the calibration procedure, then the microprocessor 71 can determine appropriate values for tune_A and tune_B from those stored for the nearest one or more calibration frequencies. Similarly, if the current excitation configuration is not one of the set used during calibration, then the microprocessor 71 can determine appropriate values for tune_A and tune_B from those stored for one or more similar excitation configurations.

During this calibration routine, the control and signal processing circuit 15 outputs drive control signals that cause the drive signal generator 91 to generate the above described periodic train of double pulses 98 at the appropriate period for the desired excitation frequency. In this exemplary embodiment, during this calibration procedure, the pulse width $T_M$ of these pulses 98 is set at a fixed calibration value. This allows the control and signal processing circuit 15 to determine, during normal use, the pulse width to use for a current configuration to achieve desired peak amplitude of excitation current, by using the stored peak current that was measured for that configuration during the calibration procedure. In particular, since the peak excitation current that is output by the excitation circuit 17 is proportional to the width of the pulses 98 that are generated by the drive signal generator 91, the pulse width to use to achieve a desired peak current can be determined by taking the ratio of the desired peak current and the stored peak current for that configuration and then by multiplying the calibration pulse width with the calculated ratio.

Returning to FIG. 4b, the filter network 99 also includes a resistor $R_1$ which is connected to ground through another MOSFET 105. The MOSFET 105 is controlled by a "snub" control signal which forms part of the drive control signals received from the control and signal processing circuit 15. The control and signal processing circuit 15 outputs the appropriate snub control signal to the MOSFET 105 so that when the excitation signal is to end, MOSFET 105 is switched on, thereby connecting resistor $R_1$ to ground, which in turn diverts the excitation current ($I_E$) to ground.

As discussed above, in this exemplary embodiment, the level of the supply voltage $V_s$ is monitored by the control and signal processing circuit 15. This is achieved by measuring the voltage drop across a capacitor $C_s$ using an analogue to digital converter (not shown).

Coil Select Switching Circuitry

Figure 4F:
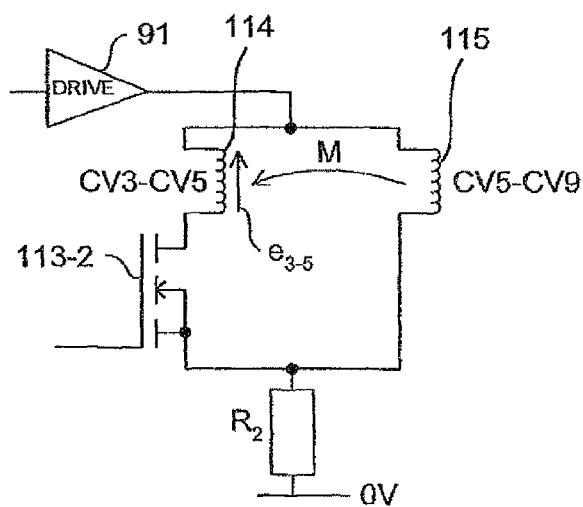
FIG. 4f is a simplified circuit diagram illustrating the operation of the coil select switching circuitry shown in FIG. 4e.
Figure 4E:
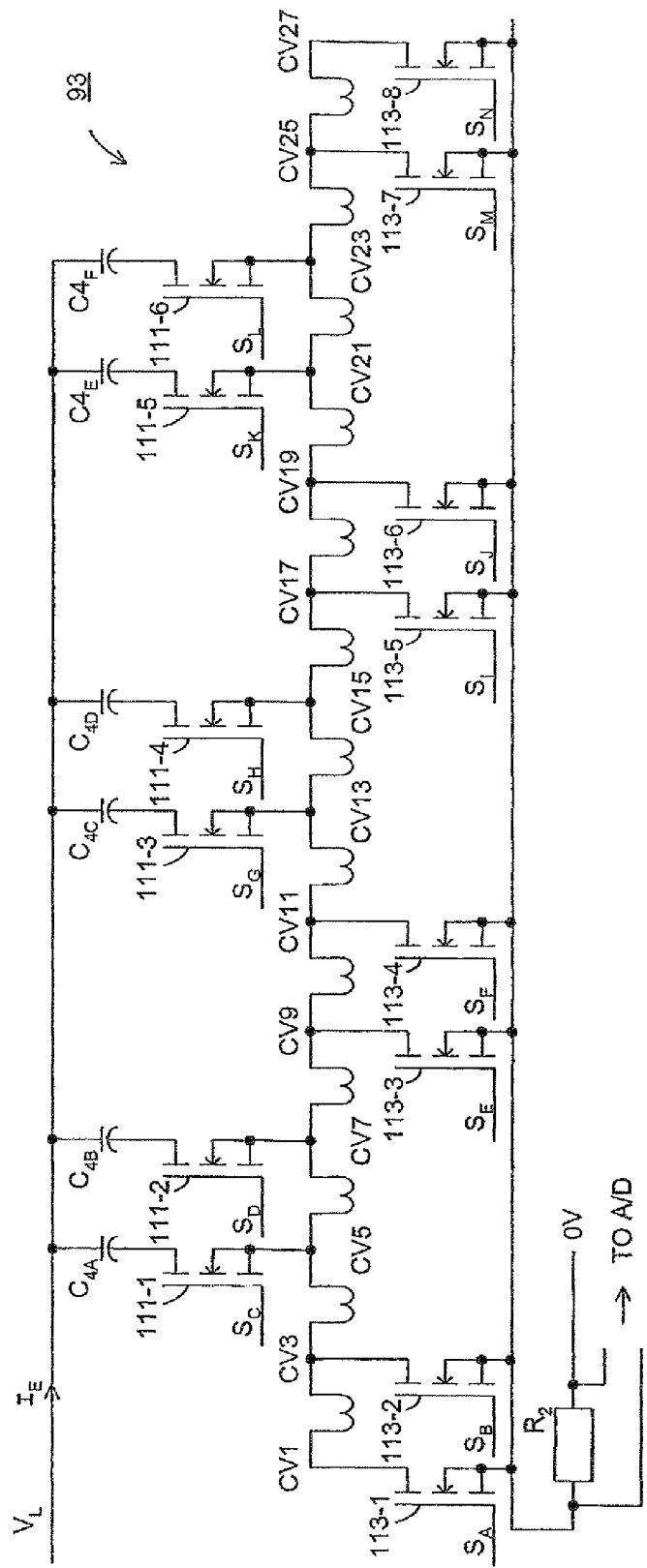

FIG. 4e is a circuit diagram illustrating the coil select switching circuitry 93 used in this exemplary embodiment and illustrating the way in which the switching circuitry 93 is connected to some of the conductors of the digitizer winding 51 shown in FIG. 2a. As shown, the coil select switching circuitry 93 includes a first set of MOSFET switches 111-1 to 111-6 which are connected in parallel to conductors CV5, CV7, CV13, CV15, CV21 and CV23 respectively. In particular: the source of MOSFET 111-1 is connected to conductor CV5; the source of MOSFET 111-2 is connected to conductor CV7; the source of MOSFET 111-3 is connected to conductor CV13; the source of MOSFET 111-4 is connected to conductor CV15; the source of MOSFET 111-5 is connected to conductor CV21; and the source of MOSFET 111-6 is connected to conductor CV23.

The coil select switching circuitry 93 also includes a second set of MOSFET switches 113-1 to 113-8 which are each connected between one of the conductors of the digitizer winding 51 shown in FIG. 2a and ground via resistor $R_2$. In particular: the drain of MOSFET 113-1 is connected to conductor CV1; the drain of MOSFET 113-2 is connected to conductor CV3; the drain of MOSFET 113-3 is connected to conductor CV9; the drain of MOSFET 113-4 is connected to conductor CV11; the drain of MOSFET 113-5 is connected to conductor CV17; the drain of MOSFET 113-6 is connected to conductor CV19; the drain of MOSFET 113-7 is connected to conductor CV25; and the drain of MOSFET 113-8 is connected to conductor CV27.

The first set of switches 111 are used to control the connection of the corresponding conductor (CV) to the excitation voltage ($V_L$) through a respective DC blocking capacitor $C_{4A}$ to $C_{4F}$. The second set of switches 113 are used to control the connection of the corresponding conductor (CV) to ground through the resistor $R_2$. As shown in FIG. 4e, the gates of the switches 111 and 113 receive control signals $S_A$ to $S_N$, which are the excitation coil select signals received from the control and signal processing circuit 15. In this exemplary embodiment, the control signals $S_A$ to $S_N$ are used to open or close the corresponding switch. Therefore, by appropriate selection of the excitation coil select signals ($S_A$ to $S_N$), the control and signal processing circuit 15 can control which conductors (CV) of the digitizer winding 51 receive the excitation signal. For example, if switches 111-6 and 113-8 are both switched on (while the others are switched off), then the excitation signal will be applied to conductors CV23 and CV27.

Further, since all of the conductors CV1 to CV27 are connected together by the connecting conductor 57 shown in FIG. 2a, it is possible to use the coil select switching circuitry shown in FIG. 4e to apply the excitation signal to one or more of conductors CV5, CV7, CV13, CV15, CV21 or CV23 and one or more of conductors CV1, CV3, CV9, CV11, CV17, CV19, CV25 or CV27. For example, by switching on switches 111-1 and 113-5, the excitation signal will be applied to conductors CV5 and CV17. As a result, it is possible to dynamically vary the width of the area above the writing surface 3 which receives the excitation signal. This is important for power consumption since it is wasteful to excite a relatively large area all the time. For example, when the position of the stylus 7 is not known, the excitation signal may be applied to conductors (CV) which are relatively far apart (e.g., conductors CV5 and CV17) in order to maximize the area above the writing surface 3 being energized; and then, once the position of the resonant stylus 7 has been approximated, to apply the excitation signal to conductors which are relatively close together (e.g., conductors CV7 and CV11) and which are close to the approximate position of the stylus 7.

As those skilled in the art will appreciate, not all of the conductors (CV) of the digitizer winding 51 are connected to the excitation circuit 17. This is because it is not essential to do so. All that is required is that the excitation signal can be applied to appropriate conductors that will allow the detection of a resonant stylus 7 above the entire writing surface 3 of the tablet PC 1. The particular conductors discussed above constitute one set that can be used to achieve this result. Other sets of conductors can of course achieve the same result.

As mentioned above, in this exemplary embodiment, the coil select switching circuitry 93 returns a measurement of the excitation current ($I_E$) to the control and signal processing circuit 15. In this exemplary embodiment, this measurement is obtained by digitizing the voltage drop across resistor $R_2$, which is proportional to the excitation current.

As discussed above, in this exemplary embodiment, the digitizer windings on the PCB 11 are designed to minimize manufacturing cost and to maximize reliability. This is achieved by using single turn windings that have relatively low impedance. The excitation circuit 17 described above has been designed so that it can allow a large AC current to be driven into the digitizer winding 51 at low voltages, while maintaining high efficiency and with low spurious emissions across a broad range of operating frequencies (greater than 1 kHz and less than 10 MHz). This has been achieved by minimizing the resistance of the excitation circuit 17 that is in series with the digitizer winding 51. There are a number of design features of the excitation circuit 17 described above which contribute to its high efficiency and low series resistance. Firstly, the use of MOSFET switching circuitry (switches 95 and 97) and a smoothing filter 99 built from LC filter components enables the drive signal generator 91 to generate an approximately sinusoidal excitation current at high power efficiency, unlike alternative signal generators built from, for example, class A or class D amplifiers. An approximate sinusoidal excitation current is important as this reduces the harmonic content of the magnetic field generated when the excitation current is applied to the digitizer winding 51. This is important because this reduces emissions in other regulated frequency bands and reduces the amount of power that is lost in the emitted harmonics.

The low series resistance of the excitation circuit 17 has been achieved by using a single MOSFET to control the application of current to each connected conductor (CV) of the digitizer winding 51 and not the conventional N-channel and P-channel MOSFET pair normally used. As will be described in more detail below, this is possible because any negative drain-source voltage experienced by the other switches 113 will be below the level at which the parasitic reverse diode within those MOSFETs 113 conducts more than a nominal amount.

To explain this in more detail, reference is made to FIG. 4f which schematically represents the excitation circuit 17 when switches 111-1 and 113-3 are switched on (and when the other switches 111 and 113 are switched off), so that the excitation signal from the drive signal generator 91 is applied to conductors CV5 and CV9. FIG. 4f also illustrates the coil 114 formed by conductor CV3, conductor 57 and conductor CV5, which is connected to ground via the corresponding MOSFET switch 113-2, which is in its off or high impedance state. When the excitation current flows through the coil 115 formed by conductor CV5, conductor 57 and conductor CV9, this will generate a magnetic field which couples (M) with the coil 114. This coupled magnetic field will induce an EMF ($e_{3-5}$) in the coil 114. The drain-source voltage of the MOSFET 113-2, therefore, equals the induced EMF ($e_{3-5}$) plus the excitation voltage $V_L$. However, because of the geometry of the digitizer winding 51, the induced EMF ($e_{3-5}$) is dominated by the excitation voltage $V_L$. As a result of the relatively low peak magnitude of the excitation voltage $V_L$, the peak negative excursion of this drain-source voltage never exceeds the level at which the parasitic reverse diode (not shown) within the MOSFET 113-2 conducts more than a nominal amount. As a result of this, it is possible to use a single MOSFET per connected conductor (CV) of the digitizer winding 51 and not the conventional N-channel and P-channel MOSFET pair normally used.

Further, since only one type of MOSFET is required, it is preferred to use N-type MOSFETs as these require about a quarter of the silicon area of P-type MOSFETs to achieve the same on resistance. Therefore, the above design of the excitation circuit 17 minimizes the series resistance of the excitation circuit 17 (and hence the power loss within the excitation circuit 17) for a given area (and hence cost) of silicon.

Sensing Circuit

Figure 5A:
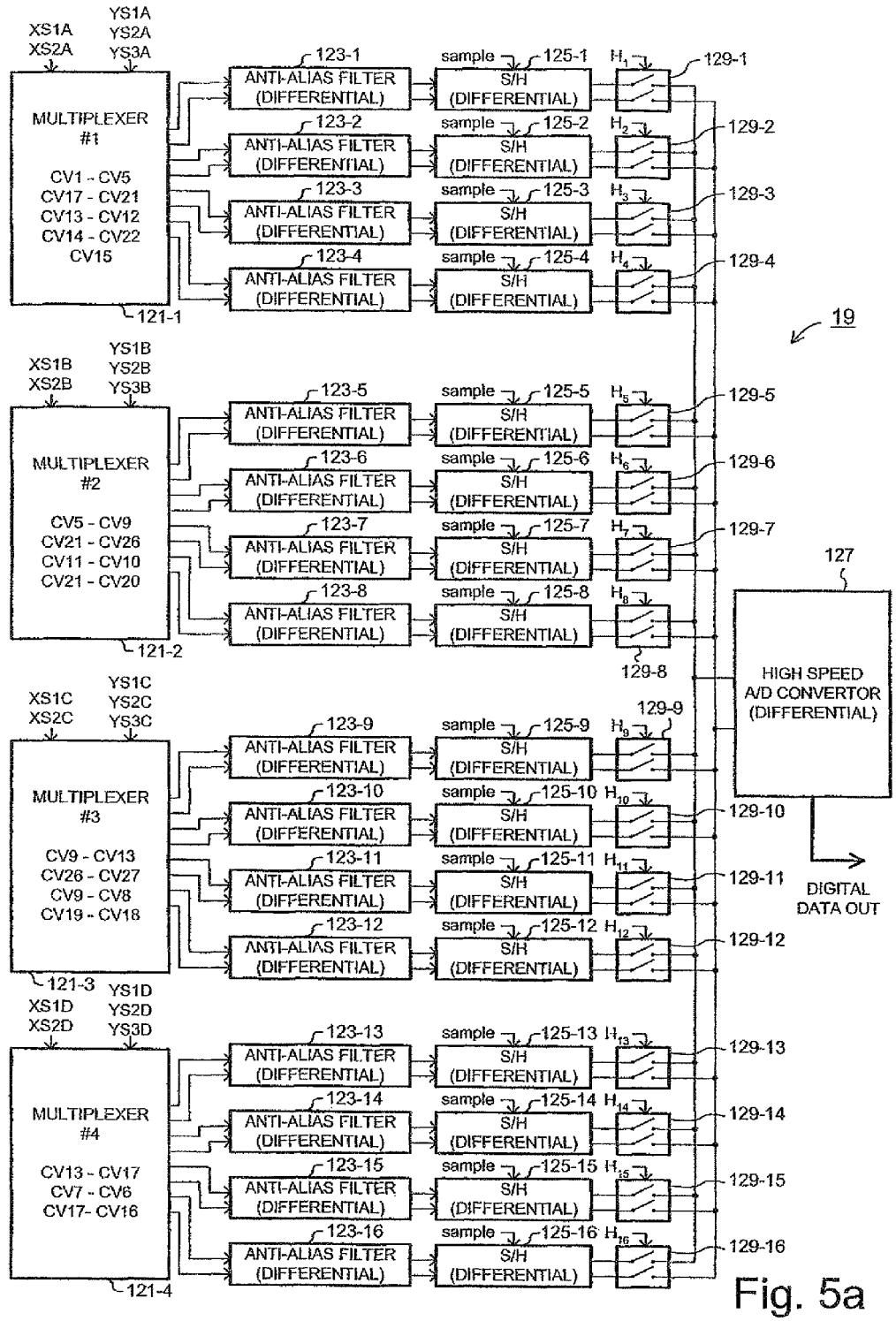
FIG. 5a is a block diagram illustrating the main components of a sensing circuit forming part of the digitizer electronics shown in FIG. 1.

FIG. 5a is a block diagram illustrating the main components of the sensing circuit 19 used in this exemplary embodiment. As shown, in this exemplary embodiment, the sensing circuit 19 includes four multiplexers 121-1 to 121-4 which are each connected to a respective sub-set of the connections on the connection pad 41 shown in FIG. 2d. As shown in FIG. 5a, the four multiplexers 121 operate to multiplex the signals from the digitizer windings (51 and $L_1$ to $L_{34}$) into sixteen processing channels, each having a differential anti-alias filter 123-1 to 123-16 and a differential sample and hold circuit 125-1 to 125-16. (Although not shown, each processing channel will also include a differential amplifier for amplifying the signals from the digitizer windings and for removing any common mode signals from its inputs.) The particular conductors (CV) which are connected through the multiplexers 121 to the anti-alias filters 123 are determined by the sensor coil select signals generated by the control and signal processing circuit 15. As shown, these sensor coil select signals include signals XS1A, XS2A, XS1B, XS2B, XS1C, XS2C, XS1D and XS2D which are used to select conductors from digitizer winding 51 and signals YS1A, YS2A, YS3A, YS1B, YS2B, YS3B, YS1C, YS2C, YS3C, YS1D, YS2D and YS3D which are used to select the conductor loops $L_1$ to $L_{34}$. In this exemplary embodiment, the coil select signals that are activated are designed to connect 16 adjacent conductors (CV) and conductor loops spanning the current stylus position, under control of the control and signal processing circuit 15.

As those skilled in the art will appreciate, the anti-alias filters 123 are arranged to remove frequency components from the detected signals that are outside the frequency band of interest. In this exemplary embodiment, the frequency band of interest starts at 400 kHz and ends at 700 kHz, although the system could be modified to operate within any frequency band lying between 1 kHz and 10 MHz. The output from each anti-alias filter 123 is then sampled by the corresponding sample and hold circuit 125 at a sampling rate controlled by the "sample" control signal, which forms part of the A/D control signals generated by the A/D control circuit 77 shown in FIG. 3a. The sampling frequency used is sufficient to capture adequate information from the input waveforms and in this exemplary embodiment is 4 MHz. The values held by the sample and hold circuits 125 are then digitized one at a time by a high speed differential analogue to digital (A/D) converter 127 before the next sample of each filtered signal is taken. The digital sample output by the high speed A/D 127 is then passed to the input waveform buffer 75 shown in FIG. 3a for processing by the digitizer microprocessor 71. The control and signal processing circuit 15 controls which sample and hold measurement is A/D converted using the select switches 129-1 to 129-16, which are controlled by a respective activation signal ($H_1$ to $H_{16}$) which also form part of the A/D control signals generated by the A/D control circuit 77.

Figure 5B:
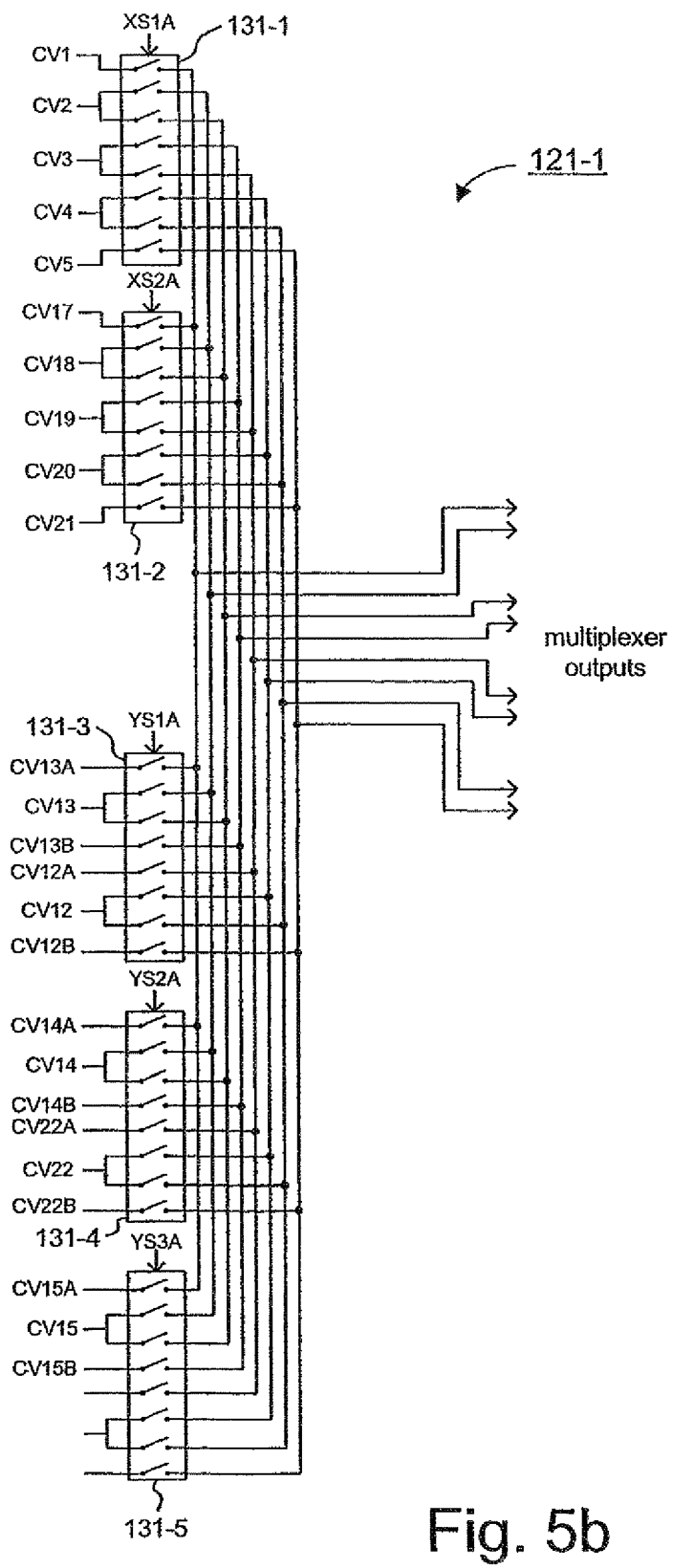

FIG. 5b is a schematic diagram illustrating in more detail the inputs and outputs of multiplexer 121-1. Similar arrangements are provided in the other multiplexers 121. As shown, in this exemplary embodiment, multiplexer 121-1 includes five banks of switches 131-1 to 131-5 which are controlled by a respective one of the coil select signals (XS1A, XS2A, YS1A, YS2A and YS2A). As shown in FIG. 5b, the first bank of switches 131-1 has its inputs connected to conductors CV1, CV2, CV3, CV4 and CV5 shown in FIG. 2. When coil select signal XS1A is active, conductors CV1 and CV2 will be connected to the differential anti-alias filter 123-1; conductors CV2 and CV3 will be connected to anti-alias filter 123-2; conductors CV3 and CV4 will be connected to anti-alias filter 123-3; and conductors CV4 and CV5 will be connected to anti-alias filter 123-4. Because of the differential nature of the anti-alias filters 123, the filtered signal output from these filters will correspond to the difference between the EMFs induced in the two input conductors. As those skilled in the art will appreciate, this difference in EMFs will also represent the EMF induced in the loop formed by the two input conductors and the connecting conductor 57 shown in FIG. 2a. For example, the output from the anti-alias filter 123-1 will represent the EMF induced in the loop formed by conductor CV1, conductor 57 and conductor CV2. As shown in FIG. 5b, a similar arrangement is provided for the second bank of switches 131-2, except that its inputs are connected to conductors CV17, CV18, CV19, CV20 and CV21

The third, fourth and fifth banks of switches 131-3 to 131-5 are for connection to some of the conductor loops $L_i$ shown in FIG. 2b. For example, as shown, the third bank of switches 131-3 has its inputs connected to conductors CV13A, CV13, CV13B, CV12A, CV12 and CV12B. When coil select signal YS1A is active, conductors CV13A and CV13 will be connected to the differential anti-alias filter 123-1; conductors CV13 and CV13B will be connected to anti-alias filter 123-2; conductors CV12A and CV12 will be connected to anti-alias filter 123-3; and conductors CV12 and CV12B will be connected to anti-alias filter 123-4. Therefore, as a result of the differential nature of the anti-alias filters 123, the outputs from these filters will represent the EMFs induced in the corresponding conductor loop $L_i$ shown in FIG. 2b.

A similar set of connections are provided by the fourth and fifth bank of switches 131-4 and 131-5, although as shown in FIG. 5b, the fifth bank of switches 131-5 has its inputs connected to only some of the conductors shown in FIG. 2. As those skilled in the art will appreciate, this is because there are more switch inputs than there are conductors of the digitizer windings.

As mentioned above, the other multiplexers 121 shown in FIG. 5a have a similar structure to the multiplexer 121-1 and, therefore, a further description of those other multiplexers 121 will not be given.

Digitizer Microprocessor

Figure 6:
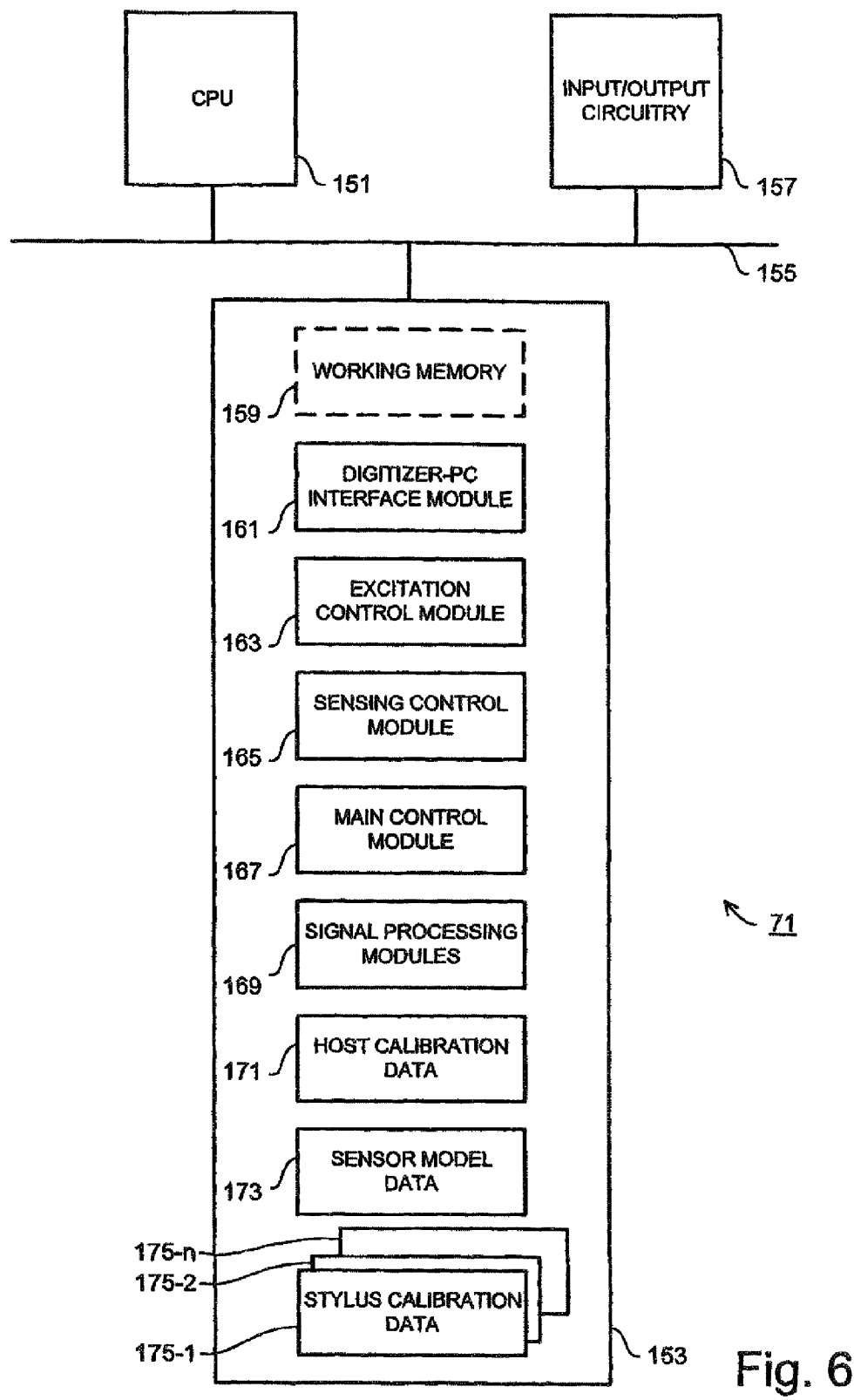

FIG. 6 is a schematic diagram illustrating the main components of the digitizer microprocessor 71 shown in FIG. 3a. As shown, the digitizer microprocessor 71 includes a central processing unit (CPU) 151 for performing calculations and which is connected to memory 153 via a bus 155. The CPU 151 is also connected to input/output circuitry 157 which controls the inputting and outputting of data to and from the digitizer microprocessor 71.

As shown in FIG. 6, the memory 153 includes a working memory area 159 which holds processing instructions that define the operation of the CPU 151 and which stores data necessary during the calculation of the current position and status of the stylus 7. The memory 153 also stores a number of software modules including:

1) A digitizer-PC interface software module 161 which controls the interaction of the digitizer microprocessor 71 with the operating system 21 of the tablet PC 1 via the digitizer-PC interface 23.

2) An excitation control software module 163 which generates the necessary control signals for controlling the selection and excitation of the selected conductors of digitizer winding 51.

3) A sensing control software module 165 for controlling the sensor coil selection and for controlling the analogue to digital control circuit 77.

4) A main control software module 167 which forms the main set of processing instructions for controlling the operation of the digitizer electronics 13 and which invokes the other software modules when necessary.

5) Signal processing software modules 169 which define the processing steps to be carried out by the CPU 151 in order to calculate the position and status of the stylus 7 over the writing surface 3. As mentioned above, in this exemplary embodiment, the digitizer electronics 13 is arranged to be able to detect the position and status of different types of stylus 7. In this exemplary embodiment, a number of different signal processing modules 169 are provided since different calculations are performed to determine the position and status of the stylus 7 depending on the type of stylus 7 being used.

As shown in FIG. 6, the memory 153 also stores predefined data which is used by the CPU 151 during the position and status calculations. This data includes:

1) Host calibration data 171 which, in this exemplary embodiment, defines corrections for calculated positions in order to take into account, for example, misalignment between the X-Y digitizer winding PCB 11 and the display 5. This host calibration data is determined in advance during a calibration routine in which measured positions are compared with actual positions on the display. The reader is referred to the applicant's copending UK patent application GB 0416614.6 for more details on how this calibration data may be generated.

2) Sensor model data 173 which defines, among other things, the relationship between the signals obtained from the digitizer windings and the corresponding position of the stylus 7 over the digitizer windings PCB 11.

3) Stylus calibration data 175-1 to 175-n (one for each of the n different types of stylus 7 that the digitizer electronics 13 can detect and cooperate with) which defines various stylus specific data such as, for example, details of its operation and its magnetic characteristics. More details of the stylus calibration data 175 will be given below.

Figure 7A:
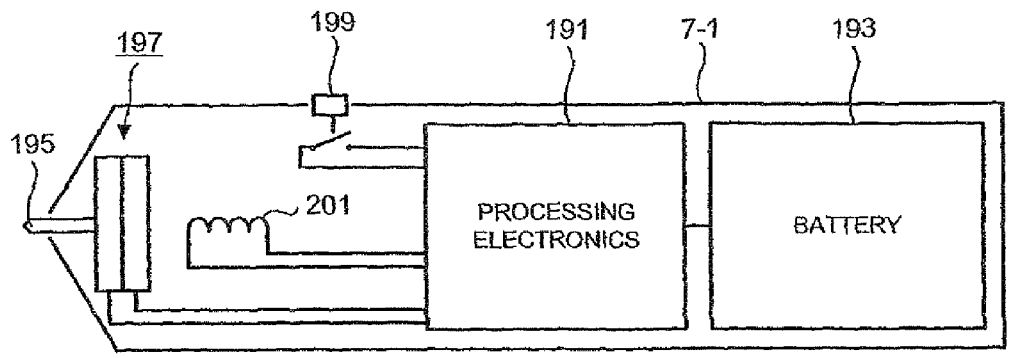
FIG. 7a is a schematic diagram illustrating the main components of a battery-powered stylus which includes processing electronics for controlling the transmission of information to the digitizer.

As discussed above, in this exemplary embodiment, the digitizer electronics 13 are arranged to be able to detect and to operate with several different types of stylus 7. FIG. 7 illustrates some of the different types of stylus 7 that can be detected. In particular, FIG. 7a schematically illustrates a first type of stylus 7-1 that can be detected by the digitizer electronics 13. As shown, the stylus 7-1 includes processing electronics 191 which are powered by a battery 193. In this exemplary embodiment, the processing electronics 191 powers up when pressure is applied to a tip 195 of the stylus 7-1, thereby activating a tip switch 197, and remains powered while tip switch activity indicative of normal use is observed (and for a short period after the last tip switch activity is observed). The processing electronics 191 senses the state of the tip switch 197 and the state of a side switch 199 and transmits encoded signals indicative of these switch states to the digitizer winding PCB 11 via a coil 201.

Figure 7B:
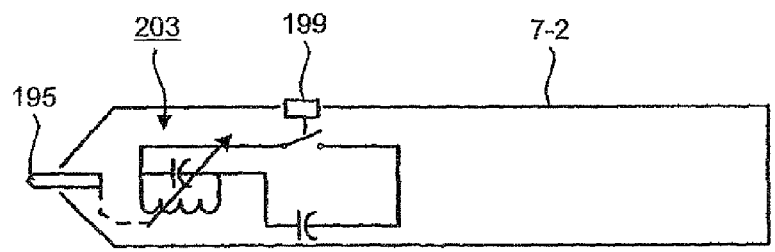
FIG. 7b is a schematic diagram illustrating the components of a single-resonator stylus.

FIG. 7b illustrates a second type of stylus 7-2 that can be detected by the digitizer electronics 13. As shown, the stylus 7-2 has a single resonator 203, whose frequency indicates the pressure applied to the tip 195 of the stylus 7-2 and the state of the side switch 199.

Figure 7C:
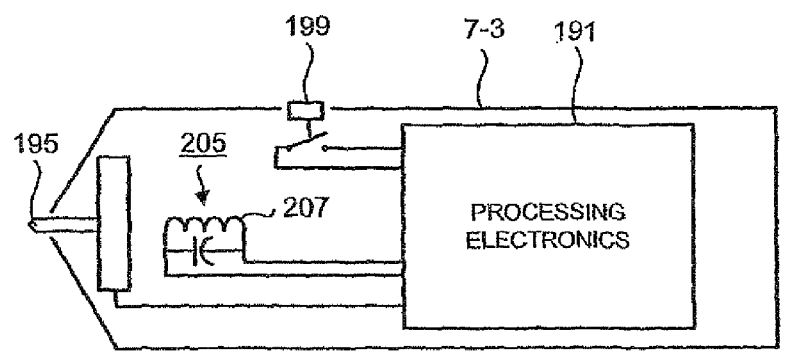
FIG. 7c is a schematic diagram illustrating the main components of a stylus which is powered by the digitizer and which includes processing electronics for encoding data to be transmitted by the stylus.

FIG. 7c illustrates a third type of stylus 7-3 that can be detected by the digitizer electronics 13. As shown the stylus 7-3 has a resonator 205 and processing electronics 191. The processing electronics 191 provides power from energy received from the digitizer windings via the resonator 205; senses the state of the side switch 199 and the amount of pressure applied to the tip 195 of the stylus 7-3; and then drives the coil 207 of the resonator 205 with a signal indicative of those quantities for detection by the digitizer windings on the PCB 11.

Figure 7D:
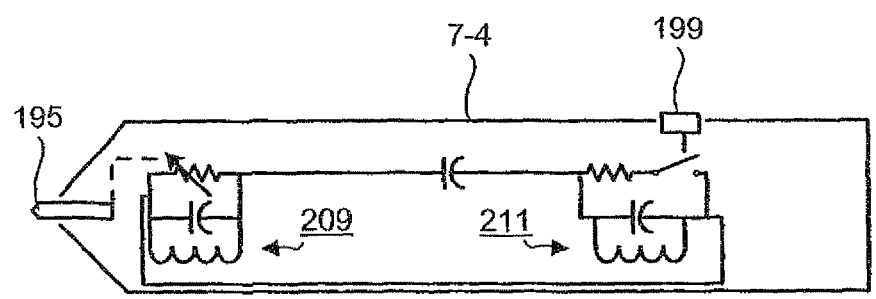
FIG. 7d schematically illustrates the main components of a two-resonator stylus.

FIG. 7d illustrates a fourth type of stylus 7-4 that can be detected by the digitizer electronics 13. As shown, the stylus 7-4 has two coupled resonators 209 and 211 at nominally fixed resonant frequencies ($F_1$ and $F_2$), one of which is magnetically coupled to the digitizer windings on the PCB 11. The Q-factor of resonator 209 varies with the pressure applied to the tip 195 of the stylus 7-4 and the Q factor of resonator 211 varies with the state of the side switch 199. When the digitizer electronics 13 detects this type of stylus 7-4 above the writing surface 3, it detects the Q factors of both resonators 209 and 211 and hence the state of the side switch 199 and the pressure applied to the tip 195.

Figure 7E:
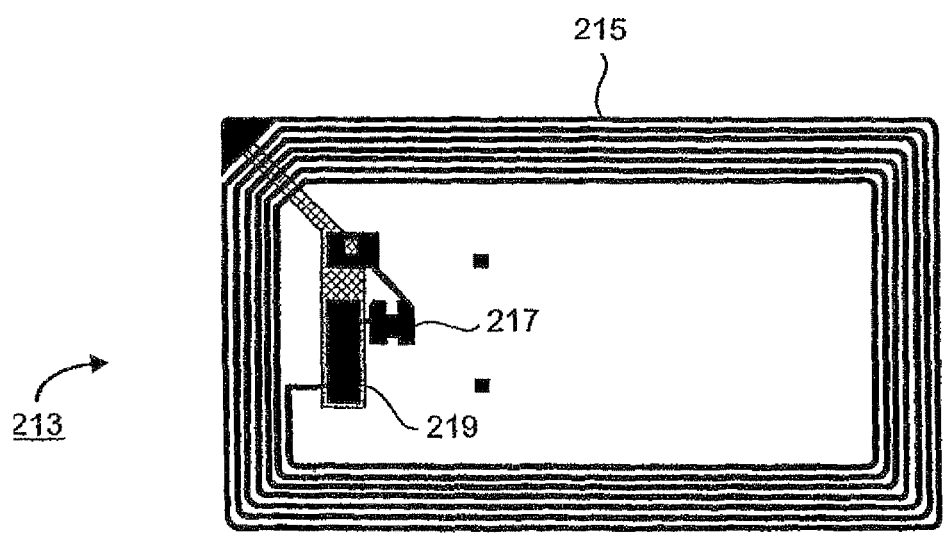
FIG. 7e schematically illustrates the form of an RFID tag which can be detected by the digitizer shown in FIG. 1.

As those skilled in the art will appreciate, although the position indicators described above are all styluses 7, the digitizer 9 can work with similar position indicators that do not have the shape of a stylus 7. For example, an equivalent mouse shaped position indicator may be used having the corresponding components of one of the styluses 7 discussed above. Additionally, in this exemplary embodiment, the digitizer 9 is operable to detect and interact with RFID tags and other near field communications devices (NFCD). A typical RFID tag 213 is illustrated in FIG. 7e. As those skilled in the art will appreciate, an RFID tag 213 is similar in electronic composition and operation to the stylus 7-3 illustrated in FIG. 7c. In particular, the RFID tag 213 includes a coil 215 which is connected to processing electronics 217 and which forms a resonant circuit with a capacitor 219.

Figure 8:
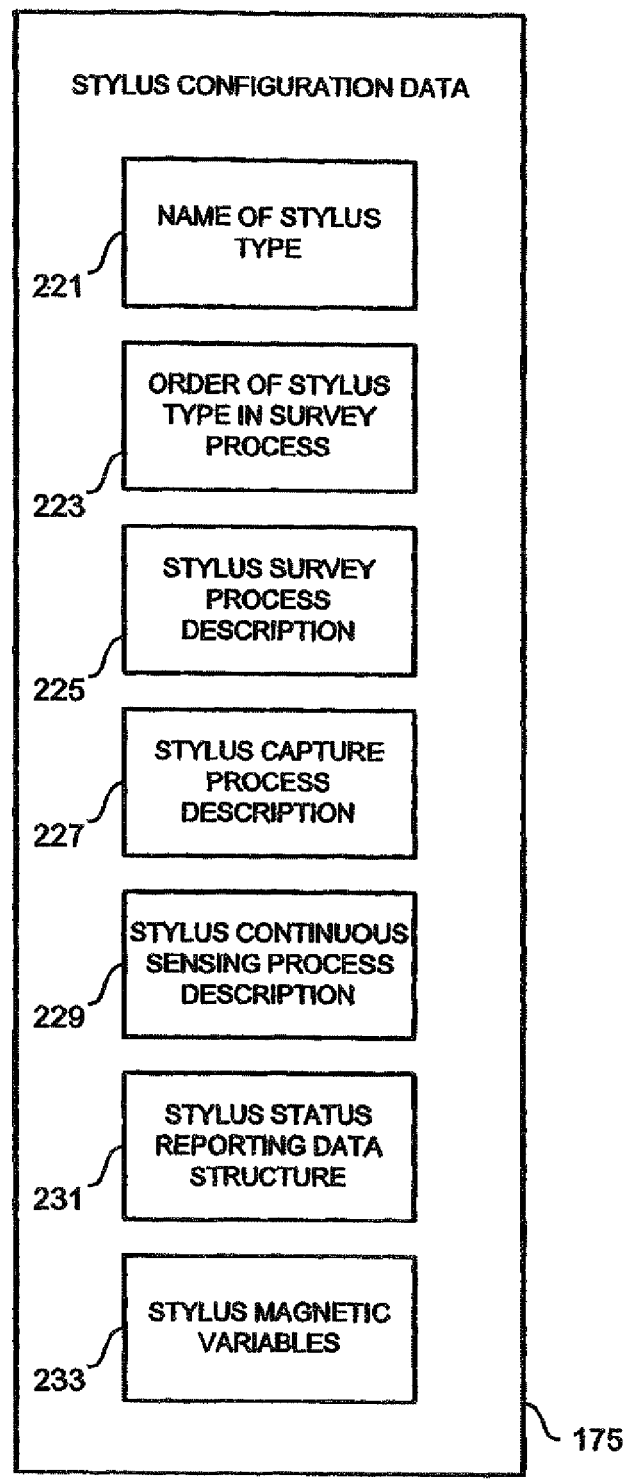
FIG. 8 schematically illustrates stylus configuration data that is stored within the digitizer microprocessor for different types of stylus that the digitizer can detect.

As discussed above, the digitizer microprocessor 71 includes stylus calibration data 175 for the n different classes or types of stylus 7 that the digitizer 9 can detect. FIG. 8 illustrates the typical contents of this stylus calibration data 175. As shown, the stylus calibration data 175 includes:

1) Data 221 defining the name of the stylus type.
2) Data 223 defining the order of this stylus type in a survey process. As will be described in more detail below, the digitizer 9 initially tries to detect each type of stylus 7 in turn until it detects one above the writing surface 3. The data 223 defines the order in that detection process and is used to simplify the detection process and to minimize any confusion between the different types of stylus 7.
3) Data 225 which defines the survey process for that type of stylus 7 and any thresholds or limits used in the survey process. As will be described in more detail below, this survey process defines how the digitizer 9 tries to detect the presence of this type of stylus 7.
4) Data 227 defining a stylus capture process for this type of stylus 7 and any thresholds or limits used in the capture process. As will be described in more detail below, after the digitizer 9 has detected a particular type of stylus 7 is above the writing surface 3, it then enters a capture process in which initial position and operating characteristics of the stylus 7 are detected or captured.
5) Data 229 defining a continuous sensing process to be carried out by the digitizer 9 to track the position and status of that type of stylus 7 above the writing surface 3. The data 229 also defines any thresholds or limits used in the continuous sensing process.
6) Data 231 defining the status reporting data structure that is used by that type of stylus 7. This data tells the digitizer microprocessor 71 how to report the determined stylus position and status to the operating system 21 of the tablet PC 1.
7) Data 233 defining magnetic variables of the stylus 7 that influence position calculations, such as the magnetic center for that type of stylus 7. As will be described in more detail below, this information is used by the digitizer microprocessor 71 to make an appropriate position correction during the calculations.

In this exemplary embodiment, when the digitizer 9 is manufactured it is programmed with the stylus configuration data 175 for the or each stylus 7 that will be supplied with the digitizer 9 and any others required at that time. New stylus configuration data 175 for new styluses may be programmed into the digitizer 9 after manufacture, for example when the user of the tablet PC 1 buys a new stylus 7. In this case, the configuration data 175 may be downloaded via host driver software, from a CD or from a website on the internet.

Figure 9A:
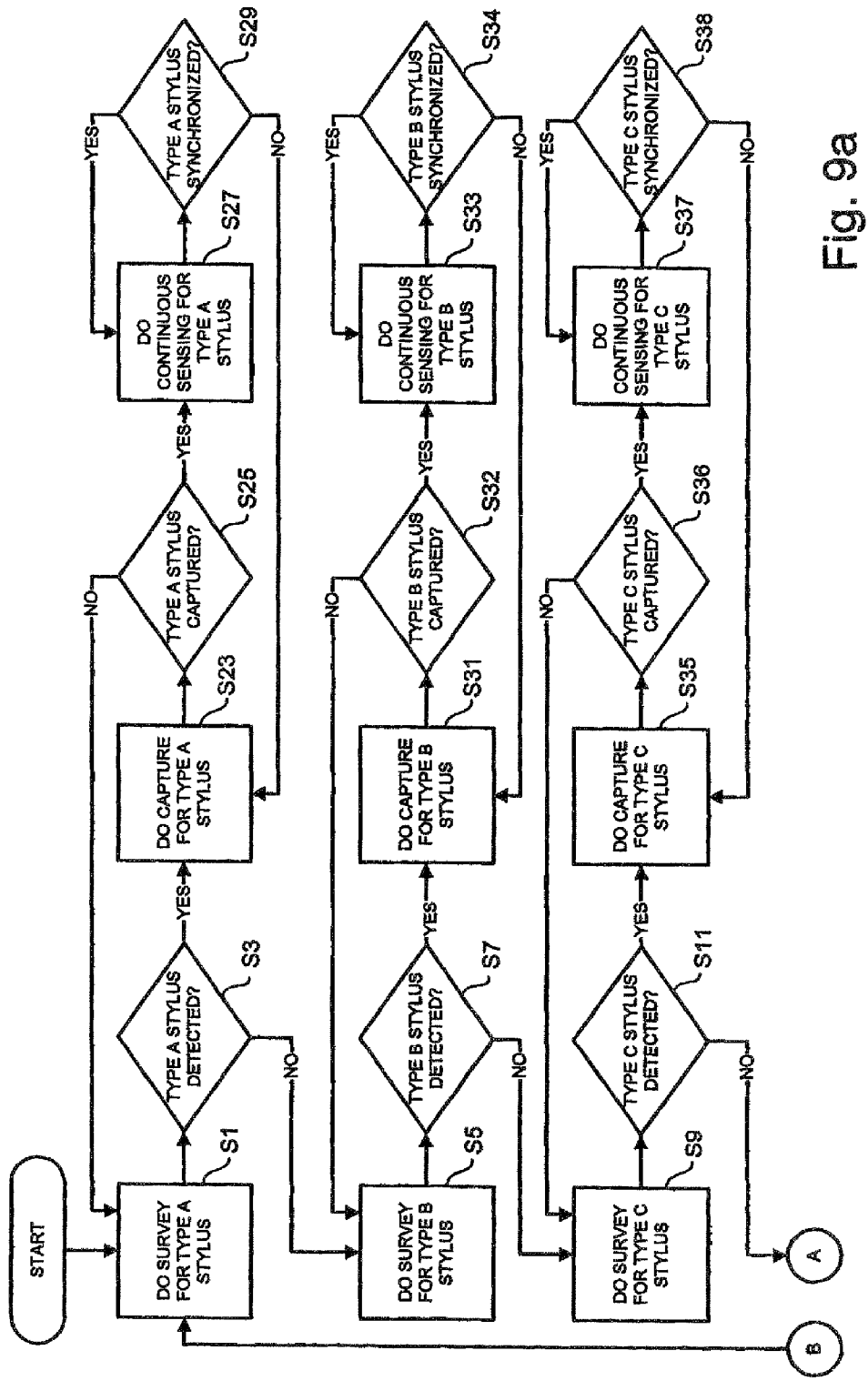
FIGS. 9a and 9b are flow charts illustrating the way in which the digitizer microprocessor controls the digitizer to detect the presence and position of the different types of stylus or the RFID tag above the writing surface of the tablet PC.
Figure 9B:
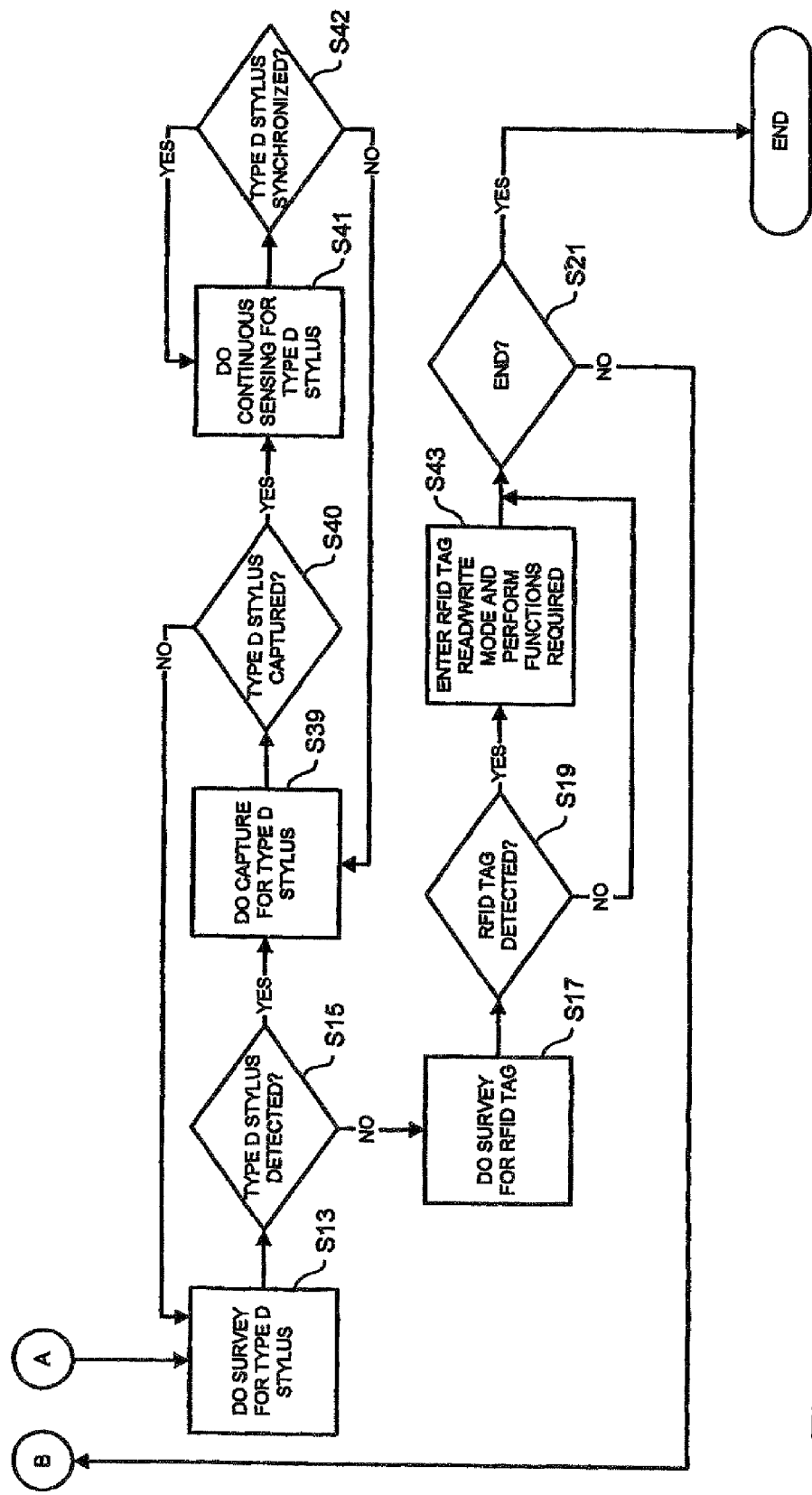

FIGS. 9a and 9b are flow charts illustrating the main processing steps performed by the CPU 151 when running the main control module 167, for a particular set of stylus configuration data 175. This main control module 167 causes the digitizer electronics 13 to survey for the different types of stylus 7 until a particular type is found. Once the survey has identified the presence of a particular type of stylus 7, the main control module causes the CPU 151 to capture (lock onto) the stylus 7 and then to continuously track that stylus 7 at the rates required. In this exemplary embodiment, the digitizer microprocessor 71 also reports the type of stylus 7 to the operating system 21, which uses this information to activate functions and software modules appropriate for that type of stylus 7.

As will be apparent to those skilled in the art, the digitizer 9 has to distinguish between styluses 7 having similar inductive signatures. For example, both the simple resonator stylus 7-2 of FIG. 7b and the electronic stylus 7-3 of FIG. 7c employ resonant circuits. If these two styluses 7 share a frequency band, then they may become confused. This problem is addressed by selecting an appropriate order for the styluses 7 in the processing steps illustrated in FIG. 9. In particular, the process starts by surveying for styluses 7 which are most easily distinguished. The particular order used in this exemplary embodiment for the styluses 7 shown in FIG. 7 are as follows:

Type A—the first type of stylus 7 to be detected is the battery-powered stylus 7-1 like that illustrated in FIG. 7a. This stylus 7-1 should be easily distinguished since it operates without having to energize it by applying an excitation signal to the digitizer windings on the PCB 11.

Type B—the stylus 7-3 with the processing electronics 191 shown in FIG. 7c is the next easily distinguishable stylus 7, as it responds with encoded data which is easily identifiable.

Type C—is the two-resonator stylus 7-4 shown in FIG. 7d and is relatively easy to distinguish as a result of its unique dual resonance characteristics.

Type D—in this exemplary embodiment is the simple resonator stylus 7-2 shown in FIG. 7b. This stylus 7-2 is the most likely stylus to be confused with the electronic stylus 7-3 of FIG. 7c and the two-resonator stylus 7-4 shown in FIG. 7d, if the resonant frequencies overlap.

Returning to FIGS. 9a and 9b, as shown, the digitizer microprocessor 71 initially performs a survey process for the type A stylus 7-1 in step S1. The survey process that is used is defined by the survey process description data 225 forming part of the stylus configuration data 175 for the type A stylus 7-1. The processing then proceeds to step S3 where the digitizer microprocessor 71 determines if a type A stylus 7-1 has been detected. If a type A stylus 7-1 has not been detected, then the processing proceeds to step S5, where the digitizer microprocessor 71 performs a survey for the type B stylus 7-3. The digitizer microprocessor 71 then checks, in step S7, if a type B stylus 7-3 has been detected. If it has not, then the processing proceeds to step S9 where a similar survey is then carried out for a type C stylus 7-4. The processing then proceeds to step S11 where the digitizer microprocessor 71 determines if a type C stylus 7-3 has been detected. If it has not, then the processing proceeds to step S13 where a similar survey process is performed for the type D stylus 7-2. The processing then proceeds to step S15 where the digitizer microprocessor 71 determines if a type D stylus 7-2 has been detected. If it has not, then the processing proceeds to step S17, where the digitizer microprocessor 71 performs a survey process for an RFID tag 213. The processing then proceeds to step S19 where the digitizer microprocessor 71 determines if an RFID tag 213 has been detected. If it has not, then the processing proceeds to step S21 where the digitizer microprocessor 71 determines if the main control module 167 should end. If it is to end, then the processing ends, otherwise the processing returns to step S1 where the surveying process starts again.

If at step S3, the digitizer microprocessor 71 detects the presence of a type A stylus 7-1 then the processing proceeds to step S23, where the digitizer microprocessor 71 controls the digitizer electronics 13 to perform a capture process for the type A stylus 7-1. This capture process is defined by the stylus capture process description data 227 forming part of the stylus configuration data for the type A stylus 7-1. The processing then proceeds to step S25 where the digitizer microprocessor 71 determines if a type A stylus 7-1 has been captured. If it has not, then the processing returns to step S1. If a type A stylus 7-1 has been captured, then the processing proceeds from step S25 to step S27, where the digitizer microprocessor 71 causes the digitizer electronics 13 to perform a continuous sensing process for the type A stylus 7-1. The processing steps performed in this step are defined by the stylus continuous sensing process description data 229 forming part of the stylus configuration data 175 for the type A stylus 7-1. The processing then proceeds to step S29 where the digitizer microprocessor 71 determines if it is synchronized with the type A stylus 7-1. If it is, then the processing returns to step S27, otherwise the processing returns to step S23 where the capture process for the type A stylus 7-1 is repeated.

As shown in FIG. 9, similar capture and continuous sensing processes are provided in respect of the type B stylus 7-3 in steps S31 to S34; similar capture and continuous sensing processes are provided in respect of the type C stylus 7-4 in steps S35 to S38; and similar capture and continuous sensing processes are provided in respect of the type D stylus 7-2 in steps S39 to S42.

If an RFID tag 213 is detected at step S19, then, at step 43, the digitizer microprocessor 71 enters an RFID tag read/write mode in which it transmits data to and receives data from the RFID tag 213 in order to perform the corresponding functions associated with the RFID tag 213. For example, the RFID tag 213 may be used as part of a security unlocking device which unlocks the tablet PC 1 so that it can be used by the user.

A description will now be given of exemplary survey, capture and continuous sensing processes for the different types of stylus 7 shown in FIG. 7.

Battery-Powered Stylus
Survey Process

Figure 10A:
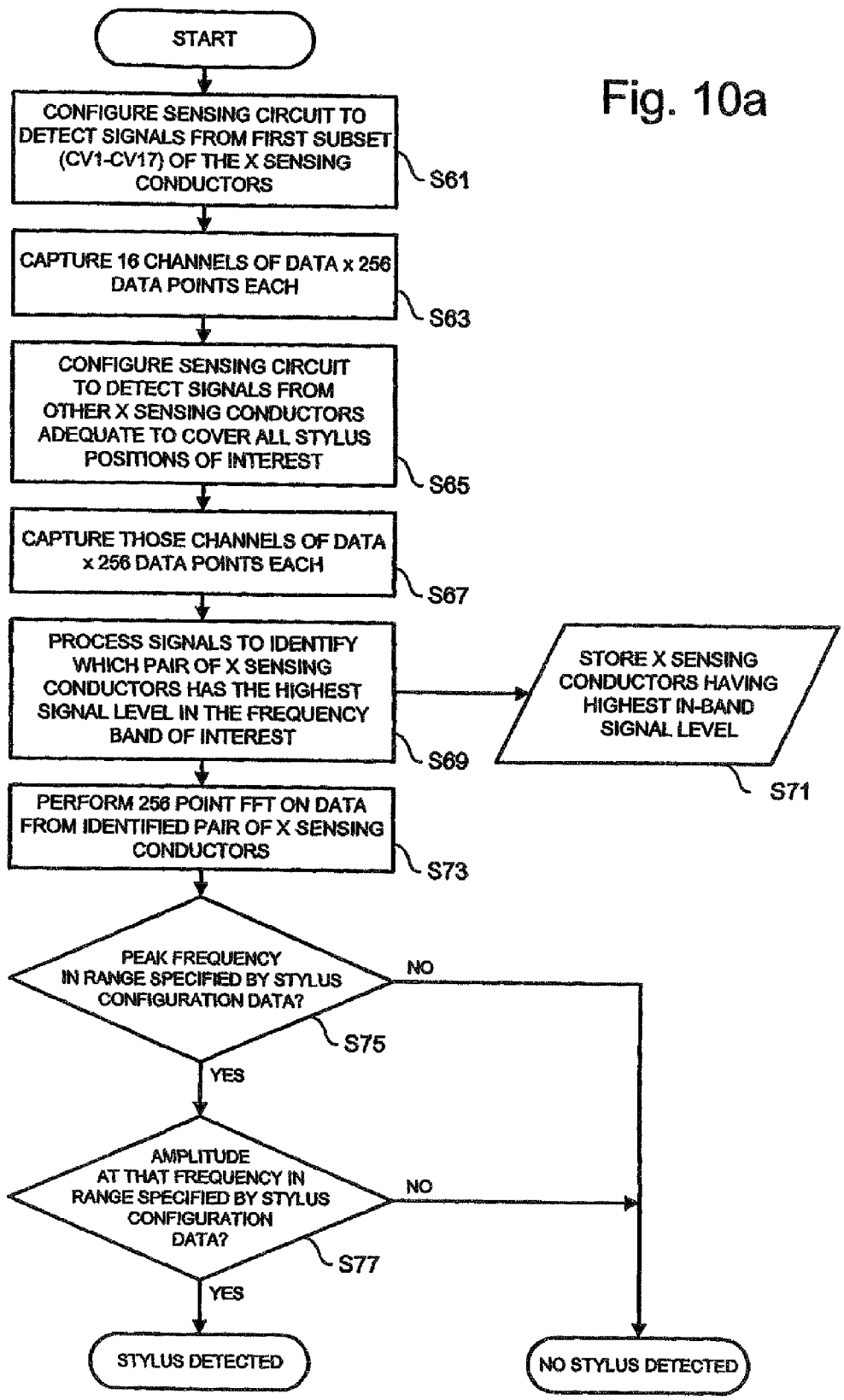

FIG. 10*a* is a flow chart illustrating the processing steps carried out by the digitizer microprocessor 71 in this exemplary embodiment, during the survey process for a battery-powered stylus 7-1. As shown, in step S61, the digitizer microprocessor 71 configures the sensing circuit 19 to detect signals from a first subset (CV1 to CV17) of the conductors of digitizer winding 51, using the appropriate configuration of the multiplexers 121 shown in FIG. 5. (In the following description, the conductors of the winding 51 will sometimes be referred to as the X sensing conductors as they are arrayed along the X direction of the digitizer winding PCB 11 and the conductor loops $L_i$ will sometimes be referred to as the Y sensing conductors as they are arrayed along the Y direction of the digitizer winding PCB 11.) In step S63, the digitizer microprocessor 71 controls the sample and hold circuits 125, the switches 129 and the high speed A/D converter 127 to obtain two hundred and fifty-six samples (256 data points) of the sensor EMFs from each of the sixteen processing channels. The processing then proceeds to step S65, where the digitizer microprocessor 71 configures the sensing circuit 19 to detect signals from the remaining X sensing conductors (CV17 to CV27) adequate to cover all possible stylus 7 positions of interest. The processing then proceeds to step S67 where the digitizer microprocessor 71 controls the sample and hold circuits 125, the switches 129 and the high speed A/D converter 127 to capture 256 samples of the EMFs from those remaining X sensing conductors.

In step S69, the digitizer microprocessor 71 processes the received samples to identify which pair of X sensing conductors has the highest differential signal level in the frequency band of interest. This frequency band information is defined in the stylus survey process description data 225 of the stylus configuration data 175 for stylus 7-1. In this exemplary embodiment, the digitizer microprocessor 71 identifies which pair of X sensing conductors has the highest differential signal level by passing the two hundred and fifty-six samples obtained for each pair of X sensing conductors, through a digital pass band filter centered on the frequency band of interest and then by identifying which pair of X sensing conductors yields the highest signal level output from the digital filter. The identified pair of X sensing conductors indicates the approximate X position of the stylus 7-1 over the digitizer winding PCB 11. For example, if the digitizer microprocessor determines at step S69 that the highest differential signal level is obtained from conductors CV8 and CV9, then this indicates that if there is a powered stylus 7-1 it is somewhere near the conductor loop formed by conductor CV8, conductor 57 and conductor CV9. As shown, in step S71, the digitizer microprocessor 71 stores data identifying the pair of X sensing conductors having the highest in-band signal level, as this approximate position information will be used later by the continuous sensing process.

The processing then proceeds to step S73 where the digitizer microprocessor 71 performs a 256 point Fast Fourier Transform (FFT) on the samples obtained from the pair of X sensing conductors identified in step S69. Then, in step S75, the digitizer microprocessor 71 processes the resulting FFT to determine if the peak of the FFT falls within a frequency range specified by the stylus configuration data 175 for the powered stylus 7-1. If it does not, then the digitizer microprocessor 71 determines that there is no powered stylus 7-1 above the writing surface 3. If, however, the peak of the FFT does fall within the frequency range specified by the stylus configuration data 175 then the processing proceeds to step S77, where the microprocessor 71 determines if the amplitude of the FFT peak is within a range specified by the stylus configuration data 175 for the powered stylus 7-1. If the amplitude is within this range, then the digitizer microprocessor 71 determines that a powered stylus 7-1 is above the writing surface 3; otherwise it determines that no powered stylus 7-1 is above the writing surface 3.

Capture Process

In this exemplary embodiment, the capture process for the powered stylus 7-1 is the same as the survey process described above, except that the digitizer microprocessor 71 configures the sensing circuit 19 to detect signals from the conductor loops $L_1$ to $L_{34}$. The scan process (step S69), therefore, determines the Y sensing conductor loop $L_i$ having the maximum signal level, which also represents the approximate Y position of the stylus 7-1 above the writing surface 3. A further description of the battery-powered stylus capture process will, therefore, be omitted.

Continuous Sensing Process

Figure 10C:
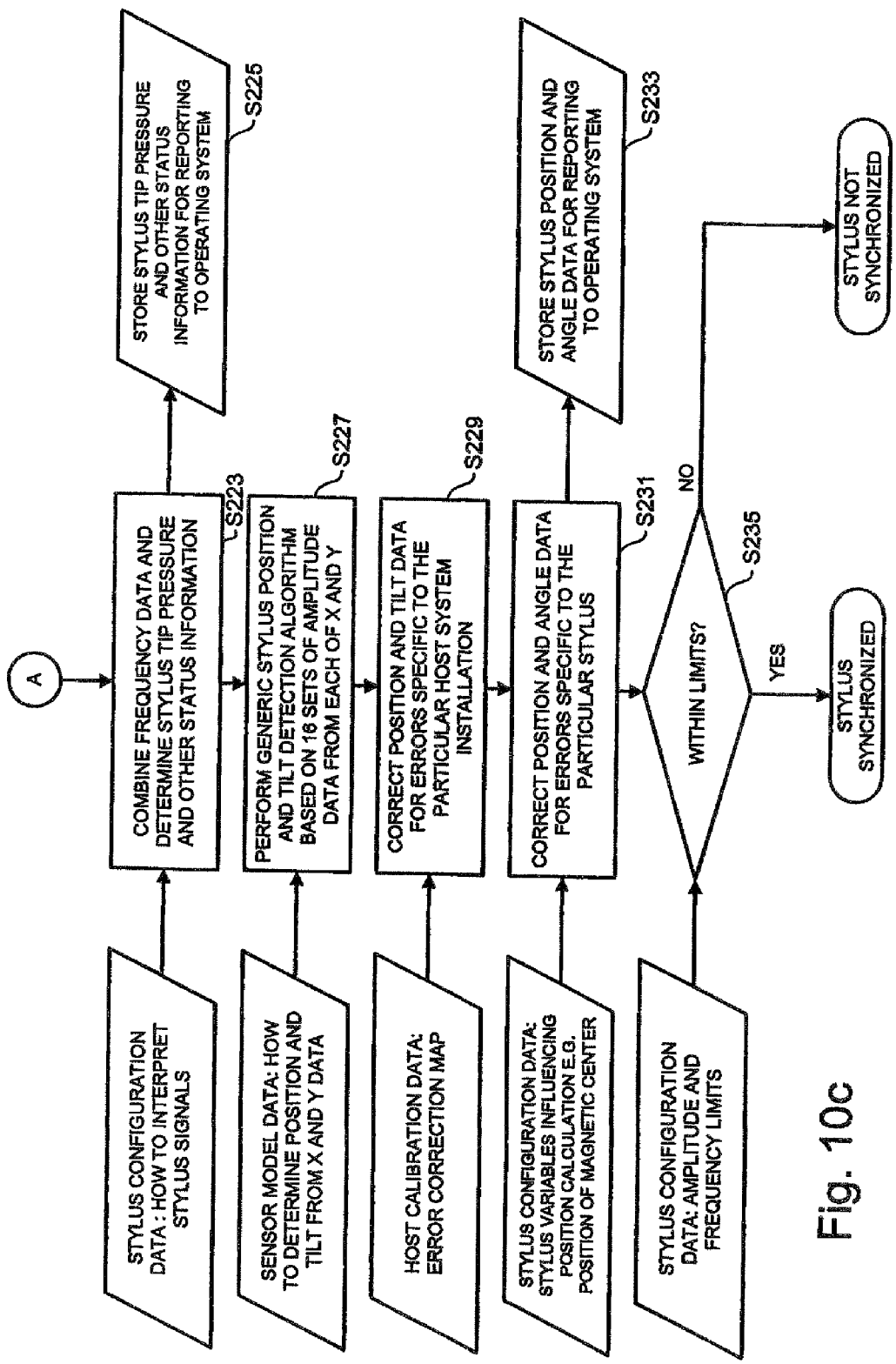

FIGS. 10*b* and 10*c* are flow charts illustrating the processing steps performed by the digitizer microprocessor 71 in this exemplary embodiment, when continuously tracking the position of the battery-powered stylus 7-1 above the writing surface 3. Provided the stylus 7-1 remains synchronized with the digitizer electronics 13, this process is repeated at a repetition rate defined in the stylus configuration data 175 for that stylus 7-1. As shown, the process begins at step S201 where the digitizer microprocessor 71 configures the multiplexers 121 in the sensing circuit 19 to detect the signals from the sixteen pairs of X sensing conductors closest to the previously reported maximum (consistent with any restrictions on the multiplexers 121 with regard to the pairs of X sensing conductors that can be connected at the same time through to the processing channels of the sensing circuit 19). The processing then proceeds to step S203 where the digitizer microprocessor 71 controls the sample and hold circuits 125, the switches 129 and the high speed A/D converter 127 in order to capture two hundred and fifty-six samples of the signals from the selected sixteen pairs of X sensing conductors.

The processing then proceeds to step S205 where the digitizer microprocessor 71 processes the signal samples obtained from each pair of X sensing conductors to identify which pair of X sensing conductors now has the highest signal level in the frequency band of interest. Again, this is achieved by passing the two hundred and fifty-six samples through an appropriate digital filter centered on the frequency band of interest and by identifying which pair of X sensing conductors provides the largest signal level output from that digital filter.

The processing then proceeds to step S207 where the digitizer microprocessor 71 performs a 256 point FFT on the data from the pair of X sensing conductors identified in step S205. In step S209, the digitizer microprocessor 71 processes the obtained FFT to identify the frequency and phase of the stylus signal (corresponding to the peak signal in the FFT). These quantities will be referred to as $F_X$ and $P_X$ in subsequent calculations. After step S207, the processing proceeds to step S211, where the digitizer microprocessor 71 performs an amplitude processing at the identified frequency and phase ($F_X$ and $P_X$) on the two hundred and fifty-six data points obtained from each of the sixteen pairs of X sensing conductors. More specifically, in step S211 the digitizer microprocessor 71 calculates the following amplitude value ($A(X_j)$) for each of the sixteen pairs of X sensing conductors from the corresponding two hundred and fifty-six data points:

$$A(X_j) = \sum_{r=0}^{255} S(X_j)_r \cdot \sin(2\pi F_X r T_s + P_X)$$

where $S(X_j)_r$ is the $r^{th}$ sample of the signal induced in the $j^{th}$ pair of X sensing conductors out of the sixteen that are processed; and $T_s$ is the interval between samples (i.e., one over the sampling rate of the sample and hold circuits 125). Since there are sixteen channels of samples that are processed, this results in the following vector of amplitude values:

$$A_X = \begin{bmatrix} A(X_1) \\ A(X_2) \\ \vdots \\ X(X_{16}) \end{bmatrix}$$

This vector of amplitude value is stored in step S213.

After step S211, the processing proceeds to step S215 where the digitizer microprocessor 71 repeats the above process for the sixteen pairs of Y sensing conductors (i.e., conductor loops $L_i$ shown in FIG. 2b) that are closest to the Y sensing conductor loop that yielded the maximum signal level during the capture process or during the previous iteration of the continuous sensing process. This yields another estimate of the frequency of the stylus signal and a similar vector ($A_Y$) of signal amplitudes for the sixteen Y sensing conductor loops, and these are stored in step S217.

After step S215, the processing proceeds to step S219 where the digitizer microprocessor 71 determines which pair of X sensing conductors and which Y conductor loop now have the greatest signal level, by comparing the signal amplitude values in the stored vectors $A_X$ and $A_Y$. The pair of X sensing conductors and the Y conductor loop with the greatest signal levels are then stored in step S221 as these will be used the next time this continuous sensing for the battery-powered stylus 7-1 is performed.

After step S219, the processing proceeds to step S223, where the digitizer microprocessor 71 combines (in this exemplary embodiment averages) the frequency data stored in steps S209 and S217 and determines the stylus tip pressure and other status information in accordance with the stylus configuration data 175 for the battery-powered stylus 7-1. The digitizer microprocessor 71 then stores, in step S225, the determined stylus tip pressure and other status information for subsequent reporting to the operating system 21.

After step S223, the processing proceeds to step S227, where the digitizer microprocessor 71 performs a generic stylus position (x,y,z) and tilt angle calculation based on the data vectors $A_X$ and $A_Y$. This may be achieved using, for example, the approach outlined in the applicant's earlier international patent application WO 03/105072, and in particular based on the processing described with reference to FIG. 15 of that application. Alternatively, these position and tilt angle calculations can be determined using other prior art techniques such as those described in U.S. Pat. No. 5,751,229. The way in which the digitizer microprocessor 71 should calculate the position and tilt from this amplitude data is defined in the sensor model data 173 shown in FIG. 6. The processing then proceeds to step S229 where the determined position and tilt data is corrected for errors specific to the particular tablet PC installation, using the host calibration data 171 shown in FIG. 6.

Figure 10D:
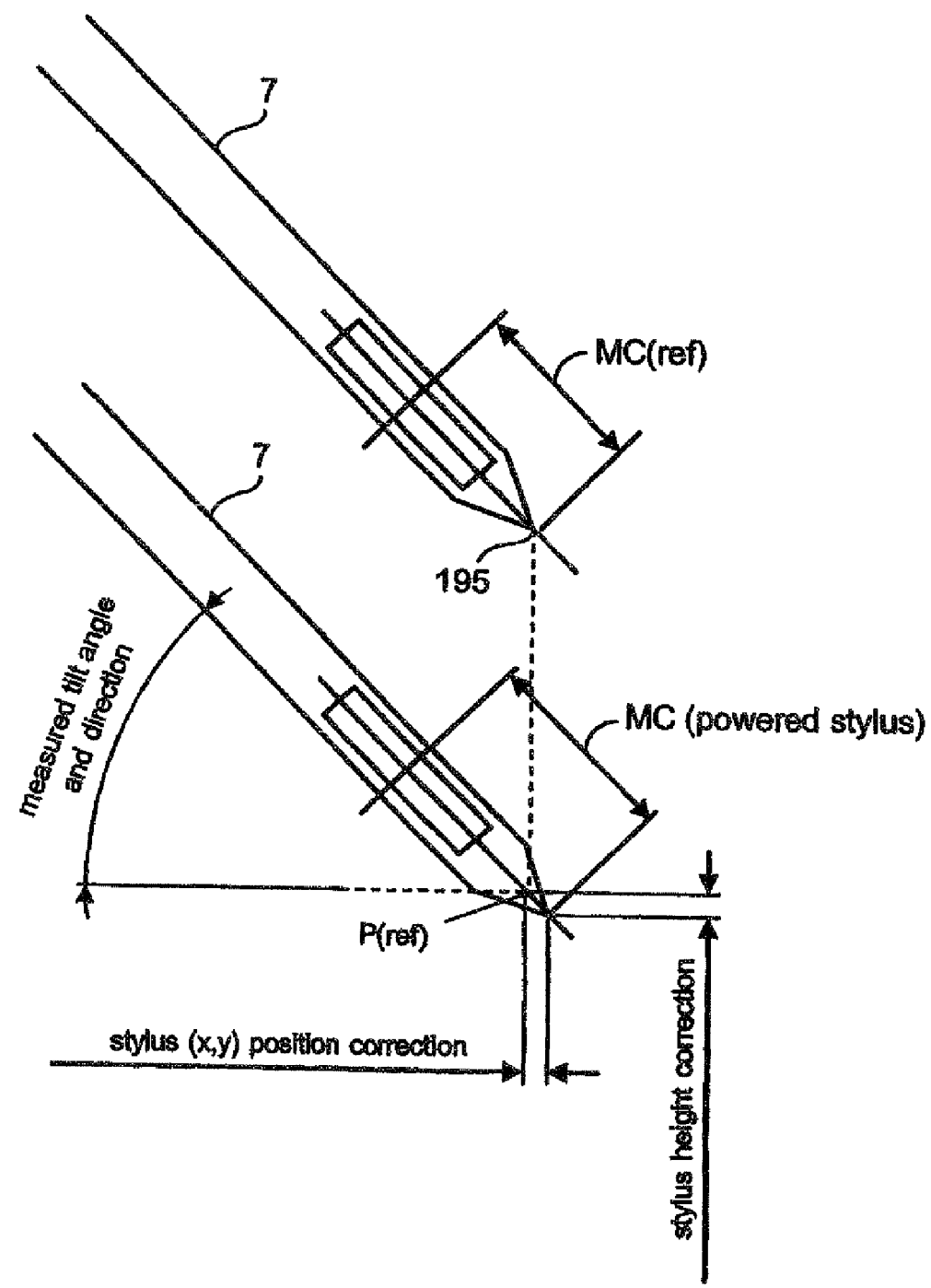
FIG. 10d schematically illustrates the type of correction performed by the digitizer microprocessor to account for different magnetic center positions for different types of styluses.

Up to this point, the position detection algorithm performed by the digitizer microprocessor 71 is based on a specific reference stylus design with known characteristics, such as the position of its effective magnetic center MC(ref) illustrated at the top of FIG. 10d. As is well known to those skilled in the art, the magnetic center (MC) is the position of a point magnetic dipole which most nearly approximates the magnetic field generated by the magnetic components in the stylus 7. The generic position calculation based on this reference stylus 7, therefore, estimates the stylus tip 195 position to be the point P(ref) shown in FIG. 10d. Therefore, after step S229, the processing proceeds to step S231, where the digitizer microprocessor 71 performs a further correction to the position and angle data for errors specific to the particular stylus (in this case the battery-powered stylus 7-1) being used. The digitizer microprocessor 71 determines the appropriate corrections using the stylus magnetic variables data 233 forming part of the stylus configuration data 175 for the battery-powered stylus 7-1. This stylus magnetic variables data includes, among other things, the position of the effective magnetic center (MC(powered stylus)) of the stylus 7-1, which the digitizer microprocessor 71 uses together with the measured tilt angle and direction to adjust the calculated stylus X-Y position and the stylus height (Z). The corrected position and tilt data is then stored in step S233 for subsequent reporting to the operating system 21.

Following step S231, the processing proceeds to step S235, where the digitizer microprocessor 71 checks to see if the determined amplitude and frequency data are within predetermined limits defined in the stylus configuration data 175. If they are, then the current continuous sensing operation ends with an indication that the stylus 7-1 is synchronized, otherwise the current continuous sensing process ends with an indication that the stylus 7-1 is not synchronized. Although not shown in FIG. 10c, at the end of the continuous sensing process, the digitizer microprocessor 71 reports the determined stylus position and status data to the operating system 21.

Single-Resonator Stylus
Survey Process

The survey process for the single-resonator stylus 7-2 is similar to the survey process for the battery-powered stylus 7-1 discussed above, except that the single-resonator stylus 7-2 requires power from the digitizer 9 (supplied in the form of an AC magnetic field at approximately its resonant frequency). In general, it is not possible to power the resonator stylus 7-2 across all possible positions above the writing surface 3 with excitation current applied to a single set of sensor board conductors (e.g., with the excitation signal being applied between conductors CV5 and CV27). It is, therefore, usual to survey (and capture) the resonator stylus 7-2 by successively powering selected excitation conductors in turn, adequate to cover the entire area of the writing surface 3. Similarly, in general, it is not possible to detect signals from the resonator stylus 7-2 across all possible positions above the writing surface 3, as the sensing circuit 19 usually has fewer processing channels than there are sensing conductors on the PCB 11. It is, therefore, usual to successively detect signals from selected sensor board conductors in turn. Therefore, in this exemplary embodiment, the digitizer 9 is arranged to repeat the survey process for the resonator stylus 7-2 across a number (in this case three) of different portions of the writing surface 3.

Figure 11A:
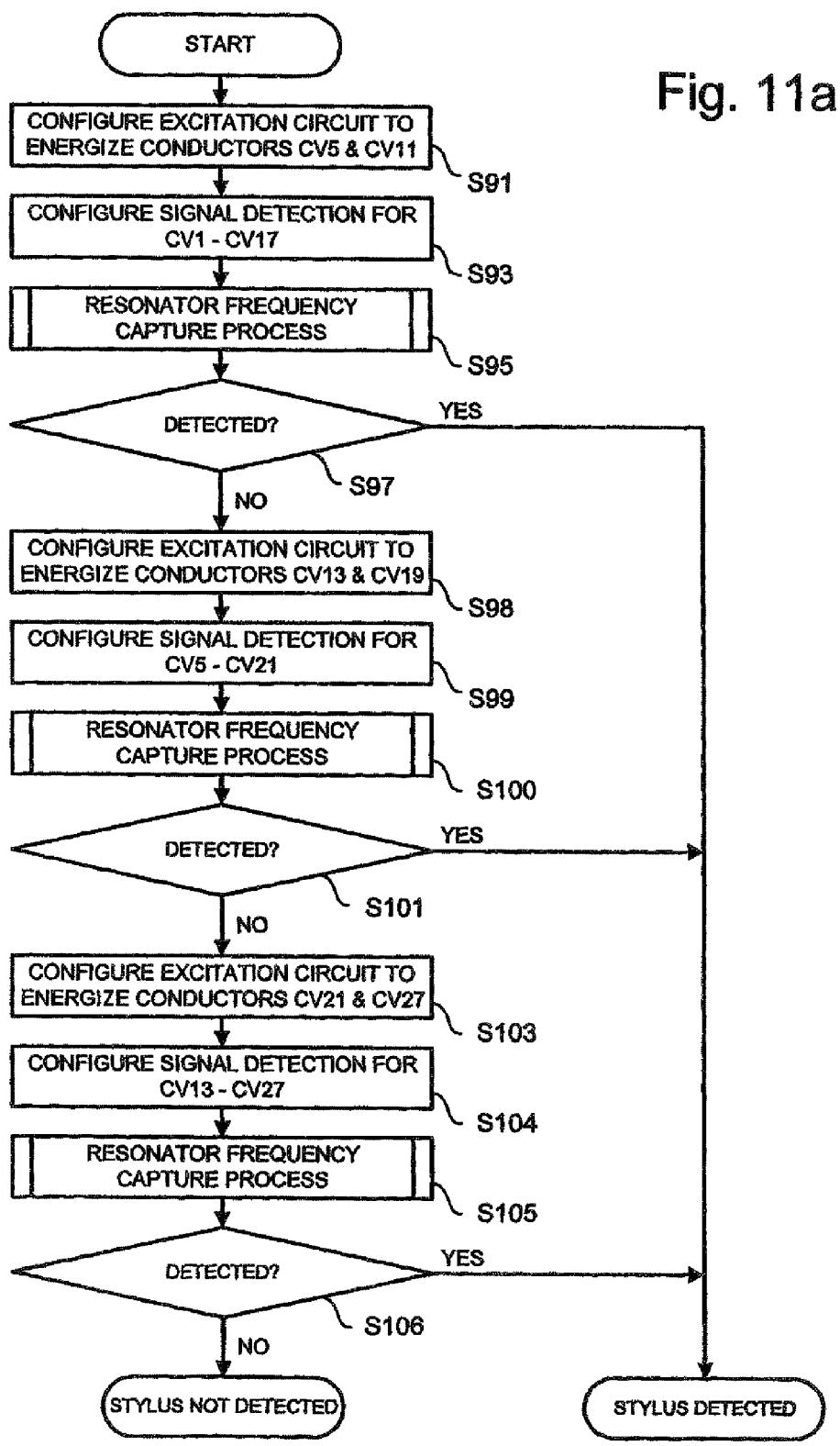
FIG. 11a is a flow chart illustrating the processing steps performed by the digitizer microprocessor during a survey for the resonant stylus shown in FIG. 7b.

FIG. 11a is a flow chart illustrating the resonator stylus 7-2 survey process that is used in this exemplary embodiment. As shown, the survey process starts at step S91, where the digitizer microprocessor 71 configures the excitation circuit 17 to apply the excitation signal across conductors CV5 and CV11. Then, in step S93, the digitizer microprocessor 71 configures the multiplexers 121 in the sensing circuit 19 to detect the signals from conductors CV1 to CV17. The processing then proceeds to step S95, where the digitizer microprocessor 71 processes the signals obtained from the conductors CV1 to CV17 in a resonator frequency capture process (more details of which will be described below), to determine if a resonator stylus 7-2 is above the portion of the writing surface 3 corresponding to conductors CV1 to CV17.

If at step S97, the digitizer microprocessor 71 determines that a resonator stylus 7-2 has been detected, then the survey process ends with an indication that a resonator stylus 7-2 has been detected. Otherwise, a similar processing is performed in steps S98 to S101 when the excitation circuit 17 is configured to apply the excitation signal to conductors CV13 and CV19 and when the sensing circuit 19 is arranged to detect the signals from conductors CV5 to CV21. If no detection is made at step S101, then in steps S103 to S106, a similar processing is carried out when the excitation circuit 17 is configured to apply the excitation signal across conductors CV21 and CV27 and when the sensing circuit 19 is configured to detect signals from conductors CV13 to CV27. If a resonator stylus 7-2 is still not detected in step S106, then the digitizer microprocessor 71 makes a determination that a resonator stylus 7-2 is not present and the survey process ends. If a resonator stylus 7-2 is detected at any of steps S97, S101 or S106, then the survey process ends with an indication that a resonator stylus 7-2 has been detected.

Figure 11B:
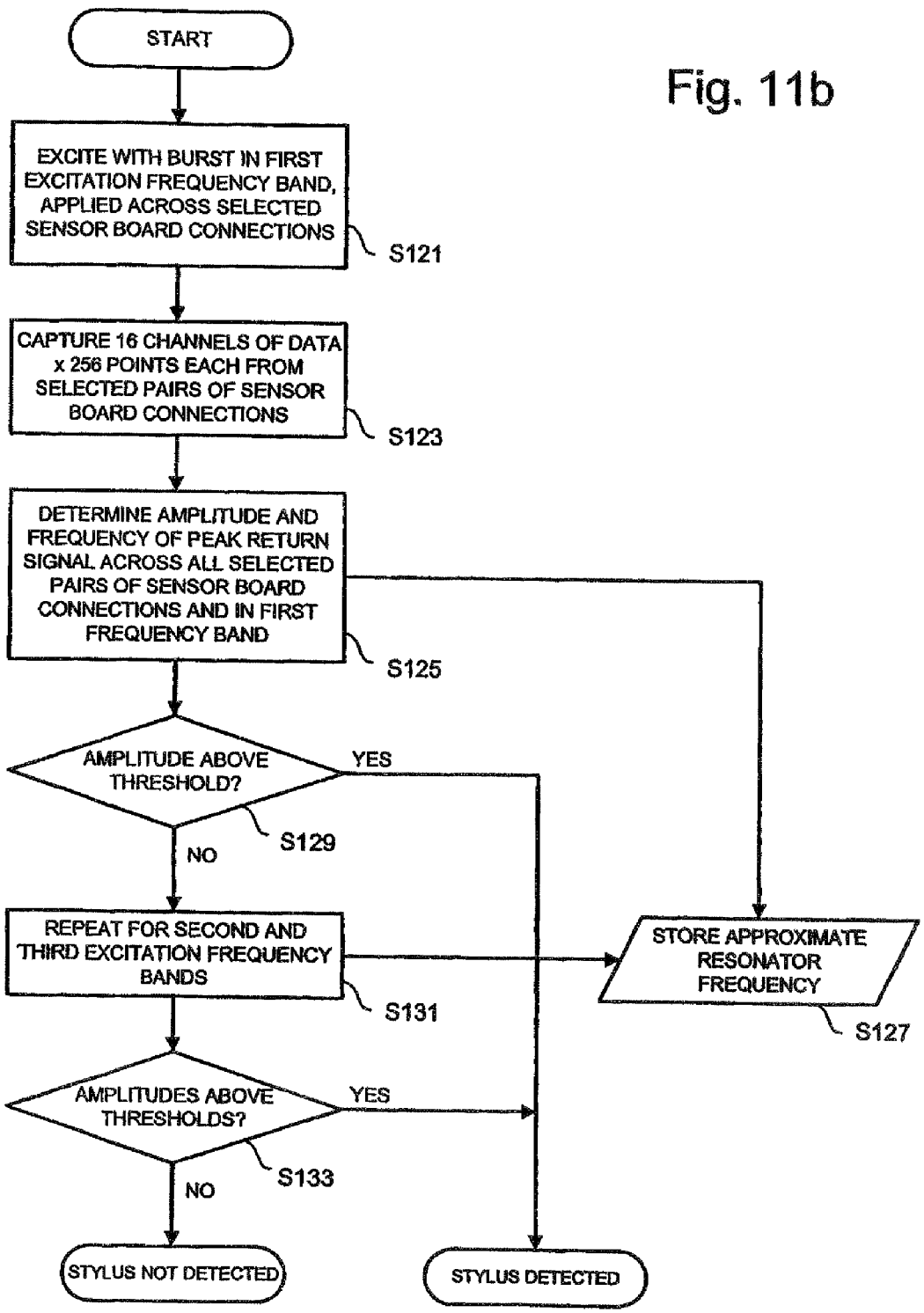
Figure 11C:
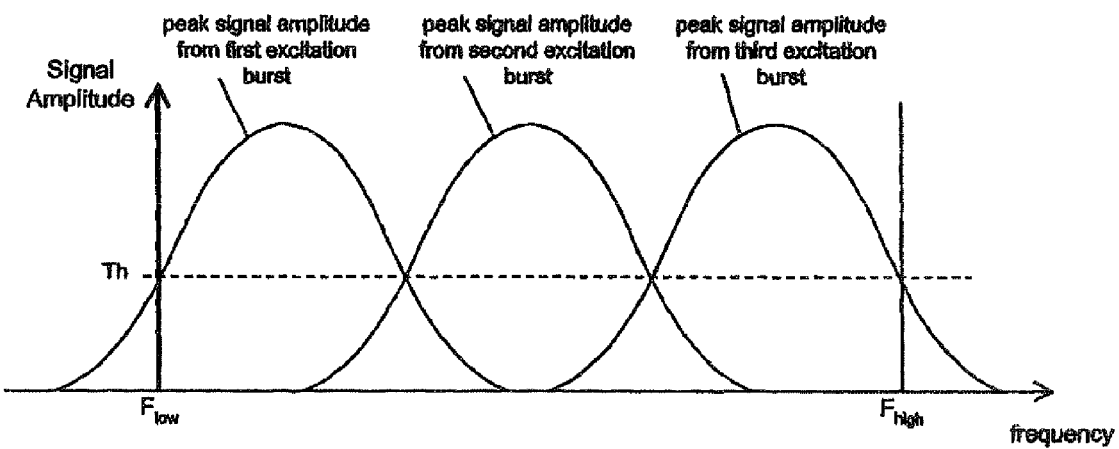
FIG. 11c is a plot illustrating the way in which the digitizer emits bursts of excitation signal over a frequency band of interest in order to detect resonant styluses operating at different frequencies.

FIG. 11b is a flow chart illustrating in more detail the processing steps performed by the digitizer microprocessor 71 in the resonator frequency capture process performed in steps S95, S100 and S105 shown in FIG. 11a. Since the resonant frequency of the stylus 7-2 is unknown, the digitizer microprocessor 71 must search for the stylus 7-2 across the range of possible resonant frequencies defined by the stylus configuration data 175. In general, it will be necessary to search for the stylus 7-2 with a number of excitation bursts across the frequency range of interest ($F_{low}$ to $F_{high}$) which is defined in the stylus configuration data 175. FIG. 11c illustrates how the detected signal level from a representative sensing circuit channel varies with resonator frequency for three different excitation bursts. The number of excitation bursts required depends on the minimum acceptable detected signal level (Th) and the frequency width of each burst. For the survey and subsequent capture processes, it is desirable to minimize the power and time required to detect the stylus 7-2. It is, therefore, desirable that each excitation burst of FIG. 11b covers a broad range of frequencies. This breadth may be achieved by "chirping" the excitation frequency between two or more values during excitation or by employing a small number of excitation cycles. Unfortunately, both of these techniques result in relatively low signal levels returned from the stylus 7. It is, therefore, better to achieve broad coverage not by using these techniques, but by transmitting more than one excitation burst spread out over the frequency band of interest, as shown in FIG. 11c.

Returning to FIG. 11b, in step S121, the digitizer microprocessor 71 causes the excitation circuit 17 to apply a first burst of excitation signal within a first frequency band across the selected pair of excitation conductors. Then, in step S123, the digitizer microprocessor 71 controls the sample and hold circuits 125, the switches 129 and the high speed A/D converter 127 to capture two hundred and fifty-six samples from each of the sixteen selected pairs of X sensing conductors. The processing then proceeds to step S125 where the digitizer microprocessor 71 calculates an FFT of the two hundred and fifty-six samples obtained from each pair of X sensing conductors, from which it determines the amplitude and frequency of the peak sensed signal (i.e., the amplitude and frequency of the largest FFT bin from all of the FFT outputs) within the first frequency band. The digitizer microprocessor 71 stores this determined frequency as the approximate resonator frequency of the stylus 7-2 in step S127.

After step S125, the digitizer microprocessor 71 compares, in step S129, the determined amplitude with a threshold value defined in the stylus configuration data 175. If the determined amplitude is above the threshold, then the digitizer microprocessor 71 determines that a resonator stylus 7-2 is present above the writing surface 3 and the survey process ends. Otherwise, the processing proceeds to step S131 where a similar process is performed for excitation bursts centered in the second and third excitation frequency bands discussed above. In step S133, the digitizer microprocessor 71 compares the amplitude obtained for the second/third excitation frequency bursts with the threshold and if it is above the threshold, then the survey process ends with an indication that a resonator stylus 7-2 has been detected. Otherwise, the survey process ends with an indication that a resonator stylus 7-2 has not been detected.

Although not illustrated in FIG. 11b, it will be apparent to those skilled in the art that the processes performed in steps S121 to S125 are carried out in step S131 for the second and third excitation frequency bands one at a time, with the excitation in the third frequency band only being performed if a resonator stylus 7-2 is not detected in the second frequency band.

Capture Process

The capture process for the single-resonator stylus 7-2 is designed to establish the resonator frequency and position of the stylus 7-2 with precision adequate to enable the continuous sensing process to operate successfully. Its outputs are an optimum excitation configuration for the excitation circuit 17, an optimum X and Y detection configuration for the sensing circuit 19 and an optimum excitation frequency.

As discussed above, the coil select switching circuitry 93 can be set to drive current into a large number of different winding configurations. The optimum excitation configuration is the one that powers the stylus 7-2 the most efficiently. The optimum excitation configuration depends upon the position of the stylus 7-2 and the angle at which the stylus 7-2 is held relative to the writing surface 3.

The optimum X detection configuration is the set of multiplexer control signals that yields the maximum status and position information from the stylus 7-1. It is established by selecting the pair of X sensing conductors with the greatest differential signal level and its nearest neighbours, consistent with any multiplexer control restrictions. The optimum Y detection configuration is calculated in an equivalent way.

Figure 11D:
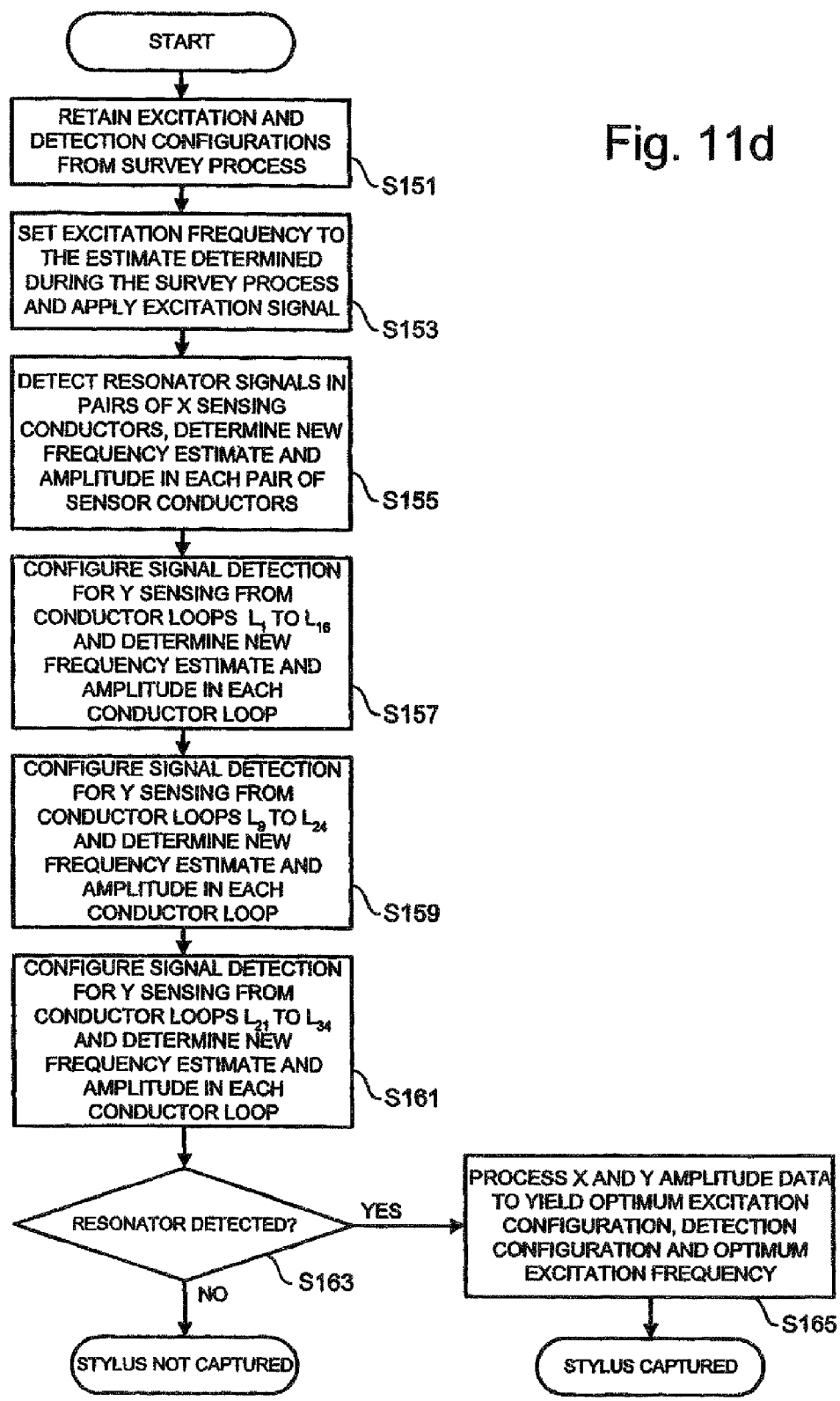
FIG. 11d is a flow chart illustrating the processing steps carried out by the digitizer microprocessor during a capture process for the resonant stylus shown in FIG. 7b.

The capture process used in this exemplary embodiment for the resonant stylus 7-2 is illustrated in FIG. 11d and is performed after a resonant stylus 7-2 has been detected during the survey process described above. As shown, the digitizer microprocessor 71 initially retains, in step S151, the configurations of the excitation circuit 17 and the sensing circuit 19 from the survey process. In step S153, the digitizer microprocessor 71 sets the excitation frequency in accordance with the approximate resonator frequency determined during the survey process (which was stored in step S127) and then controls the excitation circuit 17 to apply the excitation signal to the appropriate sensor board connections defined by the excitation configuration. The excitation frequency may be set equal to the determined resonator frequency or it may be set to one of a small number of possible frequencies, or to a frequency that the excitation circuit can generate with particular accuracy and purity. After step S153, the processing proceeds to step S155, where the digitizer microprocessor 71 configures the sensing circuit 19 to detect the signals from the X sensing conductors defined by the current detection configuration. In step S155, the digitizer microprocessor 71 also processes the sample values obtained from the sensing circuit 19 to determine a new estimate of the stylus frequency and to determine the above described amplitude vector $A_x$ in accordance with processing performed in steps S203 to S211 described above.

The processing then proceeds to step S157, where the digitizer microprocessor 71 configures the multiplexers 121 in the sensing circuit 19 to connect conductor loops $L_1$ to $L_{16}$ to the sixteen processing channels of the sensing circuit 19. At step S157, the digitizer microprocessor 71 also obtains the signal samples from those conductor loops (after an appropriate excitation burst has been applied to the excitation conductors defined by the current excitation configuration) and processes them to determine a new estimate of the resonant frequency of the stylus 7-2 and a vector of amplitude data ($A_Y$) for those conductor loops $L_1$ to $L_{16}$. The processing then proceeds to step S159 where a similar process is performed for conductor loops $L_9$ to $L_{24}$. The processing then proceeds to step S161 where a similar process is performed for conductor loops $L_{21}$ to $L_{34}$. The signals from overlapping groups of the conductor loops are processed as readings from separate excitations with non-overlapping groups may not be easily combined as there may not be a common phase reference between the excitation bursts. The particular groups of conductor loops used above were chosen based on the constraints of the multiplexers 121.

In step S163 the digitizer microprocessor 71 processes the amplitude data obtained in steps S155 to S161 to determine whether or not a resonator stylus 7-2 has been detected. In this exemplary embodiment, it does this by comparing the determined amplitude values and the determined frequency estimates with predetermined threshold values defined in the stylus configuration data 175. If the resonator stylus 7-2 is not detected, then the capture process outputs a determination that the stylus 7-2 has not been captured. If the digitizer microprocessor 71 determines that a resonator stylus 7-2 has been detected, then the processing proceeds to step S165 where the digitizer microprocessor 71 processes the X and Y amplitude data to determine the optimum excitation configuration for the current position and tilt of the stylus 7-2.

The technique used in this exemplary embodiment to determine the optimum excitation configuration will now be described. The digitizer microprocessor 71 stores a table of the different excitation configurations that can be used. This table identifies the name of the excitation configuration and the conductors (CV) of the digitizer winding 51 that will be connected to the excitation circuit 17 for that excitation configuration. At this point in the capture process, the digitizer microprocessor 71 has established the above described amplitude vectors $A_X$ and $A_Y$ for the X sensing conductors and the Y sensing conductors, respectively. As those skilled in the art will appreciate, the amplitude values in these vectors are proportional to the coupling factors between the corresponding X and Y sensing conductors and the resonator stylus 7-2. Since the conductors that will be used for excitation have a fixed positional relationship with the conductors that are connected to the sensing circuit 19 (and indeed in some cases they are the same conductors), the digitizer microprocessor 71 uses different combinations of these amplitude values to determine approximate couplings between the resonator stylus 7-2 and the conductors of a number of candidate excitation configurations (i.e., those most likely to be closest to the optimum configuration). The determined couplings for the different excitation configurations represent the efficiency with which each candidate excitation configuration will couple to and, therefore, power the resonant stylus 7-2. To give an example, for an excitation configuration in which the excitation circuit 17 is connected to conductors CV1 and CV5, the digitizer microprocessor 71 calculates an efficiency figure for that excitation configuration from the following equation:

$$E_{\!f\!f}(EC1) = D(EC1) \cdot [A(CV1-CV2) + A(CV2-CV3) + A(CV3-CV4) + A(CV4-CV5)]$$

where A(CV1–CV2) is the amplitude value obtained from the signals from the pair of X sensing conductors CV1 and CV2 etc; and D(EC1) is a factor established during digitizer design which corrects for the relative efficiency of this excitation configuration (EC1), which takes into account, among other things, the effective conductor path resistance for this excitation configuration.

In determining an efficiency figure for each excitation configuration, the digitizer microprocessor 71 will calculate a different combination of the amplitude values depending on the relative position between the coil formed by the excitation configuration and the coils that provide the sensed amplitude values. For some excitation configurations, this may simply be a weighted value of one amplitude value.

Having established an efficiency figure for each candidate excitation configuration, the digitizer microprocessor 71 then selects the excitation configuration having the greatest efficiency figure as the optimum excitation configuration.

In step S165, the digitizer microprocessor 71 also uses the X and Y amplitude data to identify the optimum X and Y detection configurations (corresponding to the X and Y conductors closest to those that yielded the largest amplitude data). In step S165, the digitizer microprocessor 71 also stores the last resonator frequency estimate (determined in step S161) as the optimum excitation frequency. The capture process then ends with an indication that the resonator stylus 7-2 has been captured.

Continuous Sensing Process

Like the powered stylus 7-1, the single-resonator stylus 7-2 returns a frequency to the digitizer 9 whose value indicates stylus status, such as the state of the side switch 199 and the pressure applied to the stylus tip 195. However, the single-resonator stylus 7-2 requires power from the digitizer 9, supplied in the form of an AC magnetic field at approximately its resonant frequency. Therefore, other than the provision of an appropriate burst of excitation signal immediately before signal detection, the continuous sensing operation for the single-resonator stylus 7-2 proceeds in a similar manner to the continuous sensing operation for the battery-powered stylus 7-1.

Figure 11E:
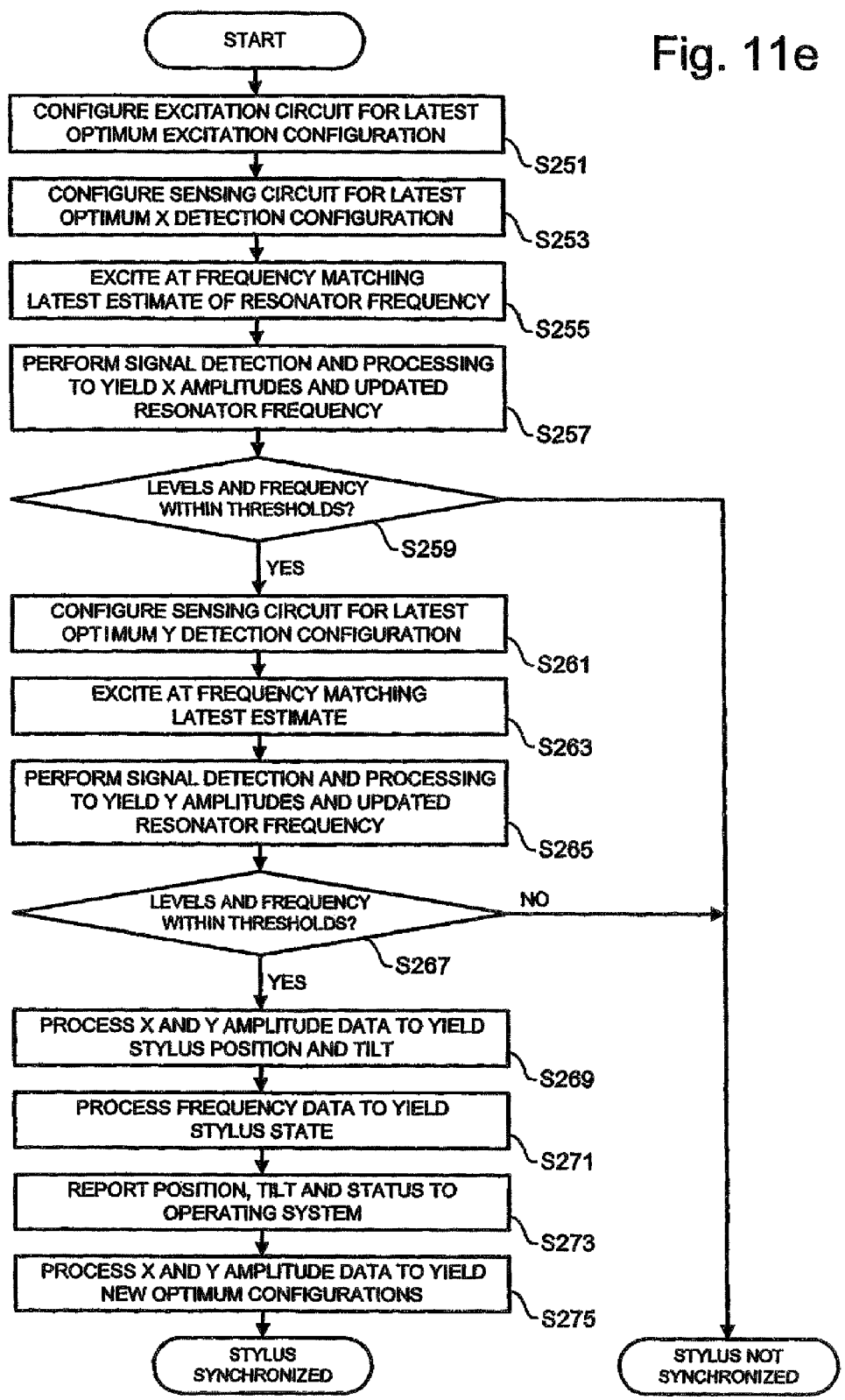
FIG. 11e is a flow chart illustrating the processing steps carried by the digitizer microprocessor to continuously track the position and status of the resonant stylus shown in FIG. 7b.

FIG. 11e is a simplified flow chart illustrating the processing steps performed during the continuous sensing process for the single-resonator stylus 7-2. As shown, in step S251, the digitizer microprocessor 71 configures the excitation circuit 17 for the latest optimum excitation configuration determined either in the previous continuous sensing processing step or from the previous capture process discussed above. The processing then proceeds to step S253 where the digitizer microprocessor 71 configures the sensing circuit 19 for the latest optimum X detection configuration which was again determined from the previous continuous sensing process step or from the previous capture process discussed above. The processing then proceeds to step S255 where the digitizer microprocessor 71 causes an excitation signal to be applied to the optimum excitation configuration at a frequency matching the latest estimate for the resonant frequency of the stylus 7-2. Again, this latest estimate of the resonator frequency is obtained either from the previous continuous sensing process step or from the previous capture process described above.

The processing then proceeds to step S257 where the digitizer microprocessor 71 performs signal detection of the signals from the optimum X detection configuration to yield the above described vector of amplitude values $A_X$ and an updated estimate of the resonator frequency. The steps performed in step S257 are similar to those performed in steps S203 to S211 for the battery-powered stylus 7-1 discussed above. In step S259, the digitizer microprocessor 71 checks if the determined amplitude levels and the updated resonator frequency estimate are within predetermined thresholds defined in the stylus configuration data 175 for the single-resonator stylus 7-2. If they are not, then the continuous processing ends with an indication that the stylus 7-2 has not been synchronized.

If the amplitude levels and the updated resonator frequency estimate are within the thresholds, then the processing proceeds to step S261, where the digitizer microprocessor 71 configures the sensing circuit 19 for the latest optimum Y detection configuration which is again determined either from the previous continuous sensing process step or from the capture process described above. The processing then proceeds to step S263, where the digitizer microprocessor 71 causes another burst of excitation frequency (at the updated resonator frequency) to be applied to the current optimum excitation configuration. The processing then proceeds to step S265, where the digitizer microprocessor 71 performs a similar signal processing to the processing performed in step S257 described above, in order to determine the vector of Y amplitude values ($A_Y$) and a further updated estimate of the resonator frequency. The digitizer microprocessor 71 then compares in step S267, the determined vector of amplitude levels ($A_Y$) and the updated resonator frequency with the thresholds defined in the stylus configuration data 175. If the amplitude levels and the updated resonator frequency are not within those thresholds, then the continuous processing ends with an indication that the stylus 7-2 is not synchronized.

Provided the signal levels ($A_Y$) and the updated resonator frequency are within the thresholds, then the processing proceeds to step S269, where the digitizer microprocessor 71 processes the X and Y amplitude data (i.e., vectors $A_X$ and $A_Y$) to yield the stylus 7-2 position and tilt. In this exemplary embodiment, the processing performed in step S269 is similar to the processing performed in steps S227 to S231 discussed above for the battery-powered stylus 7-1. The processing then proceeds to step S271, where the digitizer microprocessor 71 processes the frequency data obtained from the stylus 7-2 to yield the status of the side switch 199 and the pressure applied to the tip 195 of the stylus 7-2. The processing performed in step S271 is similar to the processing performed in step S223 described above for the battery-powered stylus 7-1. Once the digitizer microprocessor 71 has determined the current position, tilt and status of the stylus 7-2, it reports these to the operating system 21 in step S273. The processing then proceeds to step S275 where the digitizer microprocessor 71 processes the X and Y amplitude data ($A_X$ and $A_Y$) to yield new optimum configurations such as the optimum excitation and detection configurations and the optimum excitation frequency, for use in the next continuous sensing processing. The current continuous sensing processing then ends together with an indication that the stylus 7-2 is synchronized.

Stylus with Processing Electronics

Survey Process

The survey process for the stylus 7-3 with processing electronics is the same as the survey process described above for the single-resonator stylus 7-2. A further description is, therefore, not necessary.

Capture Process

Figure 12A:
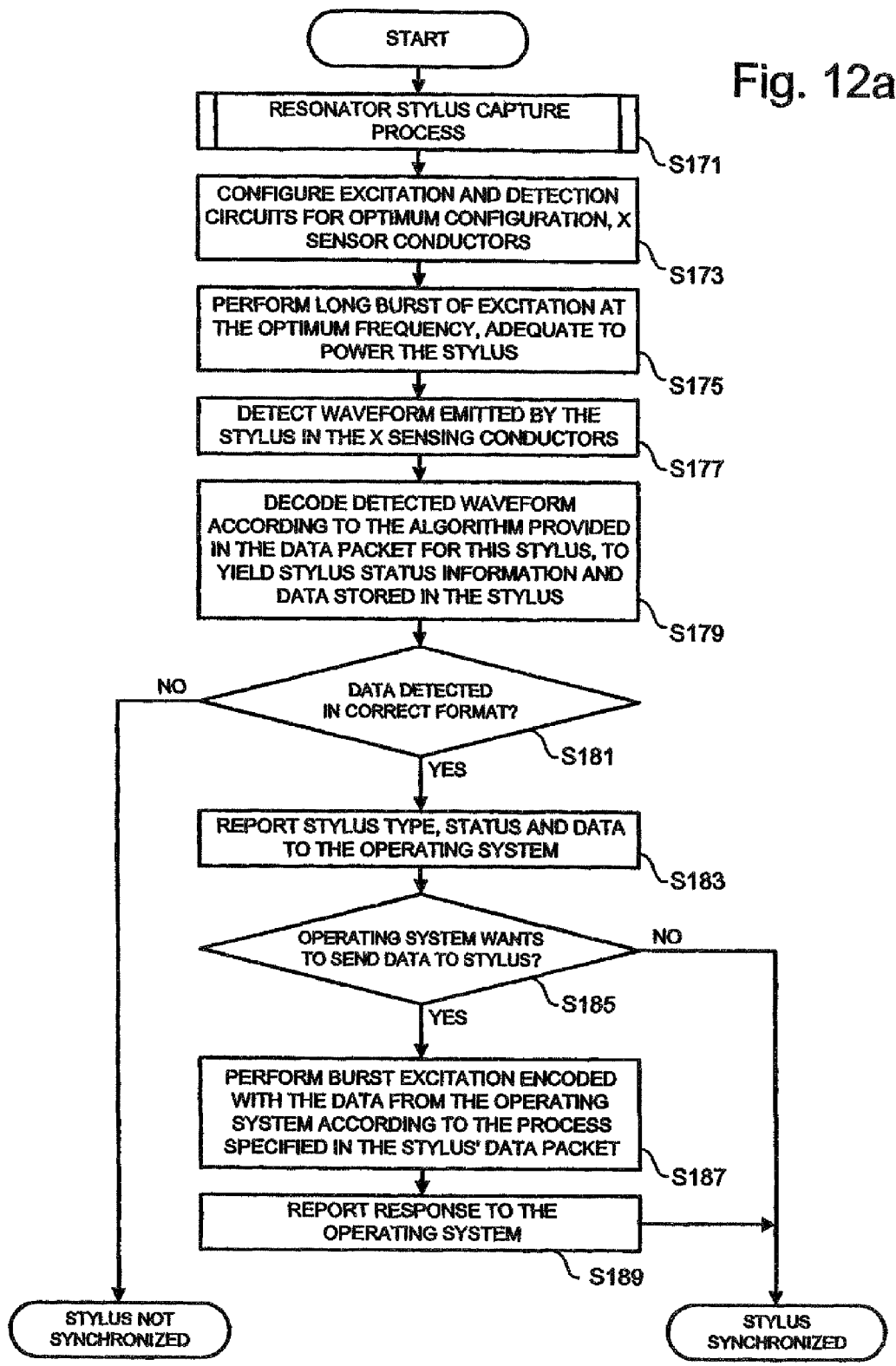
FIG. 12a is a flow chart illustrating the processing steps carried out by the digitizer microprocessor during a capture process for the electronic stylus shown in FIG. 7c.

The capture process for the stylus 7-3 with processing electronics will now be described with reference to FIG. 12a. As shown, in step S171, the capture process starts with the capture process shown in FIG. 11d for the resonant stylus 7-2. Assuming that the resonator 205 has been detected in this processing step, the processing then proceeds to step S173, where the digitizer microprocessor 71 configures the excitation circuit 17 for optimum excitation and configures the sensing circuit 19 to sense on the optimum X sensing conductors. The processing then proceeds to step S175 where the digitizer microprocessor 71 controls the excitation circuit 17 to apply a long burst of excitation current to the determined optimum excitation conductors at the determined optimum excitation frequency. The processing then proceeds to step S177 where the digitizer microprocessor 71 processes the signals from the sensing circuit 19 to detect the waveform emitted by the stylus 7-3. The processing then proceeds to step S179, where, provided the amplitude and frequency of the detected waveform are within predetermined thresholds, the digitizer microprocessor 71 decodes the detected waveform according to the algorithm specified in the stylus configuration data 175 for stylus 7-3, to yield the stylus status information and any other data stored in the stylus 7-3.

The processing then proceeds to step S181, where the digitizer microprocessor 71 checks to see if the data that is detected conforms to a specified format, as defined by the stylus configuration data 175. If it does not, then the capture process ends and the capture process outputs that the processing electronics stylus 7-3 has not been synchronized. If the detected data does conform to the specified format, then the processing proceeds from step S181 to step S183, where the digitizer microprocessor 71 reports the stylus type, its status and the data received to the operating system 21.

The processing then proceeds to step S185 where the digitizer microprocessor 71 checks to see if the operating system 21 wants to send data to the stylus 7-3. If it does not, then the capture process ends with an indication that the stylus 7-3 has been synchronized with the digitizer 9. On the other hand, if the operating system 21 does want to transmit data to the stylus 7-3 then the processing proceeds to step S187, where the digitizer microprocessor 71 controls the excitation circuit 17 to transmit a burst of excitation signal encoded with the data to be sent to the stylus 7-3. The digitizer microprocessor 71 encodes the data onto the excitation burst in accordance with a protocol defined in the stylus calibration data 175 for stylus 7-3. The processing then proceeds to step S189 where the digitizer microprocessor 71 reports any response from the stylus 7-3 to the operating system 21 following a similar process to steps S177 and S179 discussed above. Provided the response does not fail, the capture process then ends with an indication that the stylus 7-3 has been synchronized.

Continuous Sensing Process

Figure 12B:
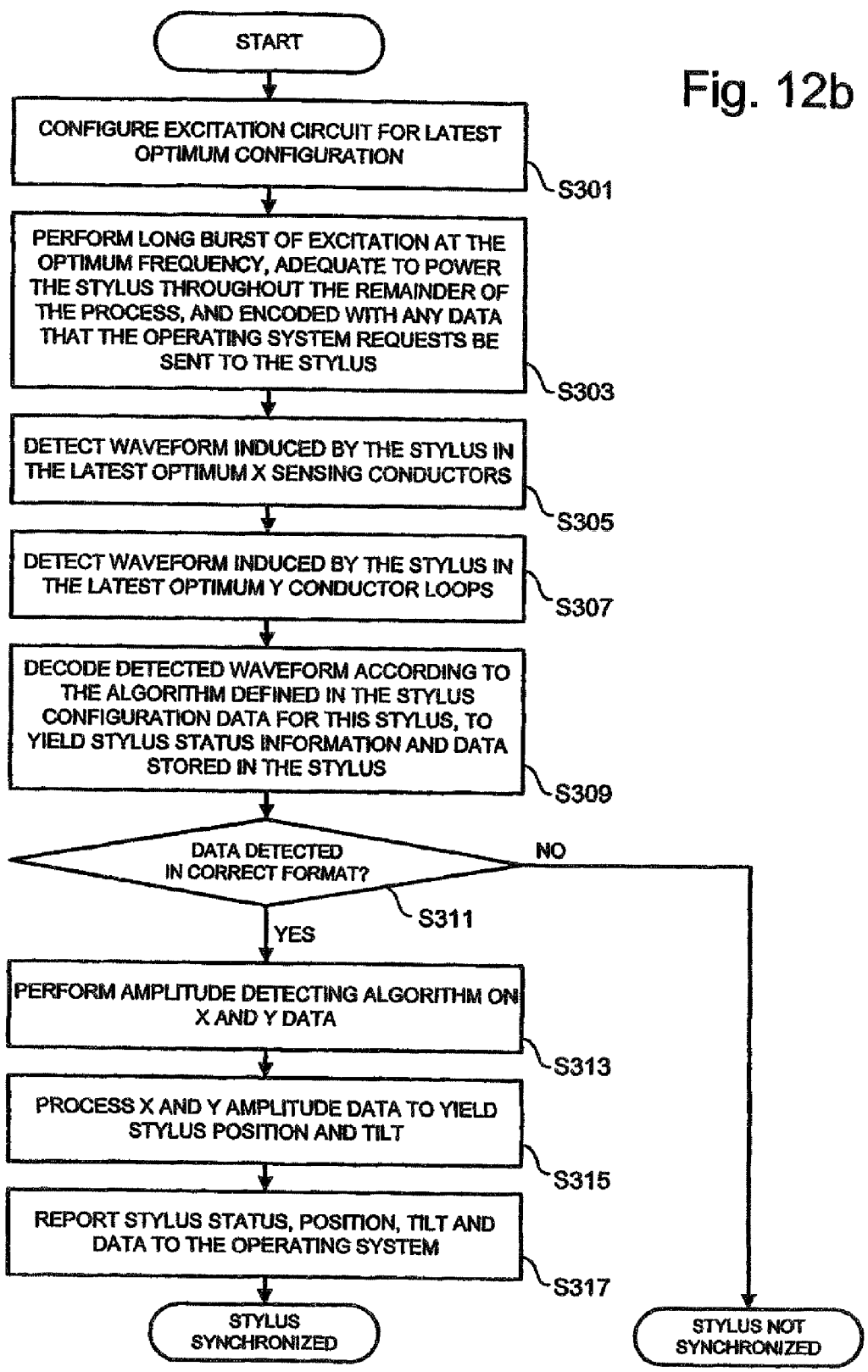
FIG. 12b is a flow chart illustrating the processing steps performed by the digitizer microprocessor to continuously track the position and status of the electronic stylus shown in FIG. 7c.

The continuing sensing process for the stylus 7-3 with processing electronics 191 is shown in FIG. 12*b*. As shown, the processing begins at step S301, where the digitizer microprocessor 71 configures the excitation circuit 17 for the latest optimum excitation configuration. The processing then proceeds to step S303 where the digitizer microprocessor 71 causes a long burst of excitation signal to be applied to the optimum excitation configuration at the optimum excitation frequency. In this exemplary embodiment, the duration of the burst of excitation signal is chosen so that it is adequate to power the stylus 7-3 throughout the remainder of the current continuous sensing process step. Additionally, in this exemplary embodiment, if any data is to be transmitted to the stylus 7-3 from the operating system 21 then this data is encoded onto the excitation burst. A storage capacitor (not shown) is provided in the stylus 7-3 in order to retain the energy for the remainder of the continuous sensing process after the excitation burst has ended.

The processing then proceeds to step S305 where the digitizer microprocessor 71 configures the sensing circuit 19 so that it can detect the waveform of the signals induced in the optimum X sensing conductors. Subsequently, in step S307, the digitizer microprocessor configures the sensing circuit 19 to detect the waveform induced in the optimum Y sensing conductor loops. The processing then proceeds to step S309, where, provided the amplitude and frequency of the detected waveform are within predetermined thresholds, the digitizer microprocessor 71 decodes the detected waveform according to the algorithm specified in the stylus calibration data 175 for this stylus 7-3, to yield the stylus status information and any data stored in the stylus 7-3.

In step S311, the digitizer microprocessor 71 determines whether or not the detected data conforms to a specified format, as defined in the stylus configuration data 175 for this stylus 7-3. If there is any error correction/detection in the data transfer protocol used, then detected errors here may also indicate desynchronization. If the data does not conform to the specified format or if the data transfer includes errors, then the continuous sensing process ends with an indication that the stylus 7-3 is not synchronized. If the detected data does conform to the specified format and does not include errors, then the processing proceeds to step S313 where the digitizer microprocessor 71 carries out an amplitude detection algorithm on the X and Y data to determine the above described amplitude vectors ($A_X$ and $A_Y$). The particular amplitude detection algorithm used will be slightly more complex than the algorithm used for the battery-powered stylus 7-1 due to the coded nature of the data that is returned. However, the stylus configuration data 175 for this stylus 7-3 includes data specifying the amplitude detection algorithm to be used.

The processing then proceeds to step S315 where the digitizer microprocessor 71 processes the X and Y amplitude vectors to yield the stylus position and tilt relative to the writing surface 3. The processing then proceeds to step S317 where the digitizer microprocessor 71 reports the stylus status, position, tilt and data to the operating system 21. The current cycle of the continuous sensing process then ends together with an indication that the stylus 7-3 is synchronized.

Two-Resonator Stylus

Survey and Capture Processes

The capture and survey processes for the two-resonator stylus 7-4 shown in FIG. 7*d* are the same as the survey and capture processes for the single-resonator stylus 7-2, except that there are now two frequencies of interest in different bands. The first resonator frequency is detected as above, while the detection of the second resonator frequency is simplified because the same excitation and detection conductor settings can be used. It will be apparent to those skilled in the art how to modify the single-resonator stylus survey and capture processes discussed above for the two-resonator stylus 7-3. A further description will, therefore, be omitted.

Continuous Sensing Process

FIG. 13*a* is a flow chart illustrating the main processing steps performed in the continuous sensing process for the two-resonator stylus 7-4 shown in FIG. 7*d*. As shown, the continuous sensing process begins at step S331, where the digitizer microprocessor 71 configures the excitation circuit 17 for the latest optimum excitation configuration. The processing then proceeds to step S333, where the digitizer microprocessor 71 configures the sensing circuit 19 for the latest optimum X detection configuration. The processing then proceeds to step S335 where the digitizer microprocessor 71 causes the excitation circuit 17 to excite the optimum excitation configuration at a frequency matching the latest estimate for the resonant frequency $F_1$ of the first resonator 209. In step S337 the digitizer microprocessor 71 processes the signals from the optimum X detection configuration to yield the vector of X amplitudes ($A_X$) and an updated estimate of the resonator frequency $F_1$. At step S337, the digitizer microprocessor also determines the Q-factor ($Q_1$) for the first resonator 209.

Figure 13B:
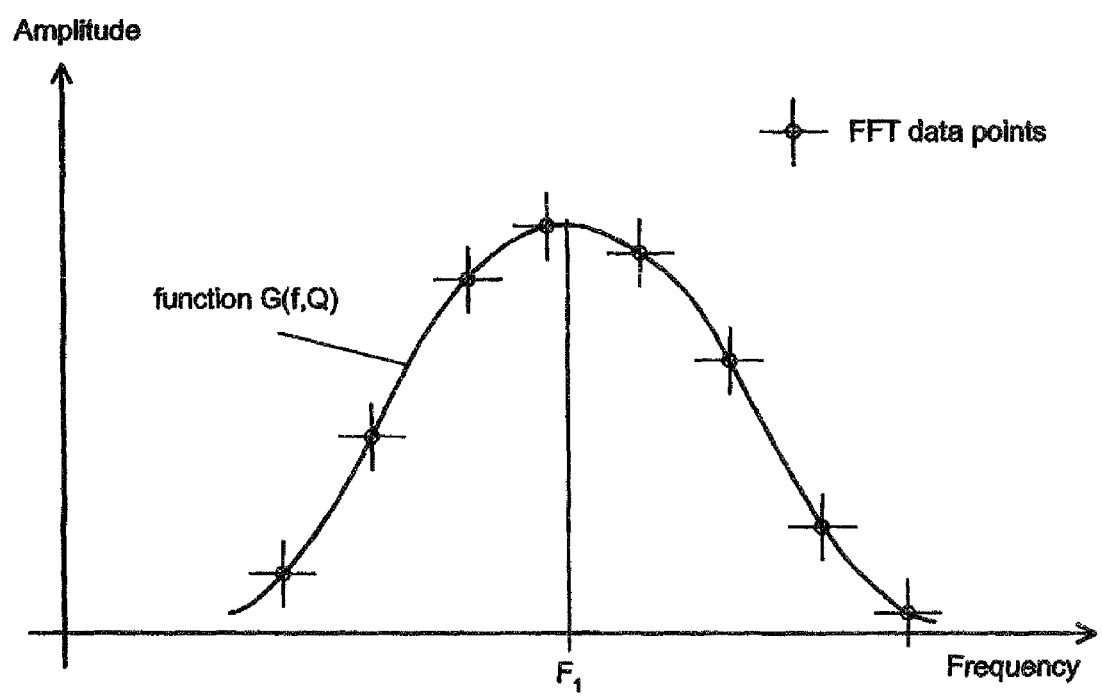
FIG. 13b is a spectral plot used by the digitizer microprocessor to determine the resonator frequency and Q factor of the resonators forming part of the stylus shown in FIG. 7d.

In this exemplary embodiment, the digitizer microprocessor 71 estimates the resonant frequency and Q factor data by fitting the FFT data obtained for the pair of X sensing conductors having the maximum signal level, to an appropriate fitting function. FIG. 13*b* is a plot illustrating the way in which the FFT amplitudes will vary with frequency around a peak corresponding to the resonant frequency. FIG. 13*b* also illustrates the function G(f,Q) which is used to fit the plotted FFT data points. In this exemplary embodiment, the following function G(f,Q) is used:

$$G(f, Q) = \frac{A_0\left(\frac{f}{f_{res}}\right)}{\sqrt{\left(1 - \left(\frac{f}{f_{res}}\right)^2\right)^2 + \left(\left(\frac{f}{f_{res}}\right)\frac{1}{Q}\right)^2}}$$

where $A_0$ is an arbitrary amplitude constant which is included in the fitting process. Therefore, given the FFT data points obtained for the X channel having the largest signal level, the digitizer microprocessor 71 fits these FFT data points to this function to obtain the best fit estimate of the resonant frequency ($F_1$) and the Q-factor ($Q_1$) of the first resonator 209.

In step S339, the digitizer microprocessor 71 excites the optimum excitation configuration with an excitation signal having a frequency matching the latest estimate for the resonant frequency ($F_2$) of the second resonator 211. The processing then proceeds to step S341 where the digitizer microprocessor 71 processes the signals induced in the optimum X detection configuration to yield a new estimate of the resonant frequency $F_2$ and an estimate of the Q factor ($Q_2$) for the second resonator 211. The processing performed in step S341 is similar to the processing performed in step S337 discussed above, except the microprocessor 71 does not determine the vector of amplitude values for the second resonator 211.

In step S343, the digitizer microprocessor 71 determines whether or not the amplitude levels and the estimates of the resonant frequencies are within predefined thresholds defined in the stylus calibration data 175 for the two-resonator stylus 7-4. If they are not within these thresholds, then the continuous sensing process ends with an indication that the stylus 7-4 is not synchronized. Otherwise, the processing continues to step S345 where the digitizer microprocessor 71 configures the sensing circuit 19 for the latest optimum Y detection configuration. In steps 347 and S349 the digitizer microprocessor performs a similar process to steps S335 and S337 discussed above, to obtain the vector of Y amplitudes ($A_Y$) and a new updated estimate of the resonant frequency $F_1$.

In step S351 the digitizer microprocessor 71 checks if the levels within the amplitude vector $A_Y$ and the new resonator frequency estimate $F_1$ are still within the thresholds. If they are not, then the continuous sensing process ends with an indication that the stylus 7-4 is not synchronized. If these values are within the thresholds, then the processing continues to step S353, where the digitizer microprocessor 71 processes the X and Y amplitude vectors ($A_X$ and $A_Y$) to determine the stylus position and tilt. The processing then proceeds to step S355 where the digitizer microprocessor 71 processes the Q factor data determined in steps S337 and S341 to yield the status of the stylus 7-4 and in particular the status of the side switch 199 and the pressure applied to the tip 195 of the stylus 7-4. The digitizer microprocessor 71 then reports, in step S357, the determined position, tilt and status to the operating system 21. Finally, in step S359, the digitizer microprocessor 71 processes the X and Y amplitude data to yield new optimum excitation and detection configurations. The continuous sensing process then ends with an indication that the stylus 7-4 is synchronized.

RFID Tag

The process for detecting and communicating with the RFID tag 213 is similar to that used for the stylus with processing electronics discussed above, except that position calculation may be omitted if desired. Alternatively, the RFID tag's position may be used to relay the user's gestures to the host system for use by applications making use of the RFID tag data.

The digitizer microprocessor 71 may configure the sensing circuit 19 to detect signals from a single pair of sensing conductors with adequate signal level, so that the full sample rate of the A/D converter 127 is available to detect the coded signal. This approach is appropriate when the signalling frequency of the RFID tag is an appreciable fraction of the A/D sample rate.

Typical applications for the RFID tag include applications such as inventory control and monitoring, security access, digital signature and bill payment.

SUMMARY AND ADVANTAGES

A tablet PC 1 has been described above having an embedded X-Y digitizer 9. The digitizer 9 included a digitizer winding PCB 11 for sensing magnetic fields generated by a stylus 7 that is moved over a writing surface 3 of the tablet PC 1. The PCB geometries (line widths, gaps and via sizes) were all designed to enable manufacture of the PCB 11 at low cost and high yield. This was achieved by using non-overlapping single turn windings. Although not described above, the PCB 11 is preferably fitted with a screen to the rear (i.e., away from the display 5), and the connection pads 41 are preferably provided on a flexible portion of the circuit board 11 which can be folded back behind the screen to connect with the digitizer electronics 13. This screen preferably includes a magnetically permeable material such as mumetal or spin melt ribbon. The screen is preferably laminated with a non-permeable conductive material such as copper or aluminium foil to the rear, for repelling magnetic fields from below, thereby improving the immunity of the digitizer windings from spurious emissions. This non-permeable layer also minimizes the distorting effects of magnetic materials placed behind the sensor board 11.

As a result of the use of non-overlapping single turn digitizer windings on the PCB 11, the excitation circuit 17 is specially designed for driving low impedance loads. In particular, the excitation circuit 17 is capable of driving a relatively large AC current at low excitation voltages, while maintaining high efficiency and with low spurious emissions across a broad range of operating frequencies. This broad range of frequencies enables the system to power the stylus 7 across a broad frequency range at high efficiency by matching its resonant frequency. It also enables the system to power a variety of electronic styluses 7 having different operating frequencies.

Finally, the digitizer electronics were arranged to be able to power and to detect the signals from a number of different types of stylus 7. The data necessary for allowing the digitizer electronics 13 to be able to distinguish the different types of stylus 7 is programmed into the digitizer electronics 13 in advance as the stylus configuration data 175. Further, since new stylus configuration data 175 can be downloaded into the digitizer electronics 13 after manufacture, the tablet PC 1 has the advantage that it can be adapted to future designs of the different types of stylus 7 and to future types of stylus 7.

MODIFICATIONS AND ALTERNATIVE EMBODIMENTS

A detailed description has been given above of an exemplary embodiment illustrating the various novel features of the digitizer 9. As those skilled in the art will appreciate, various modifications can be made to the above system while achieving many of the advantages described above. A number of these modifications and alternatives will now be described.

Figure 14A:
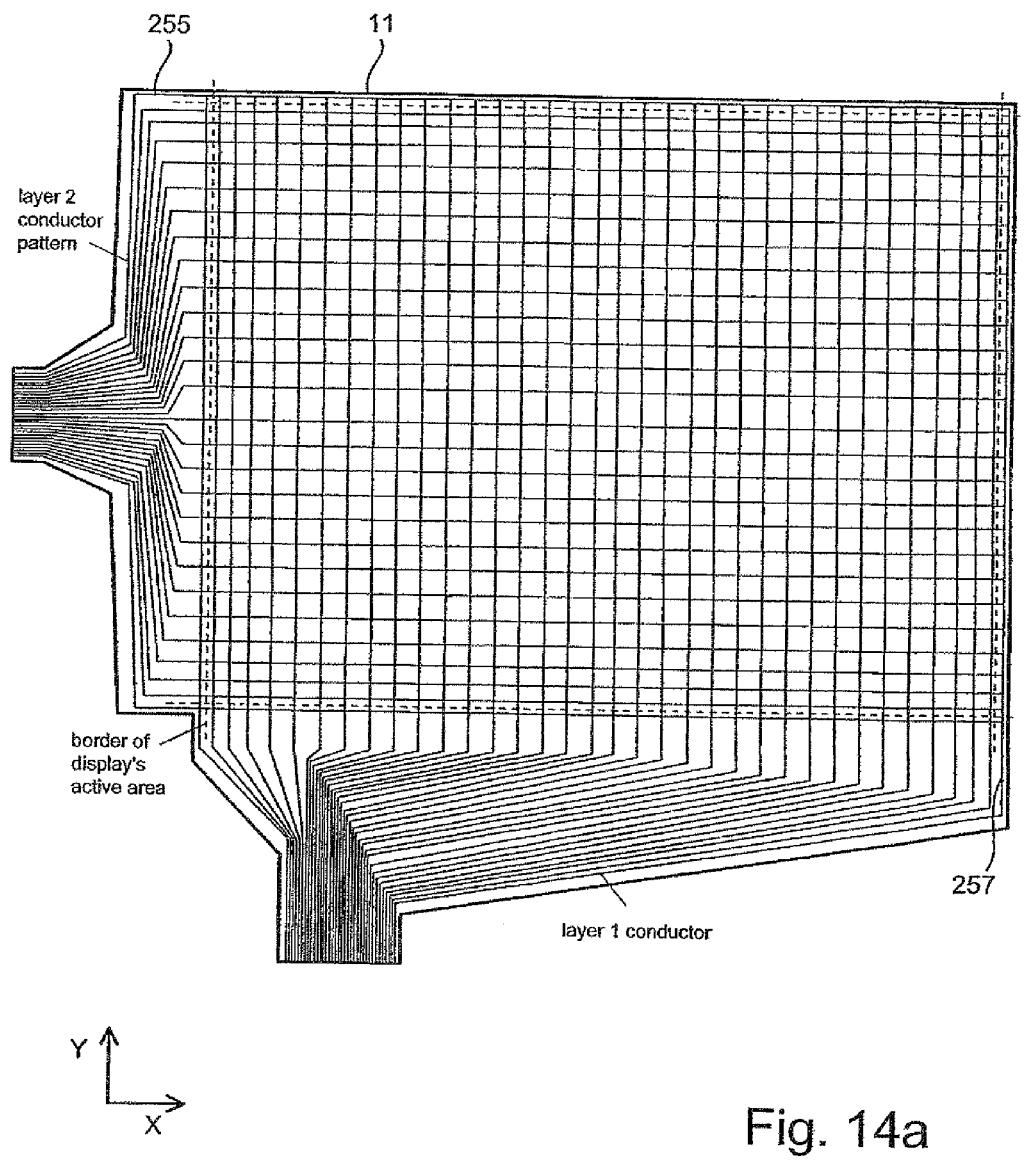
FIG. 14a schematically illustrates the form of an alternative set of X and Y windings which may be used in the digitizer shown in FIG. 1.
Figure 14B:
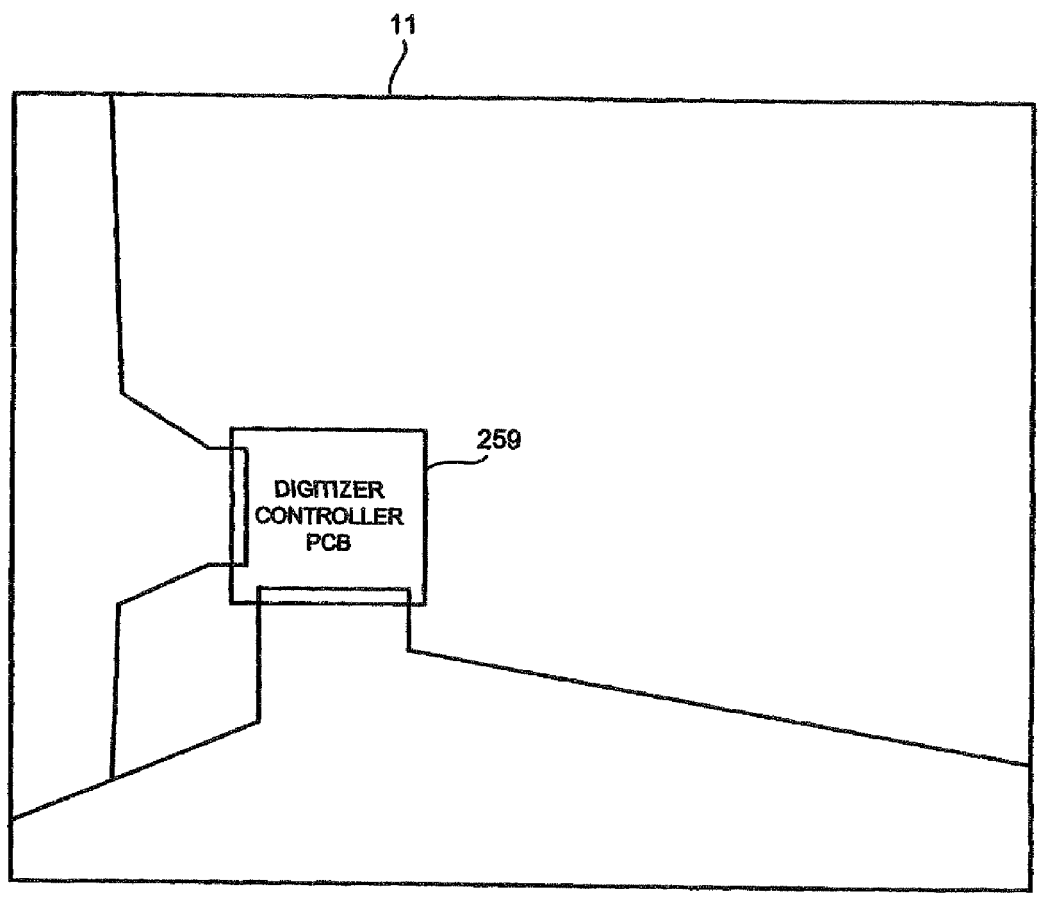
FIG. 14b schematically illustrates the way in which the windings shown in FIG. 14a may be folded underneath a rigid support for connection to a digitizer controller printed circuit board.

In the above exemplary embodiment, a comb-type winding 51 and an array of non-overlapping conductor loops $L_i$ were provided for position sensing. The advantage of using the combination of a comb-type winding 51 and the array of conductor loops $L_i$ is that the connections from these windings to the digitizer electronics 13 can be made at one side of the PCB 11 (as illustrated in FIG. 2d). However, as those skilled in the art will appreciate, it is not essential to employ this combination of digitizer windings. FIG. 14a schematically illustrates an alternative arrangement of digitizer windings in which two comb-type windings 255 and 257 are provided, one extending in the X direction and the other extending in the Y direction. As a result, and as shown in FIG. 14a, the connections from the two comb windings 255 and 257 are provided at two sides of the PCB 11. However, if these connections are provided on flexible portions of the circuit board 11, then, as shown in FIG. 14b, they can be folded behind the active area of the digitizer windings to connect to a digitizer controller PCB 259 (carrying the digitizer electronics 13) located underneath the PCB 11. Similarly, it is not essential to use any comb-type winding with the new excitation circuit and the new processing circuitry described above.

For example, the new processing circuitry discussed above can be used with the prior art type loop coils described in U.S. Pat. No. 4,878,553.

In the exemplary embodiment described above, the connections to adjacent conductor loops $L_i$ shared a common return path which was also one of the X sensing conductors of the comb winding 51. This arrangement offers the advantage of minimizing the number of connections back to the digitizer electronics 13. However, as those skilled in the art will appreciate, a common return path that is not also one of the X sensing conductors may be provided. Alternatively, separate connections may be provided to each of the conductor loops $L_i$. In this case, the connections may be provided by separate wires arranged, for example, in a twisted pair back to the digitizer electronics 13. Alternatively, where the connections are also provided as conductors on the PCB 11, a similar effect to the twisted pair can be achieved by using both layers of the PCB 11 and by crossing the conductor tracks over each other as they extend back to the digitizer electronics 13.

In the above exemplary embodiment, the excitation circuit 17 was arranged to excite only the comb-type winding 51. As those skilled in the art will appreciate, it is possible to excite using both the X and the Y digitizer windings. In such an exemplary embodiment, more complex processing would be carried out to determine the optimum excitation and detection configurations in view of the greater variety of possible excitation windings that can be energized. In this case, an optimum configuration map may be pre-stored in the digitizer 9 which defines the optimum excitation configuration for any given position of the stylus 7 over the writing surface 3. Alternatively, the optimum configuration may be determined dynamically from the amplitudes of the signals induced in the selected sensor windings, in the manner described above.

Figure 15:
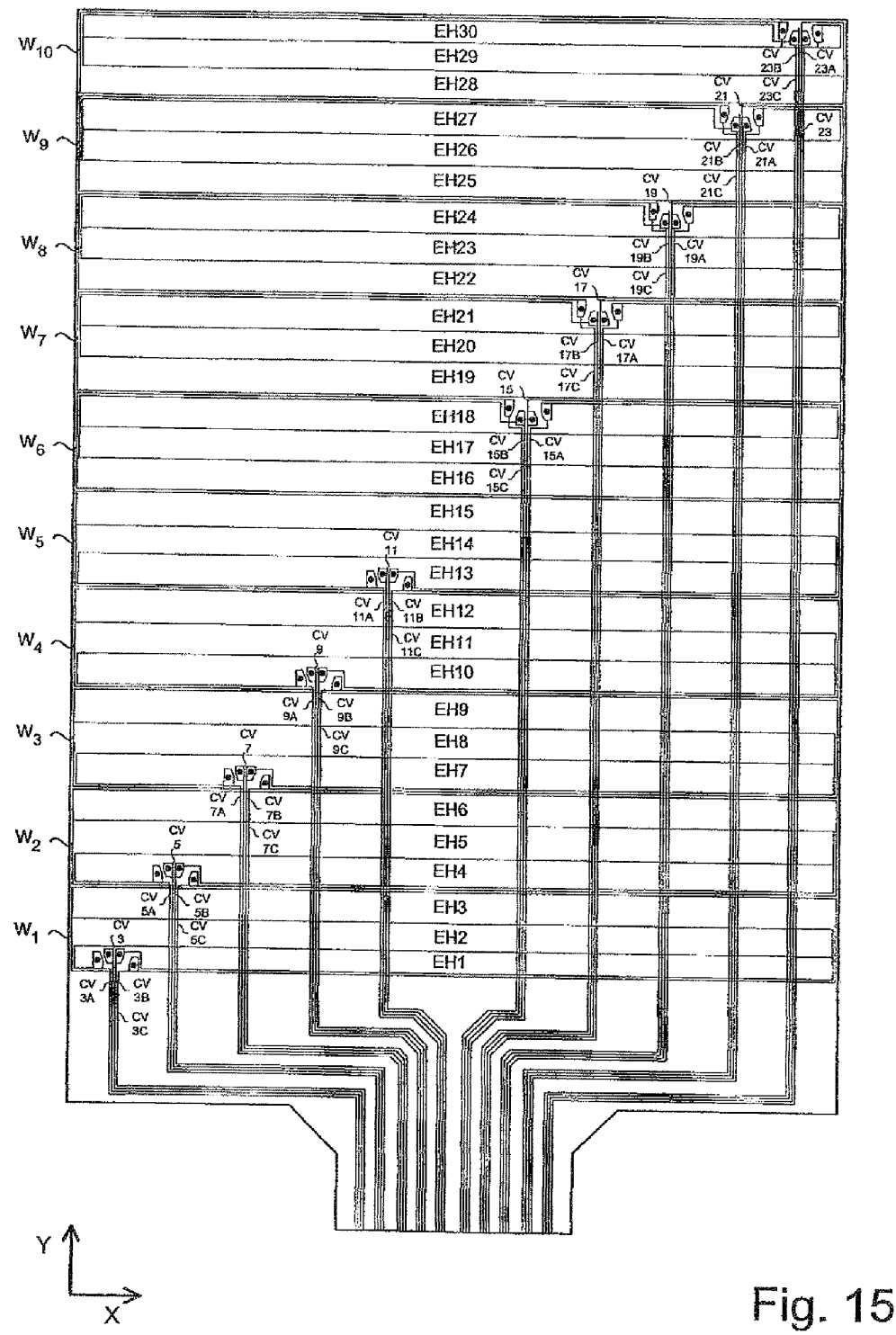
FIG. 15 illustrates an alternative form of PCB conductors which can be used for Y position measurement in the digitizer.

In the above exemplary embodiment, the digitizer windings used for Y position sensing comprised an array of non-overlapping conductor loops $L_i$. As those skilled in the art will appreciate, it is not essential to use such conductor loops. FIG. 15 illustrates an example of an alternative array of more complex digitizer windings that can be used. As shown, the Y digitizer windings include an array of non-overlapping digitizer windings $W_1$ to $W_{10}$, which each comprise three sub-loops which are labelled EH1 to EH30. Each of the separate Y digitizer windings $W_i$ has four connections back to the digitizer electronics 13. By suitable arrangement of the multiplexers in the sensing circuit 19, the digitizer electronics 13 can measure the EMF induced in each of the sub-loops EH1 to EH30, from which it can determine the approximate Y position of the stylus 7 above the writing surface 3. For example, referring to FIG. 15, the EMF induced in loop EH1 is obtained by a differential measurement of the EMFs obtained at conductors CV3B and CV3A; the EMF induced in loop EH2 is obtained by a differential measurement of the EMFs obtained at conductors CV3A and CV3; and the EMF induced in loop EH3 is obtained by a differential measurement of the EMFs obtained at conductors CV3C and CV3B.

In the above exemplary embodiments, the digitizer windings were formed from conductor patterns on a printed circuit board. As those in the art will appreciate, the digitizer windings may be manufactured from any appropriate technology such as with discrete wires, conductors punched from sheet material, printed inks, etc. Additionally, if the digitizer windings are made from transparent conductor, then they may be placed above (or partly above and partly under) the display 5.

In the above exemplary embodiment, the density of the X sensing conductors and the density of the Y sensing conductors varied across the measurement area of the digitizer 9. As those skilled in the art will appreciate, the same variation of the sensing conductors can be achieved with different types of digitizer windings, such as with the loop coil windings described in U.S. Pat. No. 4,878,553.

In the above exemplary embodiments, the digitizer microprocessor 71 performed the processing of the stylus signals to detect the stylus position and status. Some or all of these processing operations may alternatively be performed by the host system's processor.

In the above exemplary embodiment, the digitizer electronics 13 scans and captures styluses 7 in turn according to the process illustrated in FIG. 9 and then performs continuous measurement on one stylus 7 at a time. As an alternative, the system could be arranged to regularly scan for all types of stylus 7, for example in periods of user inactivity, and to interleave continuous sensing processes for each type of stylus 7 that is detected, yielding a system that can track multiple styluses 7 simultaneously.

In the above exemplary embodiments, for those styluses 7 which need to be powered by the digitizer 9, the digitizer 9 was arranged to transmit a burst of excitation signal and then to process the signals obtained in the digitizer windings. In an alternative exemplary embodiment, the excitation and detection may be performed at the same time. This is facilitated in the above exemplary embodiment by the differential nature of the sensing circuit 19 which removes any direct coupling between the excitation windings and the sensor windings. Alternatively, for the stylus with processing electronics shown in FIG. 7c, excitation and detection may be performed at the same time by, for example, causing the stylus 7-3 to transmit a response signal back to the digitizer 9 in a different frequency band to the excitation frequency.

In the above exemplary embodiment, a calibration procedure was described for determining appropriate values for tune_A and tune_B. As those skilled in the art will appreciate, there are other ways to determine tune_A and tune_B values. For instance, the system could incorporate a mathematical model of the effect of changing excitation configuration and frequency, and choose tune_A and tune_B to maximize the output signal. Or there could be an ad hoc formula estimating the desired capacitance in the excitation circuit, and tune_A and tune_B could be chosen to approximate that capacitance.

In the exemplary embodiments described above, the sensing circuit 19 digitized the EMFs induced in the digitizer windings and the digitizer microprocessor 71 performed FFT calculations on the data to detect pen frequency, etc. As those skilled in the art will appreciate, other techniques can be employed. For example, the processing techniques described in the applicant's earlier international patent application WO 03/075213, the contents of which are incorporated herein by reference, could be used.

In the above exemplary embodiment, the signals from the digitizer windings were passed through sixteen parallel processing channels of the sensing circuit 19. Since those processing channels may have slightly different gain and phase responses, the digitizer preferably includes a calibration function in which a differential calibration reference signal is switched to all processing channels. The digitizer microprocessor 71 can then calculate the relative amplitudes and phases of the signal detected in each channel and use them to correct signal amplitudes for gain and phase errors suffered during normal operation. This may be achieved, for example, by changing the amplitude measure that is calculated to:

$$A(X_j) = G_j \cdot \sum_{r=0}^{255} S(X_j)_r \cdot \sin(2\pi F_X r T_s + P_X + P_j)$$

where $G_j$ is the gain correction for the $j^{th}$ processing channel and $P_j$ is the phase correction for the $j^{th}$ processing channel. As will be apparent to those skilled in the art, the sine function above may be replaced with a complex exponential and exp $(P_j)$ factored out, if that is more convenient computationally.

In the above exemplary embodiments, the sensing circuit 19 included sixteen channels of filters and sample and hold circuits. As those skilled in the art will appreciate, any number (greater or smaller) of channels may be provided with multiplexing being used as appropriate to detect all sensor signals of interest. Further, as an alternative to filtering and sampling each signal of interest, the processing channels of the sensing circuit 19 may be arranged to, for example, mix the sensor signals of interest with in-phase and quadrature phase versions of the excitation signal, with the outputs from the mixers either being low pass filtered to remove the high frequency components from the mixed signals or being integrated over a predetermined period. The digitizer microprocessor 71 can then determine the position and frequency of the stylus from the filtered or integrated I and Q signals. For example, in the case where the mixed signals are low pass filtered, any difference between the stylus frequency and the mixing frequency will result in a periodic signal at a frequency corresponding to the difference between the stylus frequency and the mixing frequency. Therefore, by sampling the filtered I and Q signals, the digitizer microprocessor 71 can determine the difference in frequencies between the mixing signal and the stylus signal, from which it can determine the stylus frequency. Position calculations can be carried out by using the peak amplitudes of the filtered I and Q signals. As those skilled in the art will appreciate, in such an embodiment, if the stylus 7 is arranged to transmit at a different frequency to the excitation frequency (for example, to facilitate simultaneous excitation and detection), the frequency of the mixing signals would usually be set at the estimated transmit frequency of the stylus 7 and not at the excitation frequency.

In the above exemplary embodiment, the digitizer microprocessor 71 obtained two hundred and fifty-six data samples from each digitizer signal of interest. As those skilled in the art will appreciate, an alternative number of signal sample values may be obtained, depending on the compromise between frequency and amplitude accuracy, power supply current, the time available for processing, ADC speed, etc.

In the above exemplary embodiment, a single ADC was used to digitize the signals from all the processing channels of the sensing circuit 19. As those skilled in the art will appreciate, any number of ADCs may be used. For example, a separate ADC may be provided for each processing channel of the sensing circuit 19.

In the above exemplary embodiments, the signal from the channel having the largest signal level was used to estimate the stylus frequency and phase. In an alternative exemplary embodiment, the signals from all channels may be combined and then the combined signal can be used to estimate the stylus frequency and phase. The combination could be achieved by initially guessing which channels are "negative" (for example, using a previous position estimate), and then adding up all the channels' signals, flipping the signs of the negative ones.

In the above exemplary embodiment, during the continuous sensing process, the position and angle calculations were based on a generic stylus design. As those skilled in the art will appreciate, this is not essential. The stylus specific data could be fed into the calculations so that there is no need for a separate correction stage.

In the exemplary continuous sensing processes discussed above, the digitizer microprocessor 71 checked if the determined frequency and amplitude data were within predetermined limits. If they were not, then the continuous sensing process ended with an indication that the stylus was no longer synchronized. As well as checking that the frequency and amplitude are within limits, the digitizer microprocessor 71 can also check that the estimated position is reasonably close to the position at which the stylus 7 was assumed to be. If it is not, then that indicates the position estimate that has been obtained is based on a poorly chosen set of sensing channels. For this reason, the digitizer microprocessor 71 may deem the stylus 7 to be no longer synchronized.

In the above exemplary embodiments, the position indicators that have been used have all transmitted signals for sensing by the digitizer windings. As those skilled in the art will appreciate, the new excitation circuit 17 discussed above could be used in a digitizer system where the position indicator receives signals from the digitizer windings, from which it determines its own position relative to the digitizer's working area. This position information can then be used internally by the position indicator or it can be transmitted to the host device.

In the exemplary embodiment described above, the excitation signal generator was directly connected to the coil select switching circuitry. As those skilled in the art will appreciate, this direct connection is not essential. Instead, the coil select switching circuitry can be, for example, electrically or magnetically coupled to the excitation signal generator through an appropriate coupling.

In the above exemplary embodiment, the coil select switching circuitry 93 in the excitation circuit 17 was arranged to be able to apply the excitation signal to selected ones of the X sensing conductors CV1 to CV27. As those skilled in the art will appreciate, this coil select switching circuitry 93 may be configured to allow the excitation signal to be applied to any of the X sensing conductors or to the Y sensing conductor loops. Similarly, it is possible to adapt the coil select switching circuitry 93 to minimize the number of coils to which the excitation current can be applied. However, as those skilled in the art will appreciate, the arrangement of the coil select switching circuitry 93 must be such that a stylus 7 above any position of interest on the writing surface 3 must be able to be energized with the required efficiency.

In the above exemplary embodiment, the excitation circuit included a drive signal generator and coil select switching circuitry. As those skilled in the art will appreciate, the particular drive signal generator that was used can be replaced with a more conventional drive signal generator that employs a class A or class D amplifier. Similarly, the particular coil select switching circuitry can also be replaced with more conventional select switching circuitry.

In the above exemplary embodiment, the excitation circuit 17 was arranged to apply an excitation signal across two conductors of the comb winding 51, leaving the remaining conductors disconnected. As an alternative, a greater number of the conductors of the comb winding 51 may be driven with the excitation signal at the same time. For example, to power a stylus 7 in the vicinity of conductor CV8, transistors 111-1 and 111-2 may be switched on and transistors 113-3 and 113-4 may be switched on, so that excitation current is applied in phase to conductors CV5 and CV7 and out of phase to conductors CV9 and CV11. This approach is particularly advantageous where the resistance of the conductors is substantial, for example in the case that they are manufactured from conductive ink, where the lower effective resistance of the conductors surrounding the stylus 7 improves efficiency.

As those skilled in the art will appreciate, the way in which the digitizer electronics 13 are arranged to be able to work with several different types of stylus 7 may be applied for use with digitizers having different digitizer winding designs, such as those described in the applicant's earlier U.S. Pat. No. 6,489,899.

In the above exemplary embodiment, the digitizer microprocessor included a survey module, a capture module and a tracking module. As those skilled in the art will appreciate, it is not essential to employ three separate modules to detect the presence of the different types of stylus and then to track the position of any that are found. In particular, in an alternative embodiment, the digitizer may include a survey module for detecting the presence of the different types of stylus (as defined by the stylus calibration data) and a position sensing module which tracks the position of the or each stylus identified by the survey module.

In the above exemplary embodiment, the digitizer microprocessor output a set of control signals for controlling the switches within the coil select switching circuitry. As those skilled in the art will appreciate, it is not essential for the digitizer microprocessor to output a plurality of different control signals to achieve the same result. For example, the digitizer microprocessor may output a single control signal whose level determines which one or more of the switching circuits within the coil select switching circuitry is/are to be activated.

In the above exemplary embodiment, the battery-powered stylus 7-1 described above activates with the pressure applied to the tip 195 of the stylus 7-1. As an alternative, the battery-powered stylus 7-1 could respond to a special inductive wake up signal emitted by the digitizer system. In this case, the survey process for the battery-powered pen would be adapted so that the digitizer 9 generates the appropriate wake up signal.

In the above exemplary embodiment, the digitizer 9 was embedded within a tablet PC 1. As those skilled in the art will appreciate, the digitizer system described above may be embedded in other types of host device, such as Personal Digital Assistants (PDAs), mobile telephones, etc.

In the above exemplary embodiment, the operation of the digitizer 9 was controlled by a software controlled microprocessor 71. As those skilled in the art will appreciate, the software controlled microprocessor may be replaced by dedicated hardware circuits that are programmed to carry out the necessary functions. However, a programmable computer device is preferred as it allows the digitizer 9 to be adapted after manufacture, for example, to detect and operate with new styluses 7. The software provided for controlling the digitizer 9 may be loaded into the digitizer 9 via the host device or it may be downloaded as a signal over a computer network, such as the Internet.

A computer-readable medium can store processor-implementable (e.g., computer executable) instructions for configuring a programmable processor as the digitizer controller.

What is claimed is:

1. A digitizer controller comprising:
   a memory for storing a plurality of respective different position indicator calibration data, each associated with a respective type of position indicator, each respective type of position indicator having a respective inductive signature within a respective operating frequency band;
   a survey module configured to control a digitizer to survey for presence, adjacent to a working surface of the digitizer, of different types of position indicators defined by the plurality of position indicator calibration data; and
   a position sensing module configured to control the digitizer to track the position of an identified position indicator identified by the survey module as being adjacent to the working surface of the digitizer, in accordance with the position indicator calibration data associated with the identified position indicator;
   wherein the respective operating frequency bands of different types of position indicators overlap with each other and wherein the survey module is configured to distinguish between position indicators having similar inductive signatures with overlapping operating frequency bands by surveying for the different types of position indicator in accordance with a selected order and not based on operating frequencies of the position indicators.

2. The controller according to claim 1, wherein the survey module is configured to survey individually for a first type of position indicator having a resonator and processing electronics and a second type of position indicator having a resonator and no processing electronics.

3. The controller according to claim 2, wherein the survey module is configured to survey for the first type of position indicator before surveying for the second type of position indicator and is configured not to survey for the second type of position indicator after surveying for the first type of position indicator if the survey module determines the presence of the first type of position indicator adjacent to the working surface of the digitizer.

4. The controller according to claim 1, wherein the plurality of respective different position indicator calibration data includes respective different data for each associated type of position indicator specifying a respective different survey process to be used by the digitizer for surveying for the associated type of position indicator.

5. The controller according to claim 1, wherein the plurality of respective different position indicator calibration data includes data for a first type of position indicator and data for a second type of position indicator, the data for the first type of position indicator specifying a first position sensing process to be used by the digitizer for tracking a position of the first type of position indicator, and the data for the second type of position indicator specifying a second position sensing process, that is different to the first position sensing process, to be used by the digitizer for tracking a position of the second type of position indicator.

6. The controller according to claim 1, wherein the controller is configured to determine the position of the identified position indicator using a process for a generic position indicator, and wherein the position sensing module is configured to correct the position determined using the process for the generic position indicator by using the associated position indicator calibration data.

7. The controller according to claim 1, wherein the identified position indicator, is configured to emit a signal at an operating frequency, wherein the operating frequency is not known in advance, wherein the position sensing module is configured to estimate the operating frequency, and wherein the position sensing module is configured to determine status information for the position indicator using the estimated operating frequency of the signal.

8. The controller according to claim 1, wherein the position sensing module is configured to estimate a phase of a signal emitted by the identified position indicator, and wherein the position sensing module is configured to determine status information for the position indicator using the estimated phase of the signal.

9. The controller according to claim 1, wherein for a position indicator having a resonator, the survey process is configured to cause the digitizer to energize digitizer windings thereof in order to energize the resonator of the position indicator, and wherein the survey process is configured to cause the digitizer to energize the digitizer windings with a plurality of excitation signals, each of the plurality of excitation signals having a respective different excitation frequency bandwidth.

10. The controller according to claim 9, wherein the survey module is configured to cause the digitizer to process signals generated in digitizer windings thereof and estimate the resonant frequency of the resonator, and wherein the position sensing module is configured to cause the digitizer to energize the digitizer windings with an excitation signal whose frequency is determined in dependence upon the estimated resonator frequency.

11. A method of operating a digitizer, the method comprising:
   surveying for the presence, adjacent to a working surface of the digitizer, of different types of position indicators defined by stored position indicator calibration data, each respective type of position indicator having a respective inductive signature within a respective operating frequency band; and
   tracking a position of an identified position indicator identified as being adjacent to the working surface of the digitizer, in accordance with the stored position indicator calibration data associated with the identified position indicator;
   wherein the respective operating frequency bands of different types of position indicators overlap with each other and wherein the surveying distinguishes between position indicators having similar inductive signatures with overlapping operating frequency bands by surveying for the different types of position indicator in accordance with a selected order and not based on operating frequencies of the position indicators.

12. The method according to claim 11, wherein the surveying surveys individually for a first type of position indicator having a resonator and processing electronics and a second type of position indicator having a resonator and no processing electronics.

13. The method according to claim 12, wherein the surveying surveys for the first type of position indicator before surveying for the second type of position indicator, and wherein the surveying does not survey for the second type of position indicator after surveying for the first type of position indicator if the surveying determines the presence of the first type of position indicator adjacent to the working surface of the digitizer.

14. A digitizer comprising:
   a plurality of digitizer conductors arrayed over a working area, each digitizer conductor extending substantially in a first direction within the working area and being spaced apart along a second direction within the working area, wherein each digitizer conductor is connected at or near one end to the other digitizer conductors by a connecting conductor which extends along the second direction and is separately connectable at the other end to digitizer electronics;
   excitation circuit for generating and for applying an excitation signal to a selected subset of said digitizer conductors; and
   a controller operable to generate select control signals for controlling the selection of said subset of digitizer conductors;
   wherein the excitation circuit comprises:
   an excitation signal generator for generating the excitation signal for application to the selected conductors of the digitizer; and
   conductor select switching circuitry configured to receive the excitation signal generated by the excitation signal generator; and to apply the excitation signal to the selected digitizer conductors;
   wherein the conductor select switching circuitry includes a plurality of switching circuits, each switching circuit associated with a respective one of said digitizer conductors, and each switching circuit configured to control the application of the excitation signal to the associated digitizer conductor in dependence upon one or more of the select control signals;
   wherein each of the switching circuits includes a single transistor switch for controlling the application of the excitation signal to the associated digitizer conductor;
   wherein the plurality of switching circuits are arranged in two groups, with the single transistor of each switching circuit in the first group being for connection between a supply potential and the associated digitizer conductor, and with the single transistor of each switching circuit in the second group being for connection between a ground potential and the associated digitizer conductor; and
   wherein the controller is configured, during an excitation operation, to select at least one digitizer conductor that is associated with a switching circuit in the first group and at least one digitizer conductor that is associated with a switching circuit in the second group.

15. The excitation circuit according to claim 14, wherein the excitation signal generator comprises:
   a pulse generator configured to generate a periodic sequence of voltage pulses; and
   an inductor-capacitor filter configured for filtering the periodic sequence of voltage pulses to generate the excitation signal.

16. The excitation circuit according to claim 15, wherein the frequency response of the inductor-capacitor filter is adaptable for different excitation frequencies or for different selected digitizer conductors.

17. The excitation circuit according to claim 15, wherein the pulse generator is configured to generate a sequence of double pulses, with the timing between successive double pulse being dependent upon a frequency of the excitation signal and with the timing between the pulses of each pair being set in order to reduce one or more harmonics of the frequency of the excitation signal.

18. The excitation circuit according to claim 14, wherein the excitation signal generator further comprises a snubbing circuit for snubbing out the excitation signal at the end of an excitation burst.

* * * * *